United States Patent
Isoda et al.

(10) Patent No.: US 6,452,693 B1
(45) Date of Patent: Sep. 17, 2002

(54) COMMUNICATION CONTROL METHOD AND APPARATUS, AND COMMUNICATION SYSTEM

(75) Inventors: Takashi Isoda, Tokyo; Akihiro Shimura, Kawasaki, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/148,472

(22) Filed: Sep. 8, 1998

(30) Foreign Application Priority Data

Sep. 9, 1997 (JP) .............................................. 9-244430

(51) Int. Cl.$^7$ .............................................. G06F 13/00
(52) U.S. Cl. ...................................... 358/1.16; 358/1.15
(58) Field of Search .............................. 358/1.11, 1.12, 358/1.13, 1.14, 1.15, 1.16, 1.17, 400, 404; 710/30, 52, 53, 128, 129, 220

(56) References Cited

U.S. PATENT DOCUMENTS

| 4,224,667 A | | 9/1980 | Lewis et al. ................. 364/200 |
| 5,570,201 A | * | 10/1996 | Yokota ........................ 358/404 |
| 5,758,041 A | | 5/1998 | Shimura ..................... 358/1.14 |
| 5,875,313 A | * | 2/1999 | Sescila, III et al. .......... 710/129 |

FOREIGN PATENT DOCUMENTS

EP 0 811 992 A 10/1997

OTHER PUBLICATIONS

"Asynchronous/Queued I/O Processor Architecture" IBM Technical Disclosure Bulletin, vol. 36, No. 1, Jan. 1993, pp. 265–278, XP0000333852 New York US.

"Adaptive Command Queue", IBM Technical Disclosure Bulletin, vol. 38, No. 2, Feb. 1995, p. 97, XP000502405.

* cited by examiner

Primary Examiner—Mark Wallerson
(74) Attorney, Agent, or Firm—Fitzpatrick, Cella, Harper & Scinto

(57) ABSTRACT

A printer has a queue for queuing a queued execution command, an immediate execution agent for executing a write command, and a queued execution agent for executing a read command. The immediate execution agent immediately executes the received write command, and writes data in a host. The queued execution agent picks up a read command from the queue, and reads out data from the host. The host appends a data transfer request from the printer to a queue, issues a write command to the printer on the basis of that data transfer request, and issues a read command to the printer on the basis of a print data transmission request or the like from an application. Independent full-duplex channels can be provided in two directions. Also, a write command can be immediately processed.

46 Claims, 43 Drawing Sheets

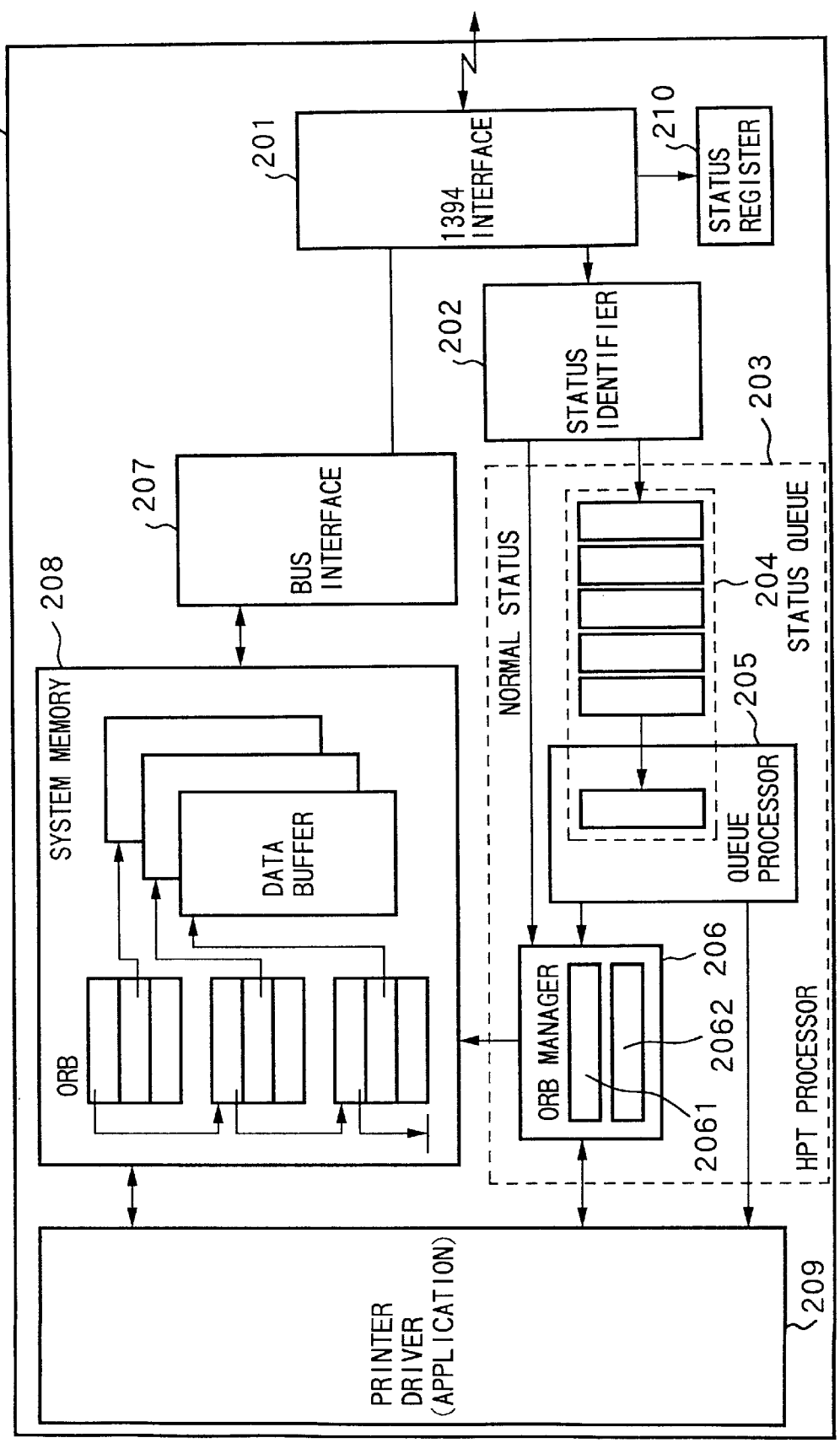

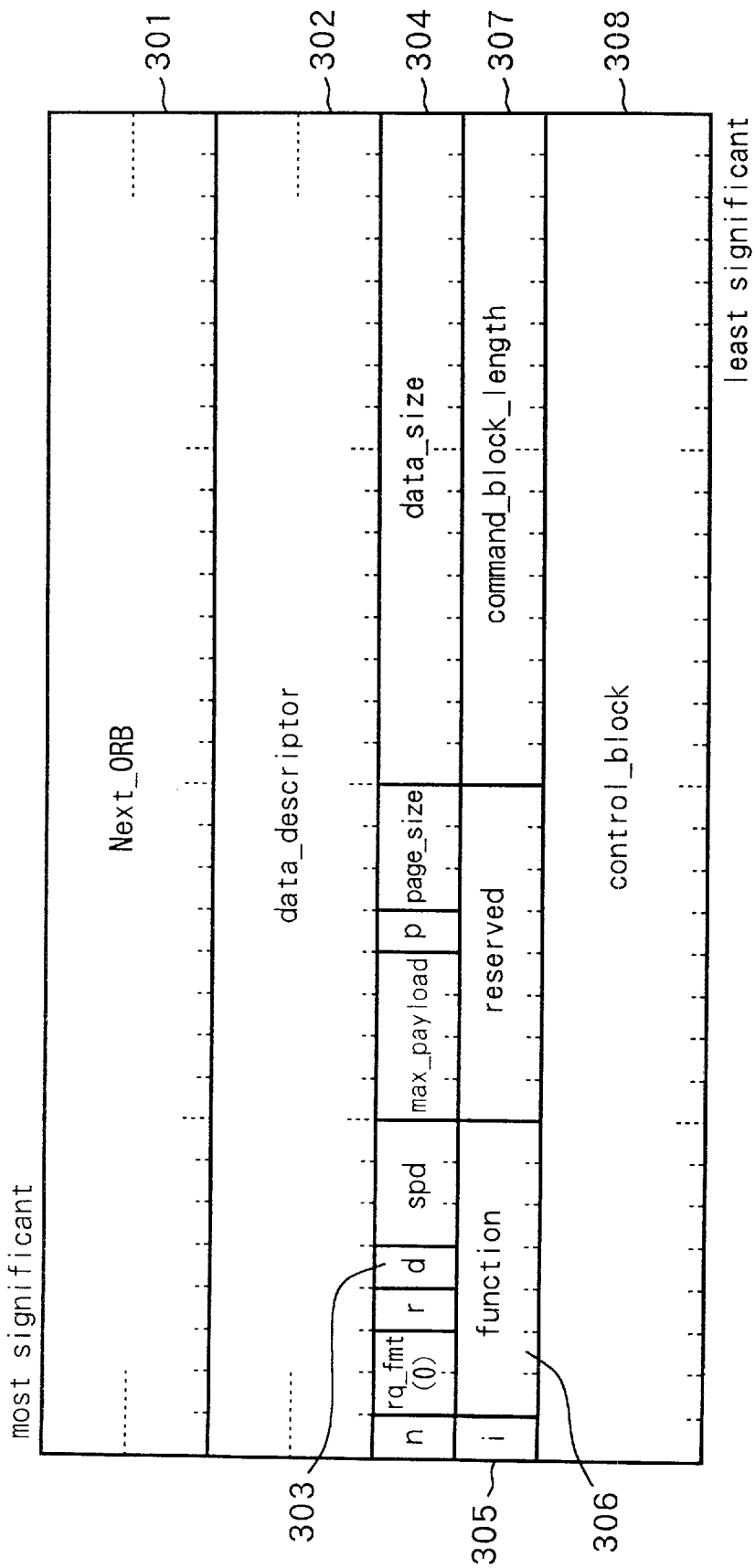

FIG.3B

| Value | HPT command |
|---|---|
| 0 | QUEUE DEPTH |
| 1 | DATA TRANSFER |
| 2 | READ REQUEST |
| 3 | DIRECT STATUS RESPONSE |
| 4-7 | Reserved |
| 8 | ACQUIRE DEVICE RESOURCE |
| 9 | RELEASE DEVICE RESOURCE |
| $A_{16}$ | BASIC DEVICE STATUS |
| $B_{16}$-$F_{16}$ | Reserved |
| $10_{16}$-$7F_{16}$ | Control set dependent |

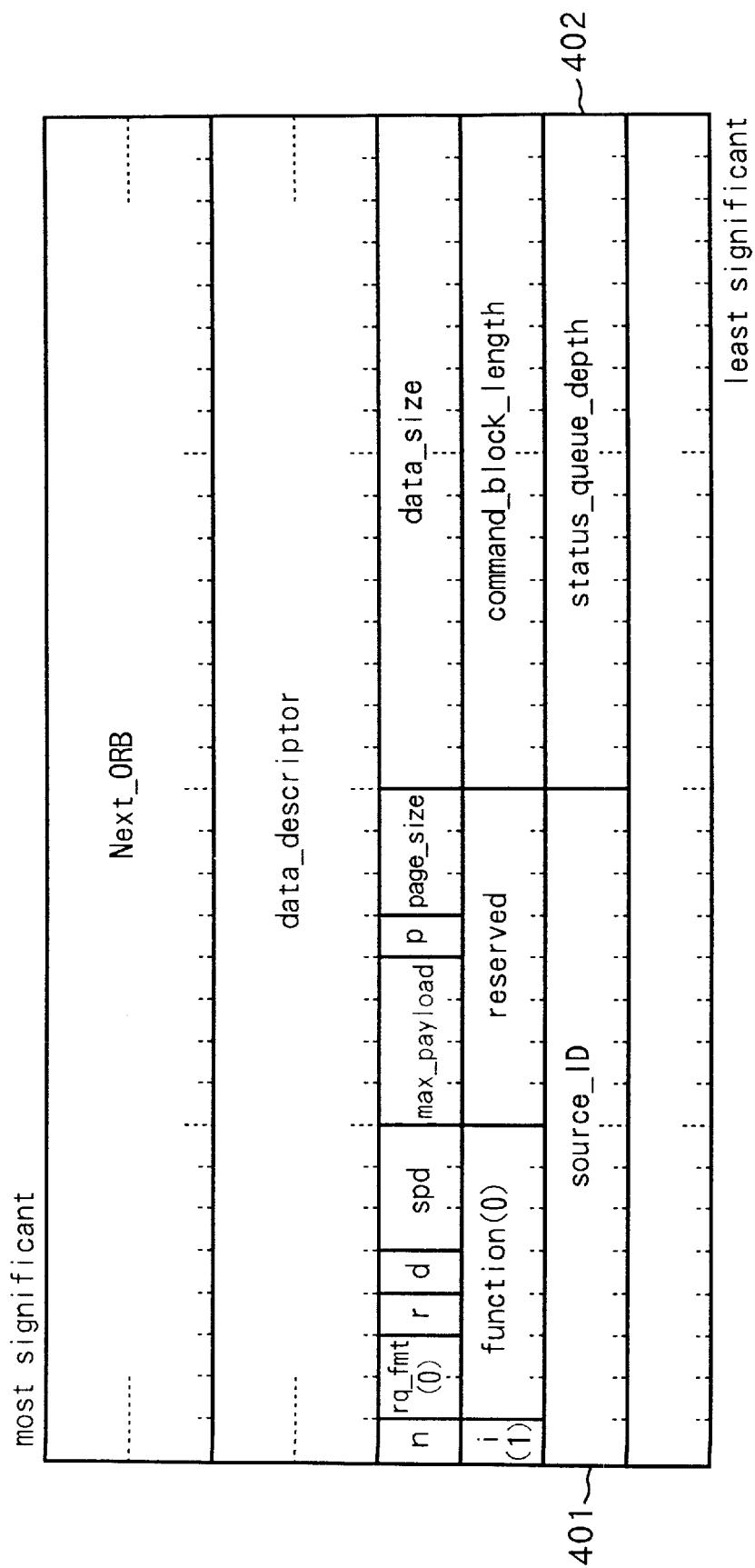

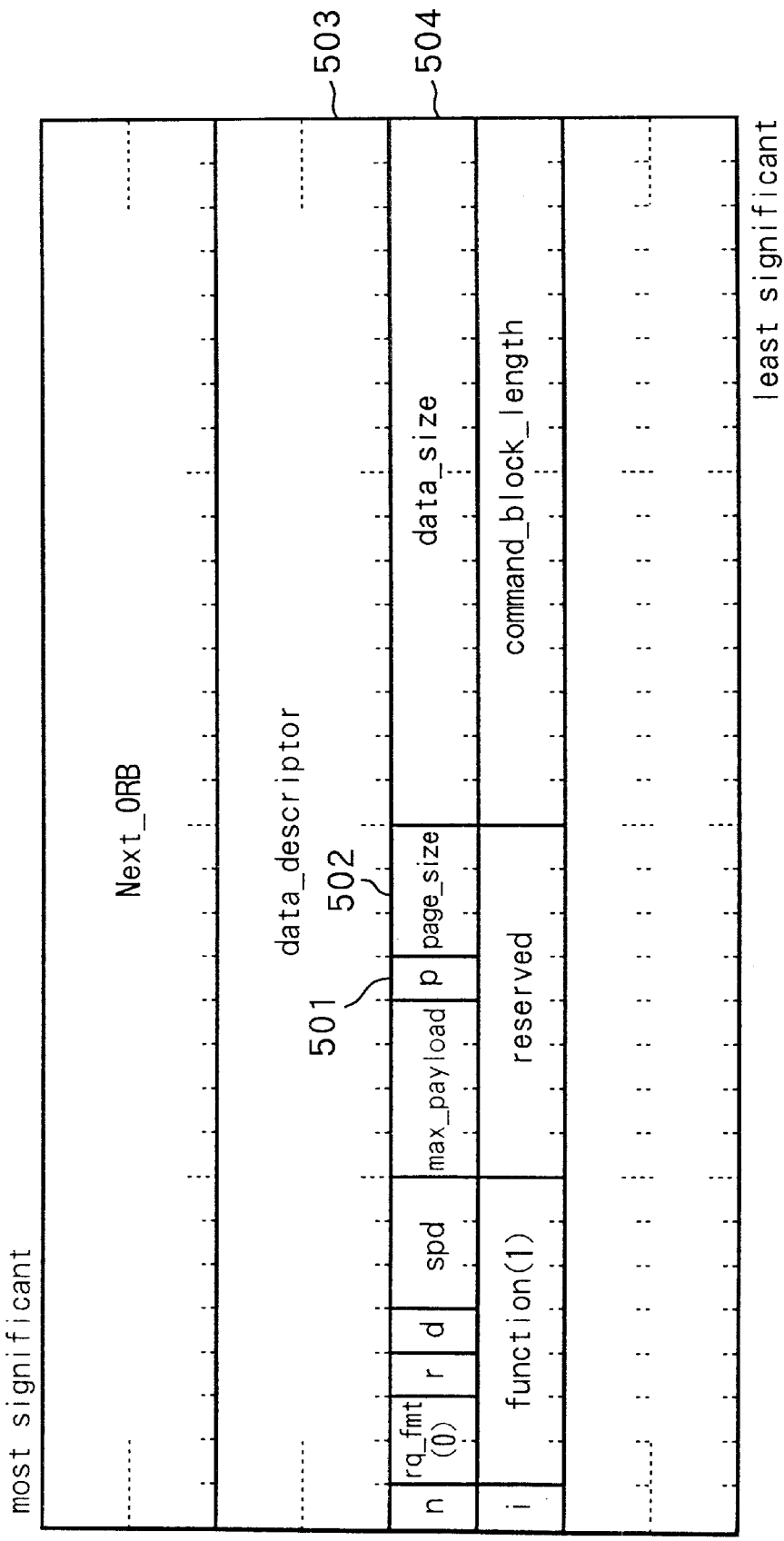

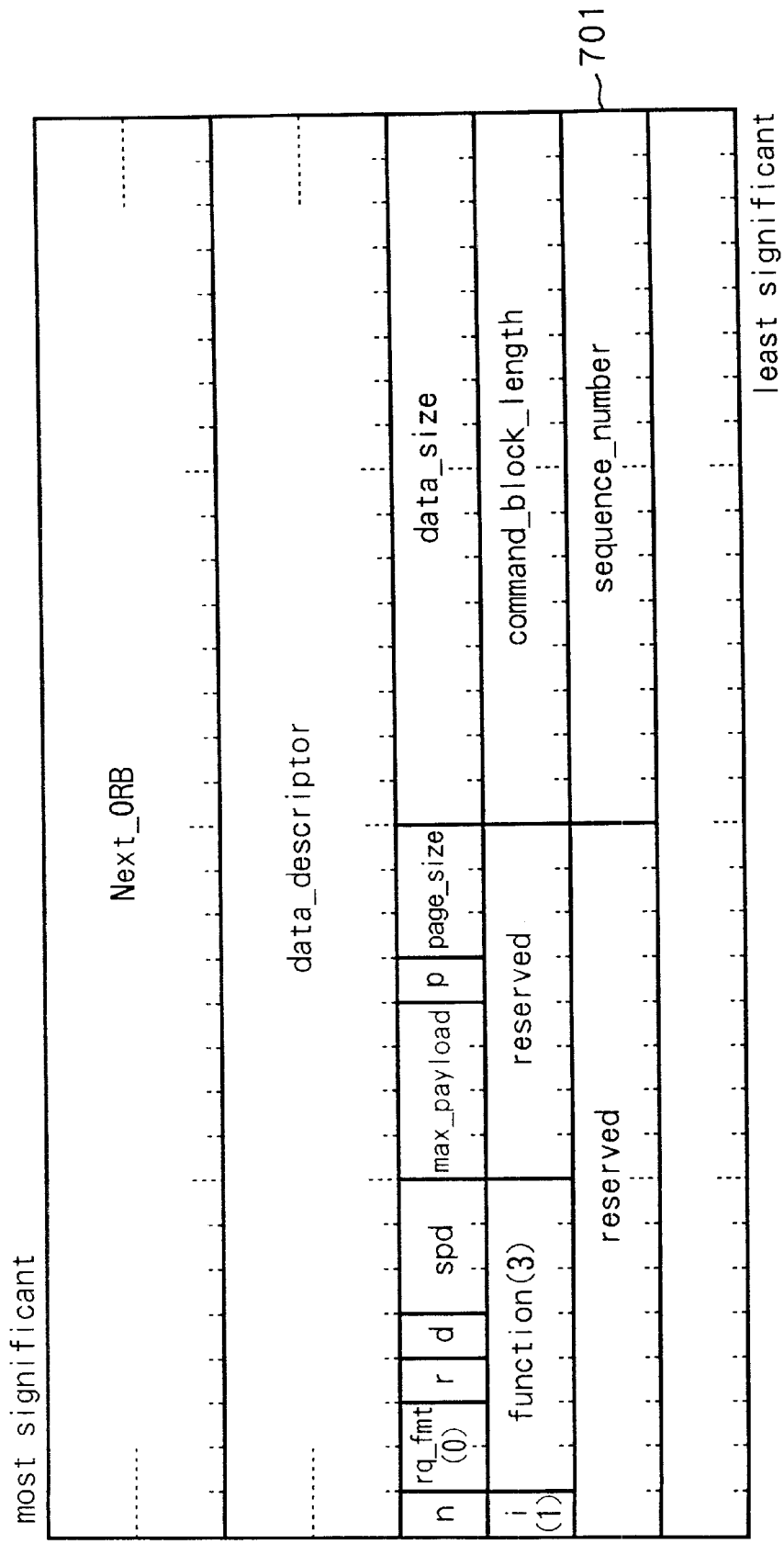

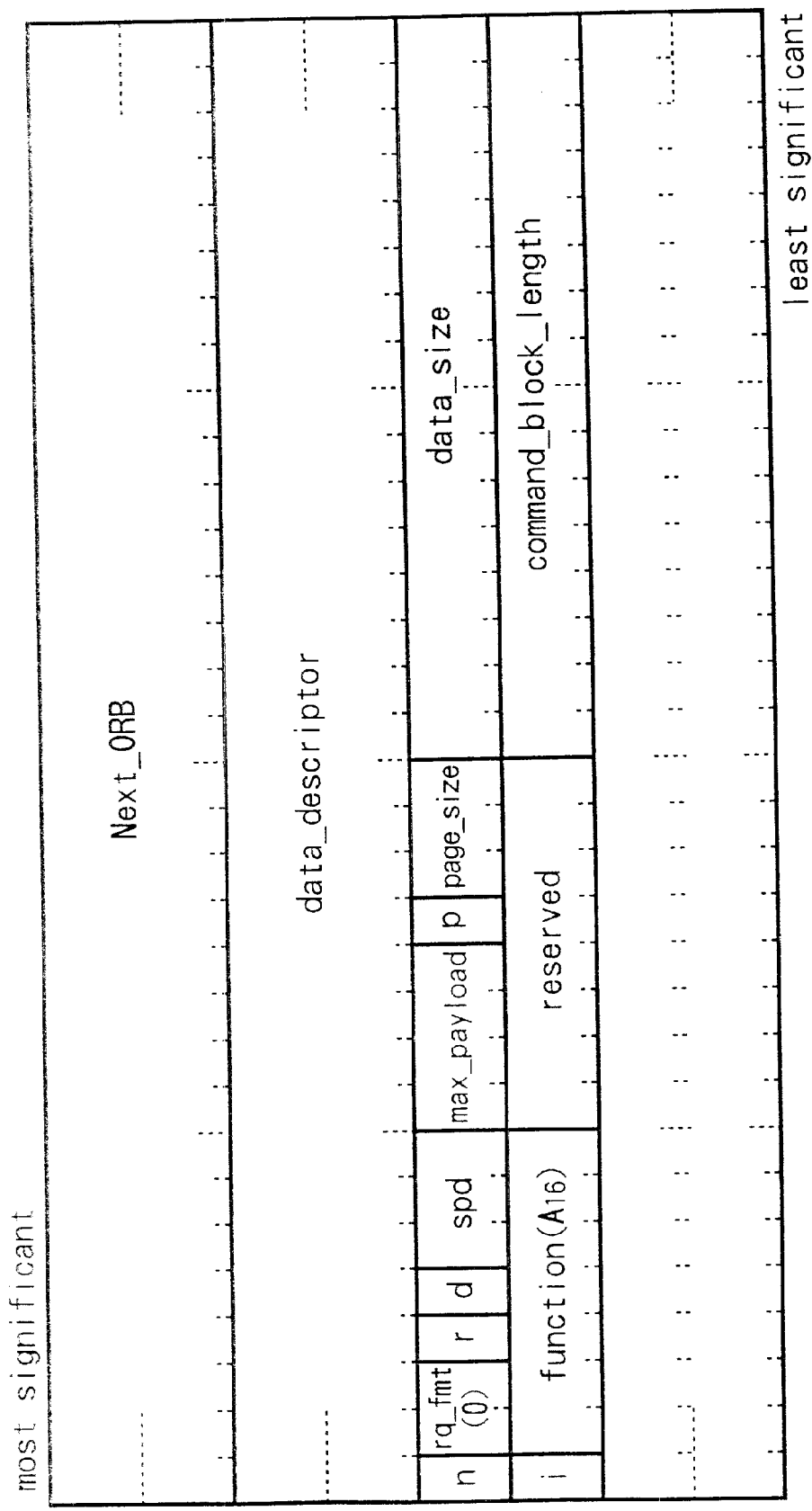

FIG.11B

| Value | HPT status |
|---|---|
| 0 | QUEUE DEPTH |
| 1 | DATA TRANSFER |
| 2 | READ REQUEST |
| 3 | DIRECT |
| 4-7 | Reserved |
| 8 | DEVICE RESOURCE |
| 9 | DEVICE RESOURCE |
| $A_{16}$ | BASIC DEVICE |
| $B_{16}-F_{16}$ | Reserved |
| $10_{16}-7F_{16}$ | Control set dependent |

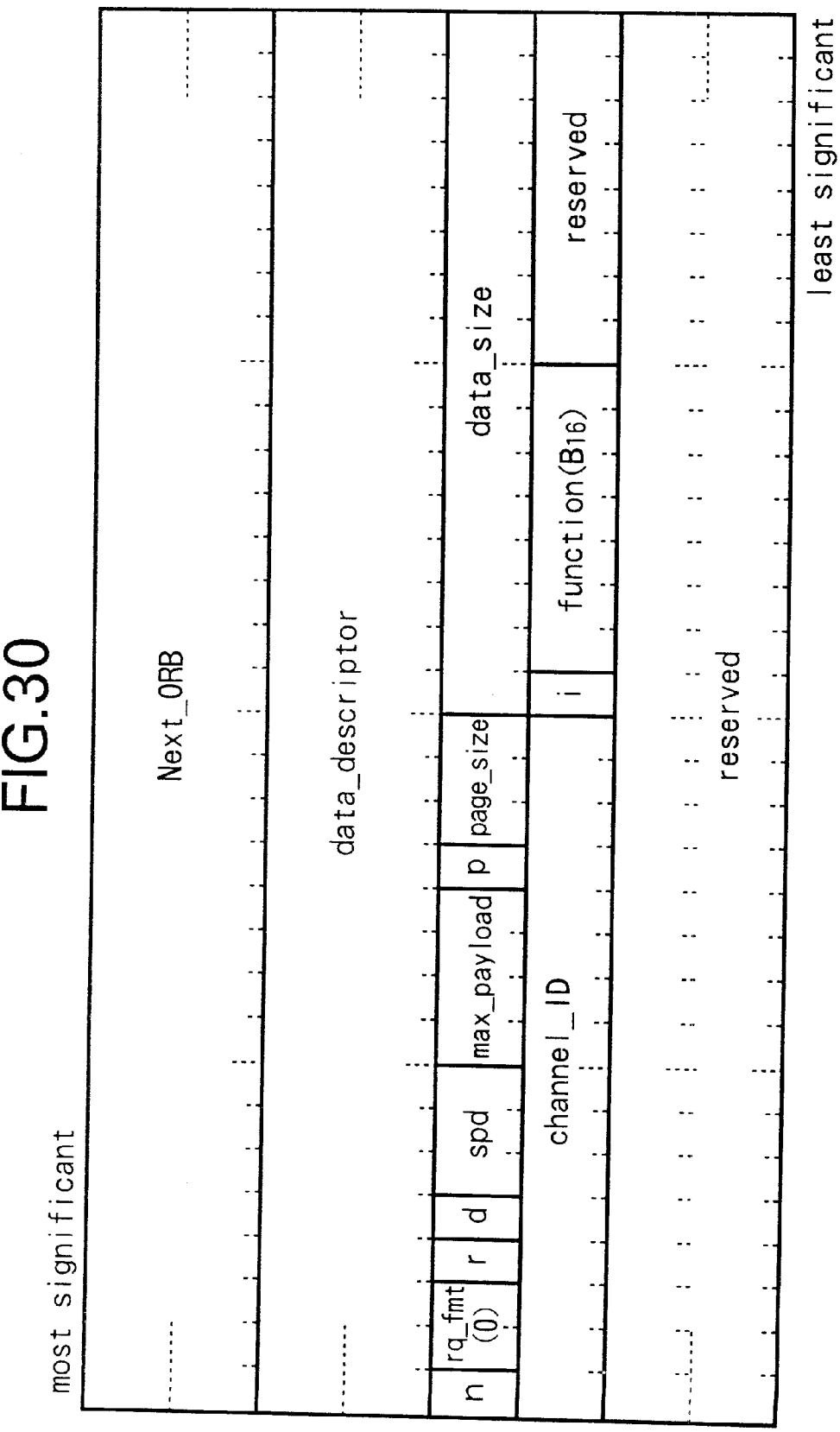

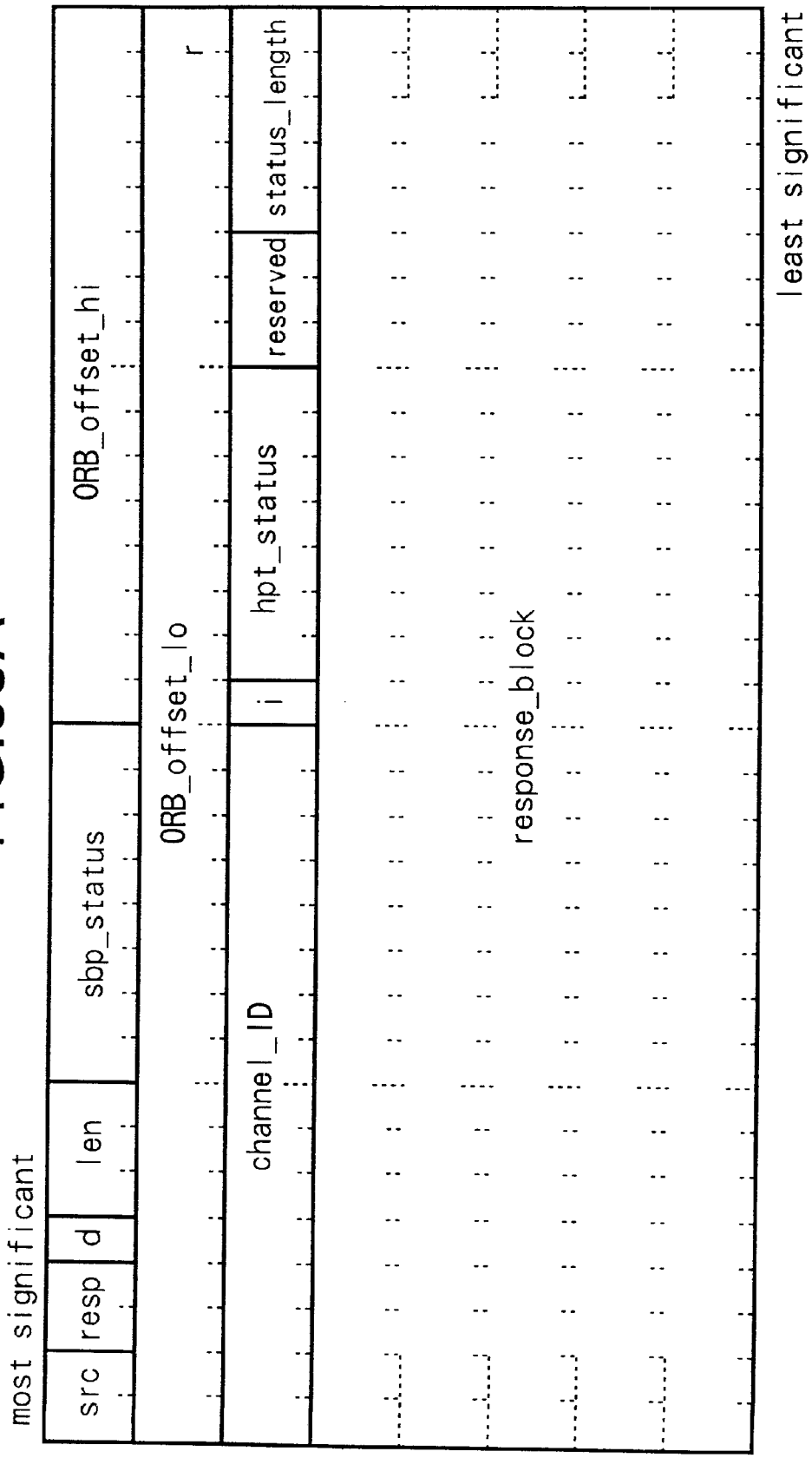

FIG.33B

| Value | HPTstatus |
|---|---|
| 0 | reserved for future standardization |
| 1 | reserved for future standardization |
| 2 | READ REQUEST |
| 3 | DIRECT STATUS |
| 4-7 | reserved for future standardization |

FIG.33C

| Value | HPTcommand |
|---|---|
| 8 | ACQUIRE DEVICE RESOURCE reponse |
| 9 | reserved for future standardization |
| $A_{16}$ | ABDICATE DEVICE RESOURCE request |
| $B_{16}$ | BASIC DEVICE STATUS |
| $C_{16}-F_{16}$ | Reserved for future standardization |
| $10_{16}-6F_{16}$ | Control set dependent |

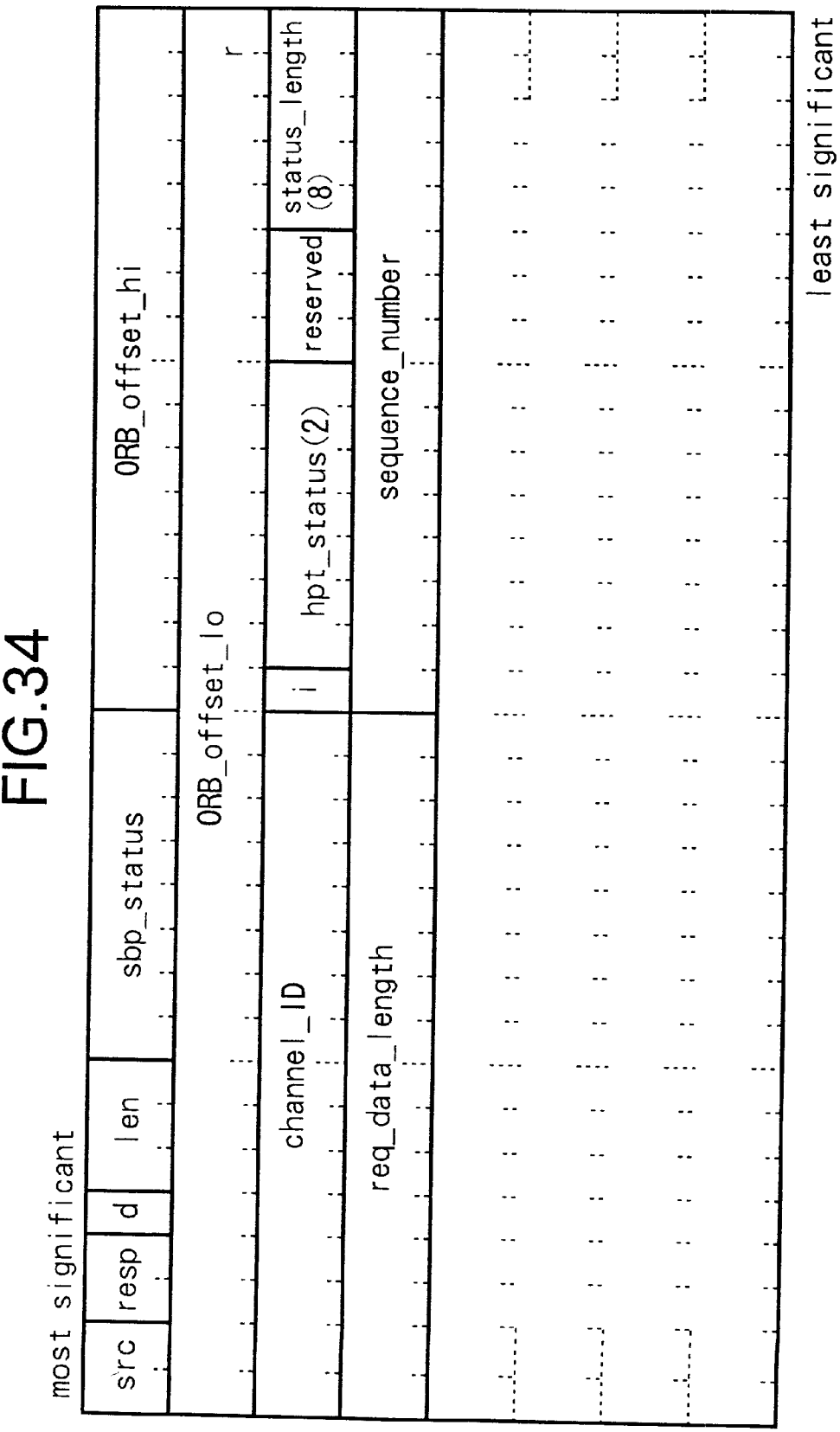

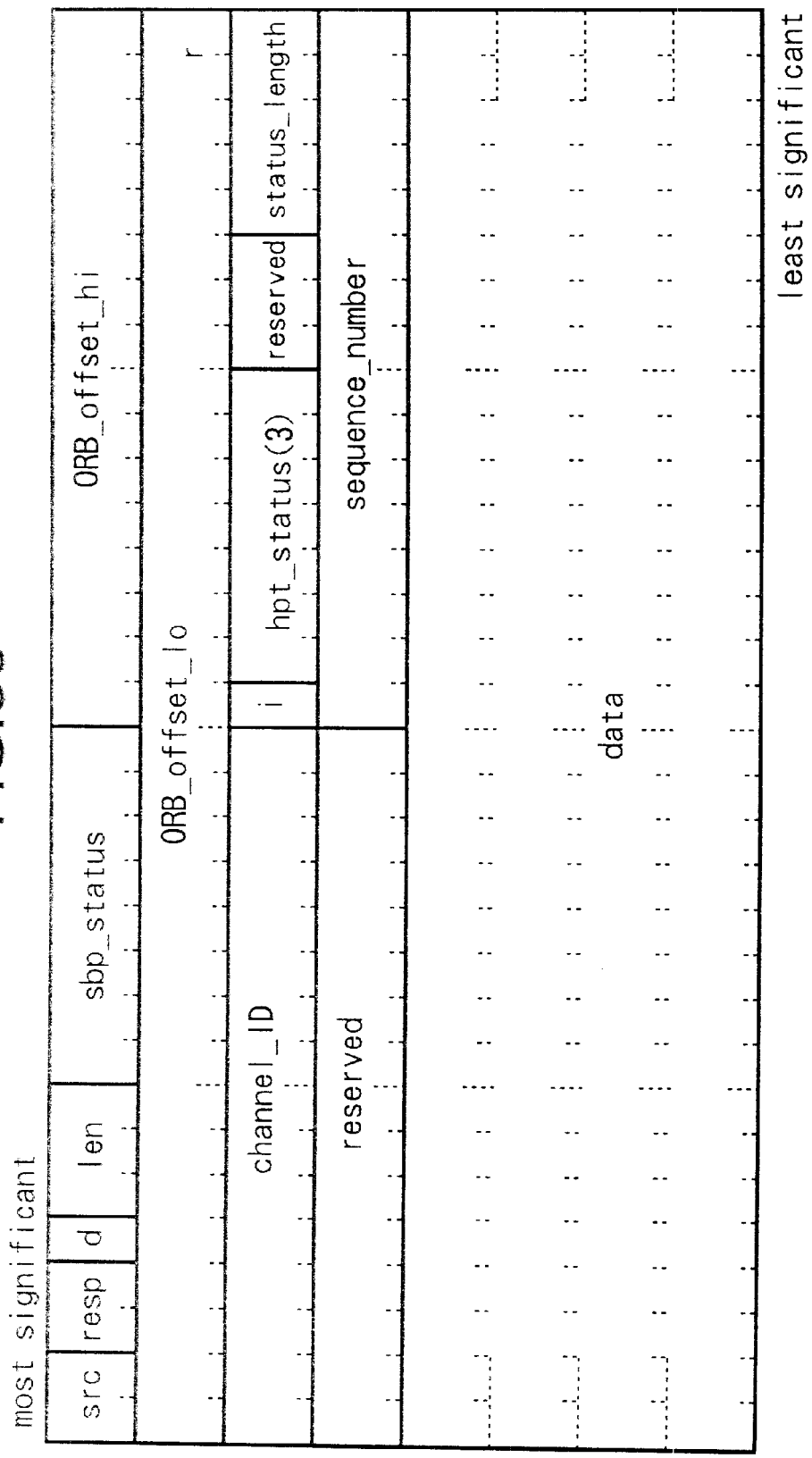

COMMUNICATION CONTROL METHOD AND APPARATUS, AND COMMUNICATION SYSTEM

BACKGROUND OF THE INVENTION

The present invention relates to a communication control method and apparatus for connecting apparatuses such as a host computer and printer.

In recent years, an IEEE1394 interface is used for connecting a computer and peripheral apparatus, or connecting peripheral apparatuses. The IEEE1394 interface allows higher-speed, two-way communications as compared to a hand-shake scheme such as a Centronics interface. Also, the IEEE1394 interface is a memory bus model interface, and equipments connected via the IEEE1394 interface can read data from the designated address of a connected equipment and can write data at the designated address.

IEEE1394 defines the protocol of the physical and link layers utilized in many applications, but does not define detailed protocols in units of equipments. For this reason, the protocol of the transport layer such as SBP (Serial Bus Protocol)-2 that uses IEEE1394 as the physical and link layers has been proposed. The transport layer provides a data transfer function to an application, and applications which use this layer can exchange data with each other.

The protocol SBP-2 utilizes the features of the memory bus model of IEEE1394, and with this protocol, the data receiving side can receive data as its resources become available.

In SBP-2, when data is to be transferred, the transmitting side performs operation called a login to establish a channel with a communication partner. In this case, the logged-in side is called an initiator, and the partner is called a target. Data transfer is done in such a manner that the target reads/write data from/to the initiator in accordance with an instruction from the initiator. In this scheme, the initiator generates an ORB (Operation Request Block) that contains the storage address, size, and the like of data to be transmitted after the login, and informs the target of the address of that ORB. The target reads out data from the initiator on the basis of the address and size written in the ORB and processes the readout data, or writes data as its resources become available. After such processing, the target generates a status block to inform the initiator of the processing state.

When a communication is made using SBP-2 built based on IEEE1394, especially when SBP-2 is applied to data transfer from a data source such as a host computer or the like, which serves as an initiator, to a peripheral apparatus such as a printer apparatus, which serves as a target, the following two problems are posed.

(1) The procedure is complex due to full-duplex communications.

In SBP-2, data transfer is basically managed by the initiator, and the target cannot asynchronously transfer data to the initiator. In SBP-2, when the target wants to transfer data to the initiator, it sends a data read request using unsolicited status to the initiator. The initiator generates an ORB in response to the request, and adds the generated ORB to the end of a list of pending ORBs (including a data transfer request from the initiator to the target, and the like). These ORBs are processed in turn from the oldest one. For this reason, only when the ORB processing of the initiator side has progressed, and the initiator processes the ORB generated in response to the data read request from the target, the target can transfer data to the initiator. That is, the data transfer timing from the target to the initiator is not the issuance timing of the read request from the target to the initiator but is delayed from that timing by the time required for processing the pending ORBs. As a result, two-way, asynchronous data transfer cannot be done. When data to be transferred from the target to the initiator is generated asynchronously, for example, when the target is a printer and an error occurs in that printer, the data to be immediately transmitted to the initiator cannot be transferred in real time.

For this reason, in order to transfer data asynchronously generated by a printer to a host in real time, the printer must undertake a login procedure as an initiator, and must perform data transfer to the host computer as a target.

In this way, when the host computer and printer log in each other, and they both serve as an initiator and target, they must both own processes as an initiator and target. The printer must also perform a login.

A peripheral apparatus such as a printer which processes an image consumes large volumes of memory and processor resources for image processing. For this reason, in order to reduce the cost by simplifying the apparatus arrangement and to attain quick processing, resources used for purposes other than image processing must be reduced as much as possible. However, when the printer must run many processes, as described above, many resources are consumed accordingly, thus disturbing a cost reduction and efficient processing.

On the other hand, data that flow between the host computer and printer are related to each other like print data and its processing status. If channels are set in two ways by independent login processes, their data and responses must be related to each other, and a new processing protocol therefor must be added.

In this way, it is inappropriate to directly apply IEEE1394 and SBP-2 to communications between the host computer and printer, and it is hard to reduce required resources in the respective apparatuses and to improve efficiency.

(2) Multi-channels cannot be realized.

Recently, a multi-functional machine that combines various functions is popularly used as a peripheral apparatus. For example, a digital multi-functional machine which allows a host computer to use it as a scanner, printer, and facsimile is known. When such apparatus is used, a plurality of functions can be simultaneously used if communications are made via a plurality of independent channels in units of functions.

However, since SBP-2 cannot provide multi-channels, it is difficult to use such unit functions simultaneously.

Some protocols other than SBP-2 can transfer asynchronously generated data and can realize multi-channels. However, such protocols cannot utilize the features of IEEE1394 as the memory bus model. That is, when such protocols are applied to communications between the host and printer, the printer cannot perform data transfer at its convenience, and the host must perform data transfer while monitoring the printer state.

SUMMARY OF THE INVENTION

The present invention has been made in consideration of the aforementioned prior art, and has as its object to provide a communication control method and apparatus, which can make full-duplex communications (asynchronous two-way communications) by a single login process, and can efficiently utilize resources such as processes, memories, and the like required for data exchange, and a printer apparatus using the method.

It is another object of the present invention to provide a communication control method and apparatus, which allows a target to read out data prepared by an initiator as soon as its resources become available, and can prevent the initiator from being occupied by data transfer on the convenience of the target, and a printer apparatus using the method.

It is still another object of the present invention to provide a communication control method and apparatus which can realize multi-channels, and a printer apparatus using the same.

In order to achieve the above object, the present invention comprises the following arrangement.

That is, there is provided a communication control method of exchanging data upon accessing a storage area of an initiator from a target,
wherein the initiator transmits commands corresponding to read and write accesses to the storage area to the target so as not to exceed the number of read and write commands that can be held by the target, and
the target holds the received read and write commands in different queues, and independently processes the held commands.

There is also provided a communication control method of exchanging data upon accessing a storage area of an initiator from a target,
wherein the target checks if a size of data to be transmitted exceeds a predetermined size, requests the initiator to issue a write command in the storage area when the size of the data to be transmitted exceeds the predetermined size, and sends the data to the initiator when the size of the data to be transmitted does not exceed the predetermined size, and
the initiator issues a write command upon receiving a write command issuance request from the target.

There is also provided a communication system for exchanging data upon accessing a storage area of an initiator from a target,
wherein the initiator transmits commands corresponding to read and write accesses to the storage area to the target so as not to exceed the number of read and write commands that can be held by the target, and
the target holds the received read and write commands in different queues, and independently processes the held commands.

There is also provided a communication system for exchanging data upon accessing a storage area of an initiator from a target,
wherein the target checks if a size of data to be transmitted exceeds a predetermined size, requests the initiator to issue a write command in the storage area when the size of the data to be transmitted exceeds the predetermined size, and sends the data to the initiator when the size of the data to be transmitted does not exceed the predetermined size, and
the initiator issues a write command upon receiving a write command issuance request from the target.

There is also provided a communication control method of exchanging data with a target upon accessing a storage area in a memory from the target connected via a communication, comprising:
the queuing step of receiving a spontaneous request from the target and queuing the request in a queue; and
the command generation step of generating and transmitting read and write commands to the storage area in response to a request from an application or the target so as not to exceed the number of read and write commands that can be held by the target.

There is also provided a communication control method of exchanging data with an initiator upon accessing a storage area of the initiator connected via a communication, comprising:
the queuing step of queuing a read command received from the initiator in a queue having a predetermined size;
the queued execution step of picking up and executing a read command from the queue;
the immediate execution step of executing a write command received from the initiator immediately after reception; and
the transfer request step of issuing a data transfer request to the initiator.

There is also provided a communication control apparatus for exchanging data with a target via a storage area, comprising:
means for communicating with a target;
a memory including the storage area;
queue management means for queuing a spontaneous request from the target; and
command generation means for generating and transmitting read and write commands with respect to the storage area in response to a request from an application or the target so as not to exceed the number of read and write commands that can be held by the target.

There is also provided a communication control apparatus for exchanging data with an initiator by accessing a storage area of the initiator, comprising:
means for communicating with the initiator;
a queue which holds a read command received from the initiator and has a predetermined size;
queued execution means for picking up and executing the read command from the queue;
immediate execution means for executing a write command received from the initiator immediately after reception; and
transfer request means for issuing a data transfer request to the initiator.

There is also provided a computer readable storage medium, which stores a communication control program for exchanging data by accessing a storage area from a target via a communication, the program comprising:
queue management means for queuing a spontaneous request from the target; and
command generation means for generating and transmitting read and write commands with respect to the storage area in response to a request from an application or the target so as not to exceed the number of read and write commands that can be held by the target.

There is also provided a computer readable storage medium, which stores a communication control program for exchanging data by accessing a storage area of an initiator connected via a communication, the program comprising:
queue management means for queuing a read command received from the initiator in a queue having a predetermined capacity;
queued execution means for picking up and executing the read command from the queue;
immediate execution means for executing a write command received from the initiator immediately after reception; and transfer request means for issuing a data transfer request to the initiator.

There is also provided a printing system using a communication control method in which an initiator transmits commands corresponding to read and write accesses to a storage area to a target so as not to exceed the number of read and write commands that can be held by the target, and the target holds the received read and write commands in different queues, and independently processes the held commands, wherein a host apparatus serving as an initiator is connected to a printer apparatus serving as a target, the printer apparatus receives print data from the host apparatus and prints out based on the received print data, and the host apparatus receives status information of the printer apparatus.

There is also provided a printing control apparatus for transmitting print data to a target, and receiving status information from the target, in a communication control method which comprises the queuing step of receiving a spontaneous request from the target and queuing the request in a queue, and the command generation step of generating and transmitting read and write commands to the storage area in response to a request from an application or the target so as not to exceed the number of read and write commands that can be held by the target.

There is also provided a printing apparatus for receiving print data from an initiator, and transmitting status information to the initiator, by a communication control method which comprises the queuing step of queuing a read command received from the initiator in a queue having a predetermined size, the queued execution step of picking up and executing a read command from the queue, the immediate execution step of executing a write command received from the initiator immediately after reception, and the transfer request step of issuing a data transfer request to the initiator.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a block diagram of an initiator (host computer);

FIGS. 3A and 3B show the general format of an ORB;

FIG. 4 shows the format of a QUEUE DEPTH command ORB;

FIG. 5 shows the format of a DATA TRANSFER command ORB;

FIG. 7 shows the format of a DIRECT STATUS RESPONSE command ORB;

FIG. 10 shows the format of a BASIC DEVICE STATUS command ORB;

FIGS. 11A and 11B show the general format of a status block;

FIG. 30 shows the format of a multi-channeled BASIC DEVICE STATUS command ORB;

FIGS. 33A to 33C show the general format of a multi-channeled status block;

FIG. 34 shows the format of a multi-channeled DATA TRANSFER status block;

FIG. 35 shows the format of a multi-channeled DIRECT status block;

DETAILED DESCRIPTION OF THE PREFERRED EMBODIMENTS

First Embodiment

Figure 40:
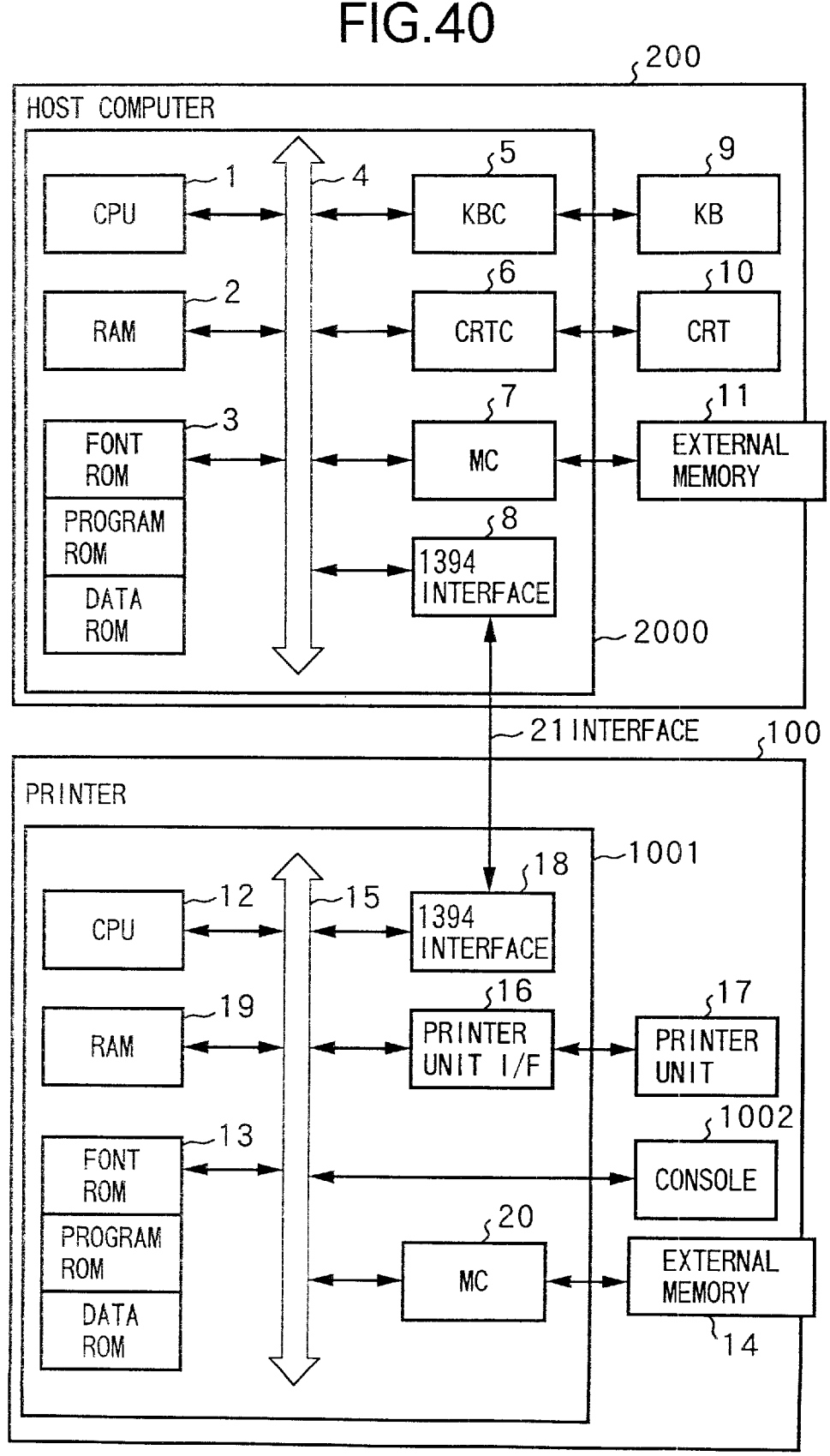
FIG. 40 is a block diagram showing the hardware arrangement of a printer system using an IEEE1394 interface.

A printing system which connects a host computer and printer via IEEE1394 will be described below as the first embodiment of the present invention. In this system, data transfer is done in accordance with a protocol according to the present invention (to be referred to as HPT hereinafter), which uses SBP-2 built on IEEE1394. FIG. 40 shows the hardware arrangement in that printing system.

<Hardware Arrangement of System>

In FIG. 40, a host computer 200 comprises a CPU 1 that processes documents including figures, images, characters, tables (containing table calculations and the like), and so forth on the basis of a document processing program stored in a program ROM area in a ROM 3. The CPU 1 systematically controls the respective devices connected to a system bus 4. The program ROM area of the ROM 3 stores a control program for the CPU 1 and the like, a font ROM area of the ROM 3 stores font data and the like used in the document processing, and a data ROM area of the ROM 3 stores various data used upon executing the document processing and the like. A RAM 2 serves as a main memory, work area, and the like of the CPU 1. Programs may be stored in the RAM 2. On the RAM 2, a transmission data buffer and a system memory for storing ORBs are assured.

A keyboard controller (KBC) 5 controls key inputs from a keyboard 9 and a pointing device (not shown). A CRT controller (CRTC) 6 controls display on a CRT display (CRT) 10. A memory controller (MC) 7 controls accesses to an external memory 11 such as a hard disk (HD), floppy disk (FD), and the like that store a boot program, various application programs, font data, user file, edit file, and so forth. A 1394 interface 8 is connected to a printer 100 according to the IEEE1394 standard, and implements communication control with the printer 100. Note that the CPU 1, for example, maps (rasterizes) outline font data onto a display information RAM area allocated on the RAM 2 to realize a WYSIWYG environment on the CRT 10. The CPU 1 opens various registered windows on the basis of commands designated by a mouse cursor (not shown) or the like, and executes various kinds of data processing.

In the printer 100, a printer CPU 12 systematically controls accesses to various devices connected to a system bus 15 on the basis of a control program stored in a program ROM area of a ROM 13 or a control program stored in an external memory 14, and outputs an image signal as output information to a printer unit (printer engine) 17 connected via a printer unit interface 16. The program ROM area of the ROM 13 also stores a control program for the CPU 12, that implements various agents (to be described later). A font ROM area of the ROM 13 stores font data and the like used upon generating the output information, and a data ROM area of the ROM 13 stores information and the like used on the host computer in case of the printer which has no external memory 14 such as a hard disk or the like. The CPU 12 can communicate with the host computer via a 1394 interface 18, and can inform the host computer 200 of information and the like in the printer.

A RAM 19 serves as a main memory, work area, and the like of the CPU 12, and its memory capacity can be expanded using an option RAM connected to an expansion port (not shown). Note that the RAM 19 is used as an output information mapping area, environment data storage area, NVRAM, and the like.

A memory controller (MC) 20 controls accesses to the above-mentioned external memory 14 such as a hard disk (HD), IC card, or the like. The external memory 14 is connected as an option, and stores font data, emulation program, form data, and the like. A control panel (console) 1002 is provided with operation switches, LED indicators, and the like. The number of external memories is not limited to one, and the printer may comprise more than one external memories, so that a plurality of external memories including an option font card including option fonts in addition to internal fonts, an external memory that stores programs for interpreting other printer control languages, and the like may be connected. Furthermore, an NVRAM (not shown) may be added, and may store printer mode setup information from the control panel 1002.

<Arrangement of Initiator>

Figure 1:
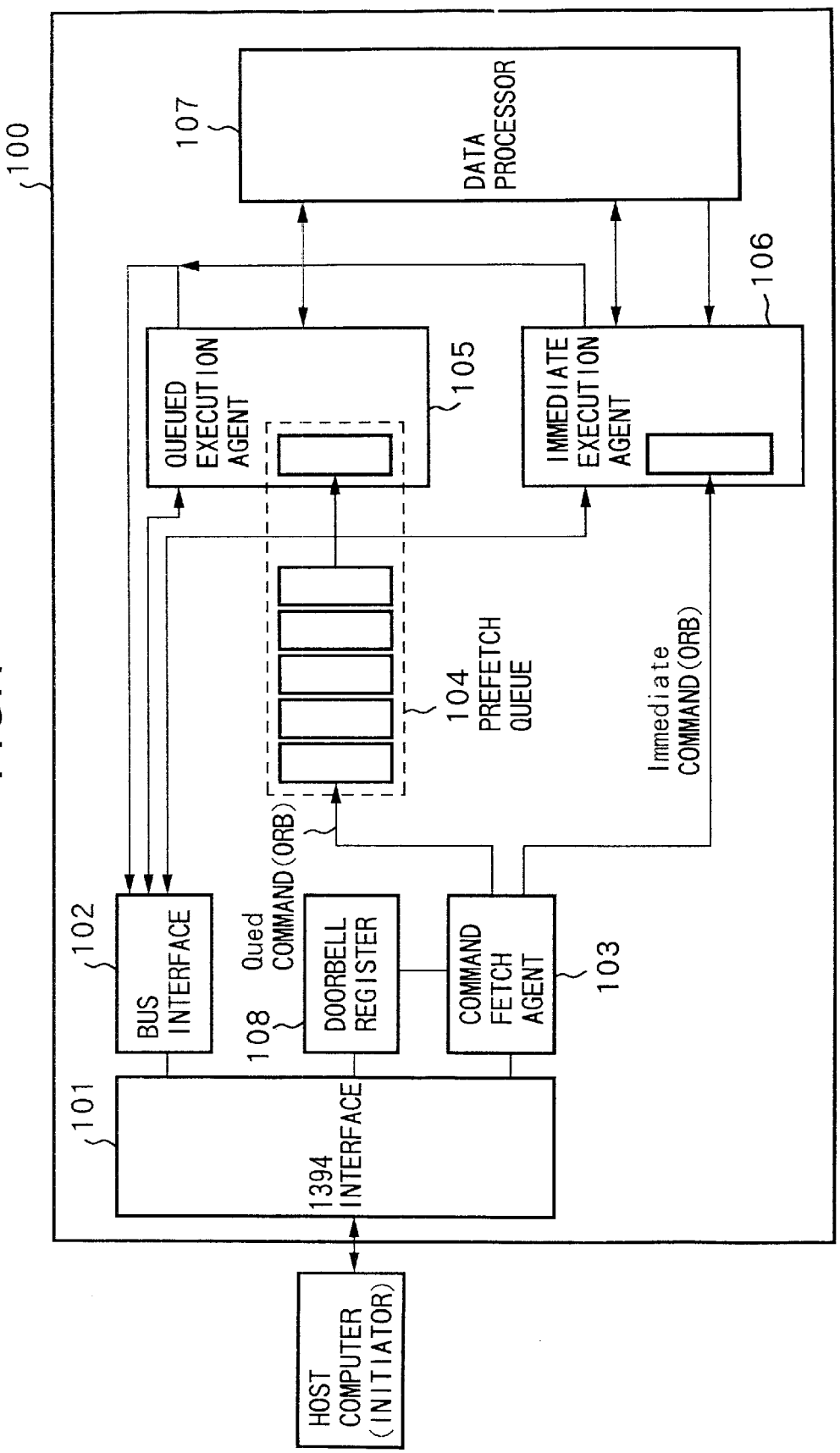
FIG. 1 is a block diagram of a target (printer)

FIGS. 1 and 2 show a communication system which uses the printer 100 as a target, and the host computer 200 as an initiator in the above-mentioned hardware arrangement. In this embodiment, such arrangements are implemented when the CPUs in the host computer and printer execute predetermined programs. The initiator shown in FIG. 2 will be described first.

In FIG. 2, in the host computer serving as the initiator, a printer driver 209 as an application issues a data transfer request to a printer via an HPT processor 203, and receives a response (reply) from the printer.

The HPT processor 203 includes an ORB manager 206. The ORB manager 206 manages ORBs generated in a system memory 208. An ORB is a block that stores the address, size, and the like of a data buffer to be transferred from the host computer to the printer and vice versa. ORBs are linked in turn to form an ORB list. For these ORBs, the following processing rules are defined:

(1) ORBs in the ORB list are processed in turn in the FIFO order. Upon reception of a completion message (status block), the corresponding ORB is deleted from the ORB list.

(2) A newly generated ORB is added to the end of the ORB list.

(3) The maximum number of ORBs that can be linked to the ORB list is the same as the total capacity of two queues in the printer, as will be described later.

In order to implement item (3), the ORB manager 206 prepares two counters in correspondence with the two queues of the printer. One counter is named CurrentQuedQUE, and indicates the current number of empty positions in the prefetch queue (to be described later) in the printer. The other counter is named CurrentImmediateQUE. The queue capacity corresponding to this counter is 1 in this embodiment, and only an entry which is being processed can be queued. The contents of these counters are incremented/decremented in correspondence with generation/deletion of ORBs.

When the host computer generates an ORB, it writes an arbitrary value in a register called a DOORBELL register to inform the printer of generation of an ORB. This procedure is specified in SBP-2, and is described in its manual or the like.

The HPT processor 203 includes a status queue 204 and queue processor 205. Status received via the 1394 interface is identified by a status identifier 202, and is directly sent to the ORB manager 206 or is added to the status queue 204 depending on the type of status. The status appended to the status queue 204 is processed by the queue processor 205 in the FIFO order. There are two types of status.

(1) Normal status . . . This status is a status block that notifies the data transfer result between the host computer and printer, and is directly sent to the ORB manager 206.

(2) Unsolicited status . . . This status is a status block indicating that asynchronous data to be transferred from the printer to the host computer has been generated, and is added to the status queue 204. Normally, this status is spontaneously issued by the printer.

These status types are discriminated by values written in status blocks.

A status register 210 is a register in which the printer writes data to indicate the presence of data to be read by the host computer.

The host computer serving as the initiator has the aforementioned functional arrangement.

<Arrangement of Target>

FIG. 1 is a block diagram showing the functional arrangement of the printer serving as the target.

In FIG. 1, a DOORBELL register 108 is a register in which the host computer writes data. Writing an arbitrary value in the DOORBELL register means generation of a new ORB. A command fetch agent 103 reads an ORB via a 1394 interface 101, and appends the read ORB to a prefetch queue 104 or sends it to an immediate execution agent 106 depending on its type. The type of command is determined with reference to a field indicating immediate or queued execution. However, in practice, this field corresponds to the function of command. For example, in this embodiment, a command for data transfer from the target to the initiator (REQUESTED READ command) and a command for capturing the target state are immediate execution commands, and a command for transferring print data from the initiator to the target or the like is a queued execution command.

A queued execution agent 105 and the immediate execution agent 106 read data from a buffer of the host computer or write data supplied from a data processor 107 in accordance with the contents of an ORB read by the command fetch agent 103. After that, these agents return normal status to the host computer.

Furthermore, the immediate execution agent 106 sends unsolicited status to the host computer in response to a data transfer request from the data processor 107 which performs rasterization for generating raster data by interpreting and executing PDL, and device management. A bus interface 102 is used for accessing a desired memory location on the system memory 208 of the host computer 200 from the printer 100.

In the system of this embodiment, the queued execution agent is used for data transfer ORBs from the host computer to the printer, and the immediate execution agent is used for data transfer ORBs from the printer to the host computer.

The arrangements and operations of the initiator and target have been briefly explained. Prior to a detailed description thereof, the contents of an ORB will be explained in detail below.

<Contents of Command ORB (Operation Request Block)>

FIGS. 3A and 3B show the general format of an ORB. In FIG. 3A, a "Next_ORB" (link) field 301 stores a link to the next ORB. If there is no next ORB, a predetermined value indicating it is stored. Note that the first ORB is indicated by a predetermined address register. A "data_descriptor" (data address) field 302 indicates address in the data buffer. A "d" (direction) field 303 indicates data transfer (0: write) from the host computer to the printer or data transfer (1: read) from the printer to the host computer. A "data_size" (data size) field 304 indicates the size of the data buffer indicated by the address field 302. These "Next_ORB" field 301 to "data_size" field 304 are those specified in SBP-2, and fields 305 to 308 to be described below are used in processing unique to HPT.

An "i" field (immediate bit) 305 indicates whether that ORB is to be executed by the immediate or queued execution agent in the target. If the value in that field is "0", i.e., the queued execution agent, the ORB is placed in the prefetch queue; if the value is "1", the ORB is processed by the immediate execution agent. A "function" (function) field 306 indicates the meaning of the ORB, as shown in FIG. 3B. This will be described in detail later. A "command_block_length" (command length) field 307 indicates the length of a "control_block" (control block) field 308. The control block field 308 stores various values in correspondence with the value in the function field 306.

The contents of an ORB will be explained in units of functions.

(QUEUE DEPTH command)

FIG. 4. shows a QUEUE DEPTH command ORB of function=0. This command is used for obtaining the depth of the prefetch queue 104 of the target. The immediate bit is set at "1".

A control block of this command includes two fields, i.e., a "source_ID" (source ID) field 401 and "status_queue_depth" (status queue depth) field 402. The source ID field stores the identifier of a process that has logged in the initiator. In the example shown in FIG. 2, the logged-in process is the printer driver. This field is added to allow the target to identify the process to respond when a plurality of processes have been logged in. The status queue depth field 402 informs the target of the depth of the status queue 204 of the initiator.

The status queue depth field is used for managing the number of unsolicited status blocks queued in the status queue in the target. The target manages the depth of the status queue in accordance with the generation/processing completion message of unsolicited status in the same manner as management of the prefetch queue by the initiator.

Upon reception of the QUEUE DEPTH command, the target stores the status queue length in a counter CurrentUnsolicitedQUE, and returns the prefetch queue length to the initiator. The initiator manages the number of ORBs queued in the target in correspondence with generation and deletion of ORBs on the basis of the queue depth of the prefetch queue obtained by this command.

(DATA TRANSFER command)

FIG. 5 shows a DATA TRANSFER command of function=1. This command is used upon transferring data from the initiator to the target. A "page_table_present" bit 501 indicates the presence of a page table. When a page table is present, the page size to be referred to by the page table is set in a "page_size" field 502. The data buffer to be transferred is indicated by this page table, an address 503, and a data size 504.

Upon reception of the DATA TRANSFER command, the target writes data in the designated data buffer or reads out data therefrom in accordance with the value in a direction field.

(REQUESTED READ command)

Figure 6:
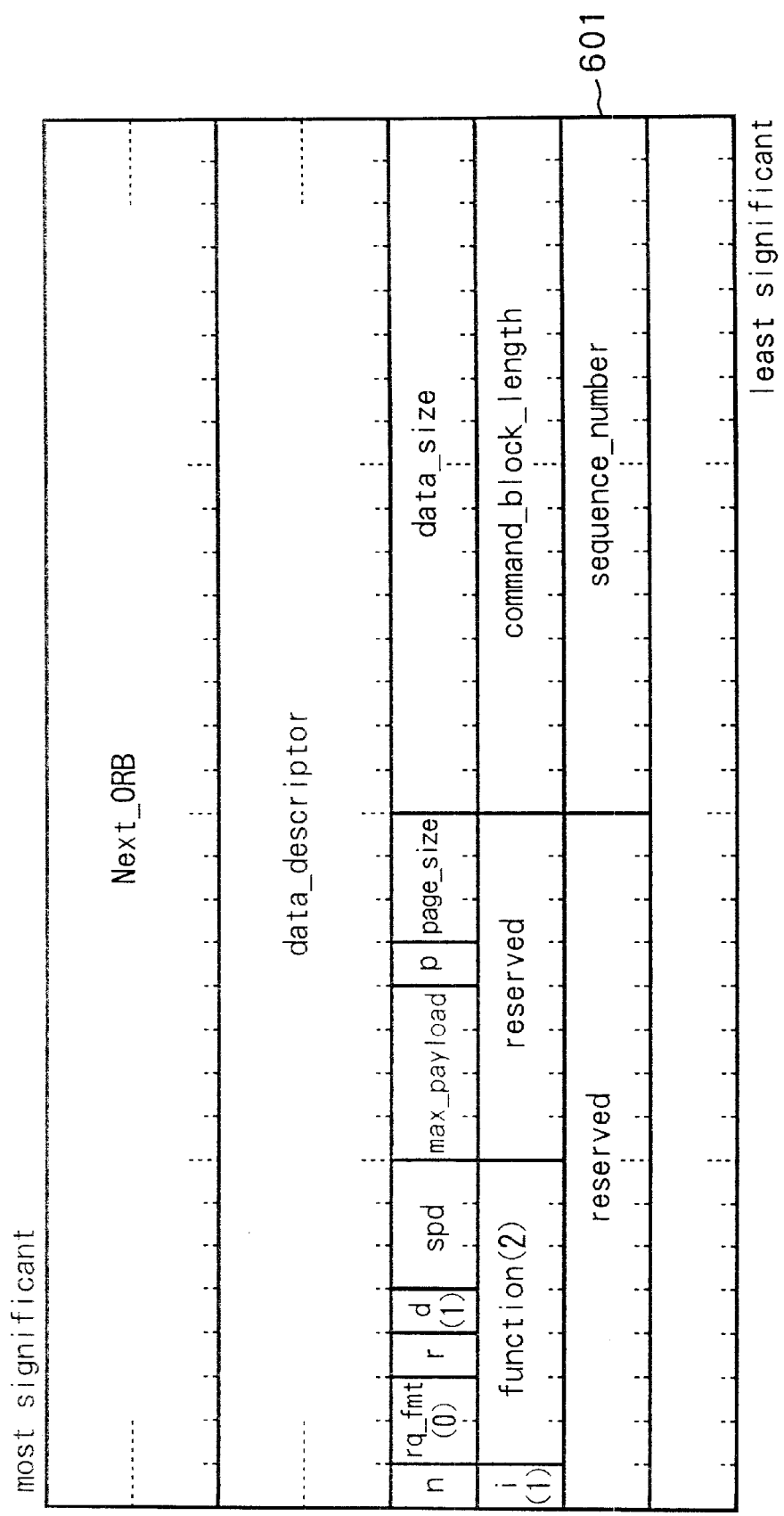
FIG. 6 shows the format of a REQUESTED READ command ORB.

FIG. 6 shows a REQUESTED READ command of function=2. This commands provides a data buffer in which data is to be written to the printer when "READ REQUEST status", i.e., a data transfer request from the printer as the target to the host is sent from the target. A "Sequence_number" (sequence number) field 601 is set with the same value as the sequence number appended to the corresponding READ REQUEST status, which instigated issuance of this command. This value is a number which makes REQUESTED READ status and REQUESTED READ command correspond to each other. The format of other fields is the same as that in the DATA TRANSFER command. In this command, the immediate bit is set at "1", and the direction bit is also set at "1" (read). The reason why the immediate bit is set at "1" is to immediately respond to READ REQUEST status issued by the target. The buffer size uses a value designated by READ REQUEST status.

Upon reception of the DATA TRANSFER command, the target writes data in the designated data buffer assured on the system memory of the initiator.

(DIRECT STATUS RESPONSE command)

FIG. 7 shows a DIRECT STATUS RESPONSE command ORB of function=3. This command is issued in response to READ REQUEST status when the initiator makes the target abdicate a read request. Alternatively, this command is used as a reply to the target in response to DIRECT status from the target. A "sequence_number" (sequence number) field 701 is set with the same value as the sequence number appended to the corresponding READ REQUEST status or DIRECT status, which instigated issuance of this command. The format of other fields is the same as that in the DATA TRANSFER command. In this command, the immediate bit is set at "1".

Upon reception of the DIRECT STATUS RESPONSE command, the target abdicates a read request if it has issued the READ REQUEST status having the corresponding sequence number.

(ACQUIRE DEVICE RESOURCE command)

Figures 8A, 8B:
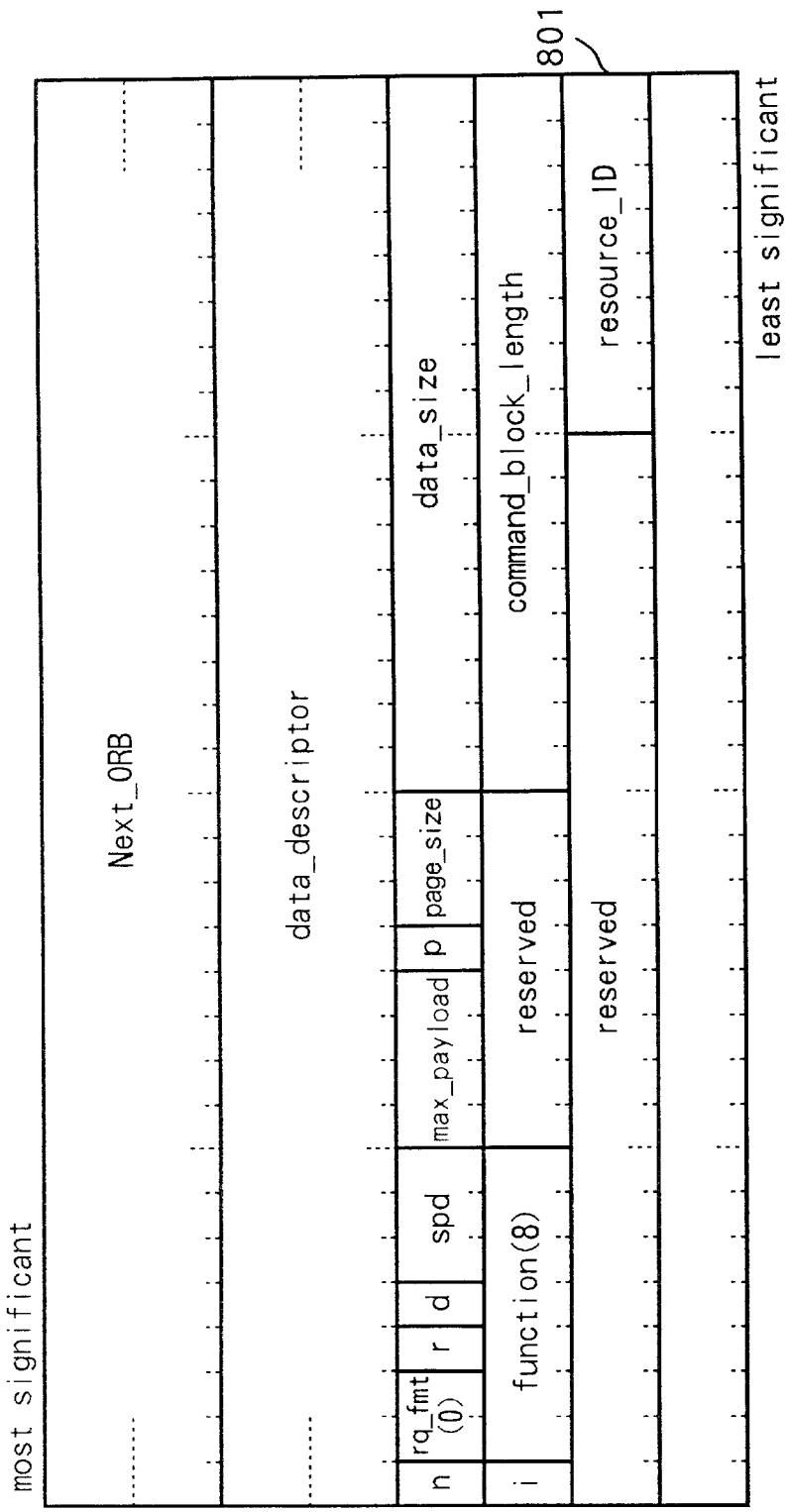
FIGS. 8A and 8B show the format of an ACQUIRE DEVICE RESOURCE command ORB.

FIG. 8A shows an ACQUIRE DEVICE RESOURCE command ORB of function=8. The meaning of a "resource_ID" (resource ID) field 801 is as shown in FIG. 8B. "0" is a value that depends on the device class used and logical unit characteristics. In this system, "0" indicates the printer as a device class and print service as logical unit characteristics.

Upon receiving this ACQUIRE DEVICE RESOURCE command, the target assigns the resource designated by the resource ID to the initiator as the sender of this command.

(RELEASE DEVICE RESOURCE command)

Figure 9:
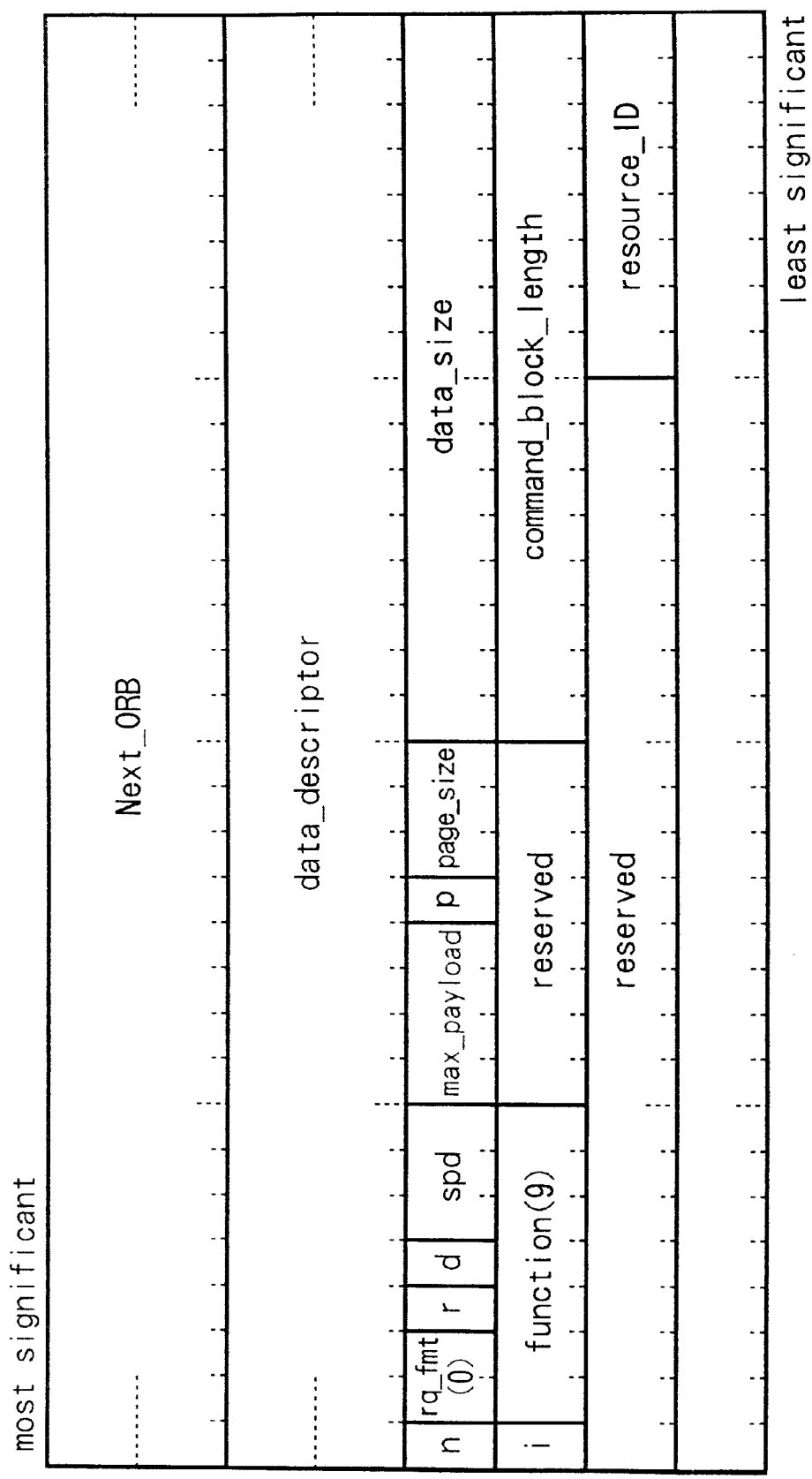
FIG. 9 shows the format of a data resource release command ORB.

FIG. 9 shows a RELEASE DEVICE RESOURCE command of function=9. The meaning of a "resource_ID" (resource ID) field 801 is as shown in FIG. 8B.

Upon receiving the RELEASE DEVICE RESOURCE command, the target releases the resource designated by the resource ID.

(BASIC DEVICE STATUS command)

FIG. 10 shows a BASIC DEVICE STATUS command ORB of function=A (Hex).

Upon reception of this command, the target replies its own status to the initiator while encapsulating it in a basic device status block. By issuing this command, the initiator can recognize the printer status. In the printer, for example, various kinds of status information related to the printer such as the paper size, emulation supported, and the like are sent back from the target as basic status.

<Contents of Status Block>

Figure 11A:
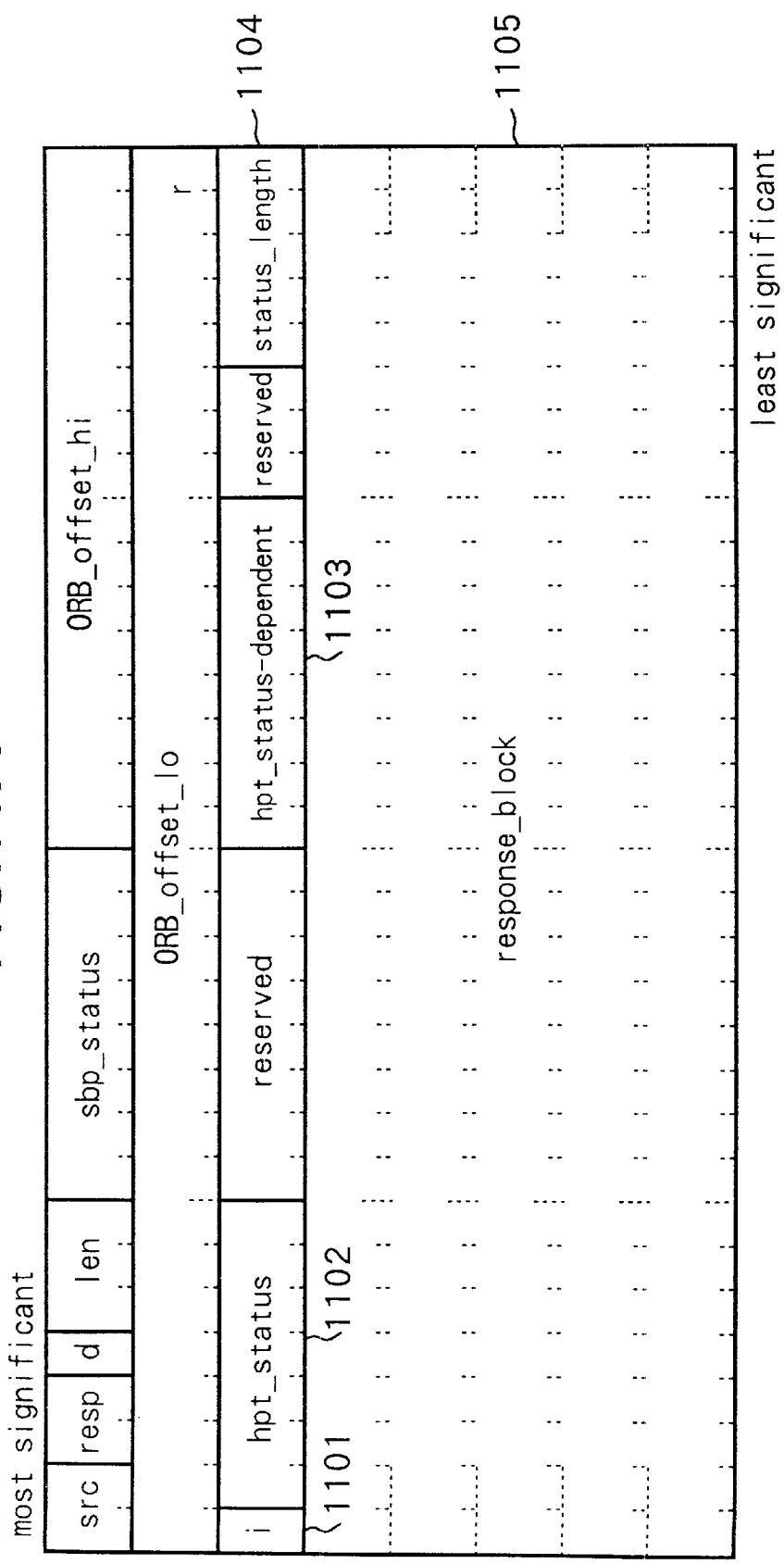

FIGS. 11A and 11B show a status block sent back from the printer as the target to the host computer as the initiator. A status block is prepared in correspondence with each aforementioned command ORB. The status block is issued by the queued and immediate execution agents of the target.

In FIG. 11A, the first field to "ORB_offset_lo" field are specified in SBP-2, and include fields for indicating a command ORB corresponding to status, and the like. An "i" (immediate bit) field 1101 indicates which one of the queued and immediate execution agents issued this status. If the value is "0", it indicates that the status was issued by the queued execution agent; if the value is "1", it indicates that the status was issued by the immediate execution agent. An "hpt_status" (hpt status) field 1102 indicates the type of status block, as shown in FIG. 11B. An "hpt_status_dependent" field 1103 is given its value depending on hpt status. A "status_length" (status length) field 1104 indicates the length of a response block 1105. The status blocks will be explained below in units of types.

(QUEUE DEPTH status block)

Figure 12:
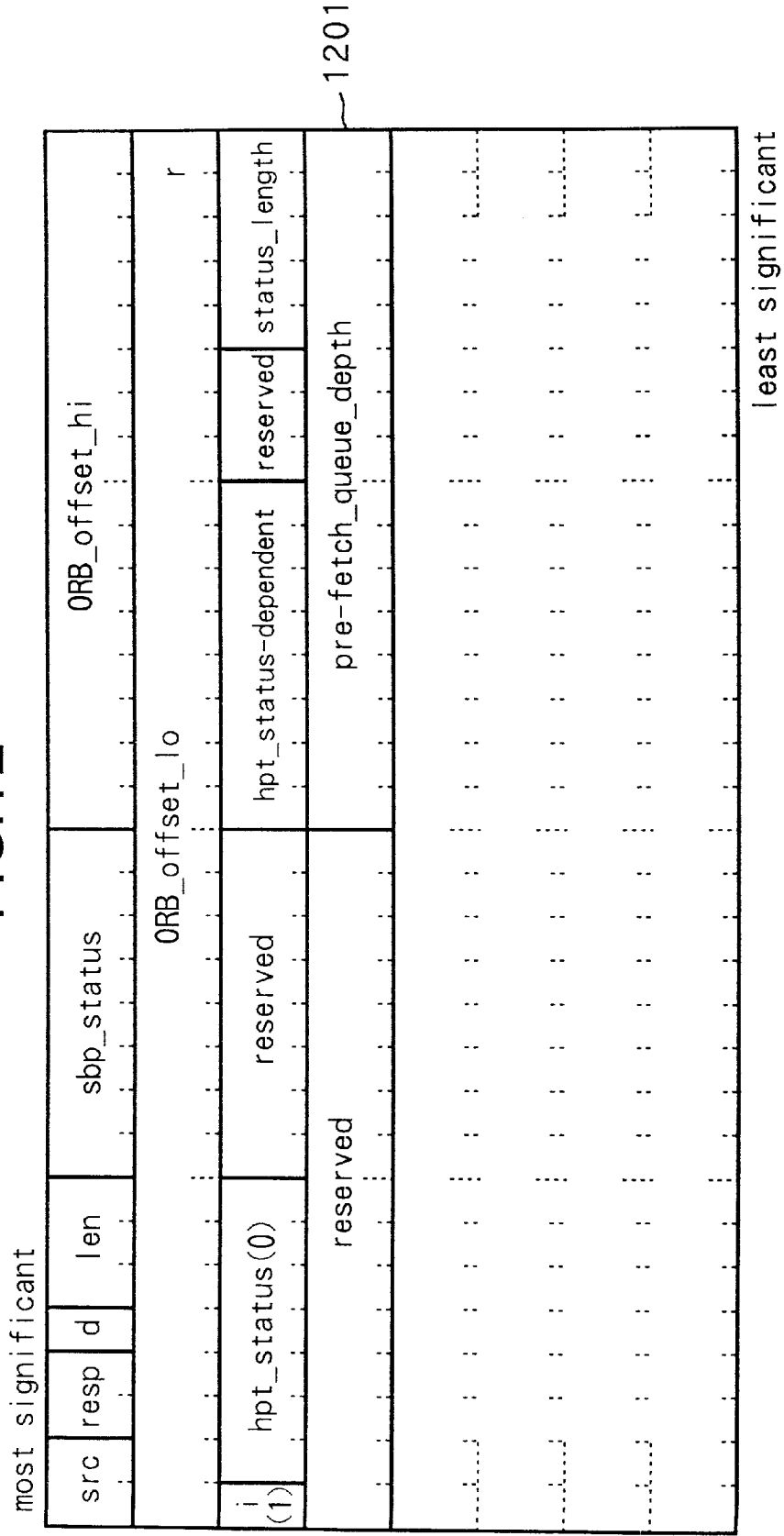
FIG. 12 shows the format of a QUEUE DEPTH status block.

FIG. 12 shows QUEUE DEPTH status of hpt status=0. The QUEUE DEPTH status is a reply from the target in response to the QUEUE DEPTH command, and the target sets the depth of the prefetch queue 104 in a "prefetch_queue_depth" field 1201 and sends back the status to the initiator. With this status, the initiator can detect the size of the prefetch queue, and manages the number of ORBs generated in correspondence with the size.

(DATA TRANSFER status block)

Figure 13:
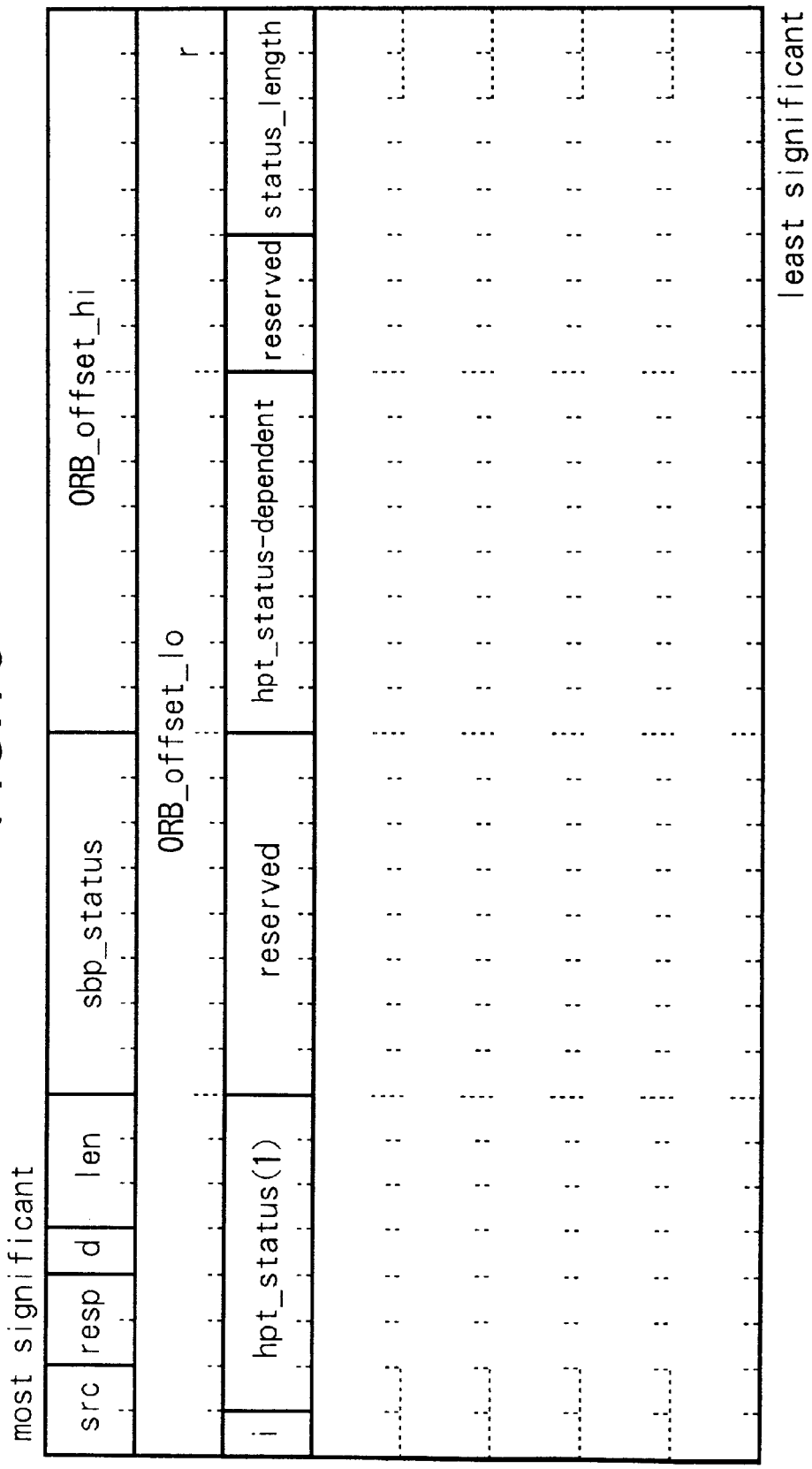
FIG. 13 shows the format of a DATA TRANSFER status block.

FIG. 13 shows DATA TRANSFER status of hpt status=1. The DATA TRANSFER status is a reply from the target in response to the DATA TRANSFER command, and is issued by the target upon completion of processing of the DATA TRANSFER command ORB. Upon reception of this status, the initiator can detect that one ORB has been processed and deleted from the queue of the target.

(READ REQUEST status block)

This status is hpt status=2 (its format is not shown), and has the data buffer size to be assured by the initiator in a response block. Normally, the target issues this status not in response to the command ORB but spontaneously. The initiator issues the above-mentioned REQUESTED READ command ORB in response to this READ REQUEST status. The procedure for this process will be described later.

(DIRECT status block)

This status is hpt status=3 (its format is not shown), and includes status of application level (i.e., the data processor in the target) in a response block. More specifically, data exchange on the application level is normally done using the ORB and data buffer linked thereto. However, when data is very small and falls within the upper limit (24 bytes in this embodiment) of the response block, an application-level reply is encapsulated in an HPT-level reply. In response to this status, the initiator issues the DIRECT STATUS RESPONSE command ORB.

(DEVICE RESOURCE ACQUIRE status block)

This status is hpt status=8 (its format is not shown), and is issued by the target that has received the ACQUIRE DEVICE RESOURCE command and processed it.

(DEVICE RESOURCE RELEASE status block)

This status is hpt status=9 (its format is not shown), and is issued by the target that has received the RELEASE DEVICE RESOURCE command and processed it.

(BASIC DEVICE status block)

This status is hpt status=A (Hex) (its format is not shown), and is issued by the target upon reception of the BASIC DEVICE STATUS command. This status is set with predetermined device status.

The commands and status blocks used in the printing system of this embodiment have been described. The data exchange procedures in the initiator and target will be explained below.

<Data Transfer Request Processing from Initiator>

Figure 14:
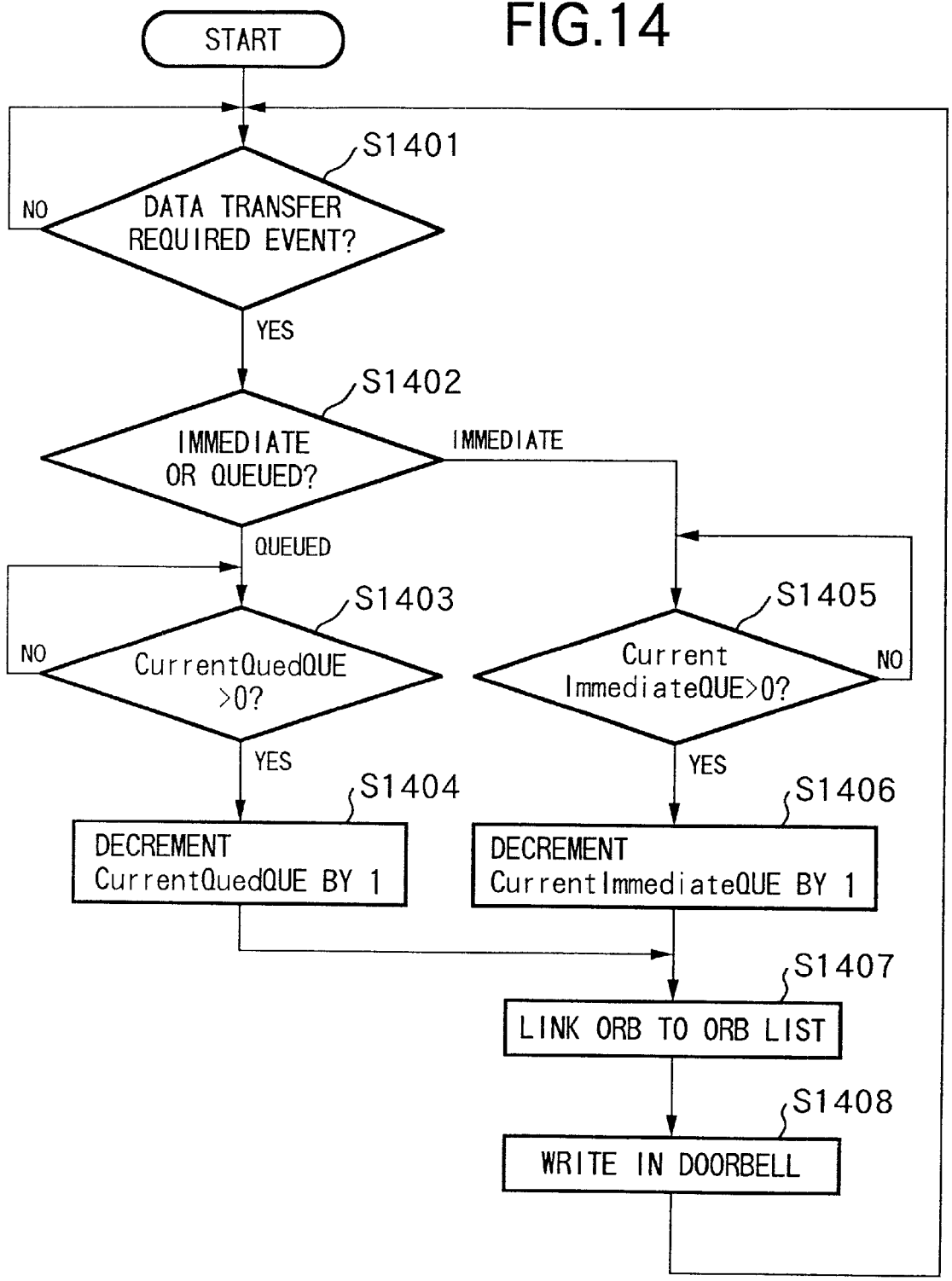
FIG. 14 is a flow chart showing the processing procedure executed by the initiator in response to a generated data transfer request.

FIG. 14 shows the procedure for informing the printer of generation of a command ORB in response to a data transfer request from the host computer to the printer or vice versa in the host computer.

A data transfer request from an application such as the printer driver or the like is monitored in step S1401. The data transfer request may be the one that informs the host computer of the presence of data to be transferred directly from an application such as a printer driver or may be the one that was generated in accordance with a data read request from the printer. Note that status that the printer sends to the host computer asynchronous with the host computer will be referred to as Unsolicited status hereinafter. On the other hand, status which is returned as a processing completion message of a command ORB from the host computer will be referred to as normal status hereinafter.

Upon detection of a data transfer request, it is determined in step S1402 if data transfer is executed by a queued or immediate execution command. If data transfer is executed by an immediate execution command, the immediate bit of an ORB is set. When an ORB is issued in response to Unsolicited status from the printer, data transfer is executed by an immediate execution command; when an ORB is issued in response to a data transfer request from the application of the host computer, data transfer is executed by a queued execution command.

In case of queued execution, it is checked in step S1403 if the counter CurrentQuedQUE is "0". Upon power ON or resetting, the depth of the prefetch queue of the printer is read by the QUEUE DEPTH command, and is set as the default value of the counter CurrentQuedQUE. More specifically, the counter CurrentQuedQUE counts the current number of empty positions in the prefetch queue. If it is determined in step S1403 that the number of empty positions is "0", since the prefetch queue of the target is not empty, the control waits until the queue has an empty position. If an empty position is found, the value of the counter CurrentQuedQUE is decremented by 1 in step S1404, and a data transfer ORB is generated and is linked to the ORB list in step S1407. After that, an arbitrary value is written in the DOORBELL register 108 of the printer in step S1408, thus informing the target of generation of a new ORB.

On the other hand, if it is determined in step S1402 that data transfer is done by an immediate execution command, it is checked in step S1405 if the value of the counter CurrentImmediateQUE is larger than "0". Note that no queue is prepared for the immediate execution agent of the target and, hence, the maximum value of this counter is "1". Therefore, the counter CurrentImmediateQUE is set at "1" upon resetting. If the value of the counter CurrentImmediateQUE is larger than "0", the value of the counter is decremented by 1 in step S1406. Then, an ORB is linked to the ORB list to write a doorbell.

Figure 15:
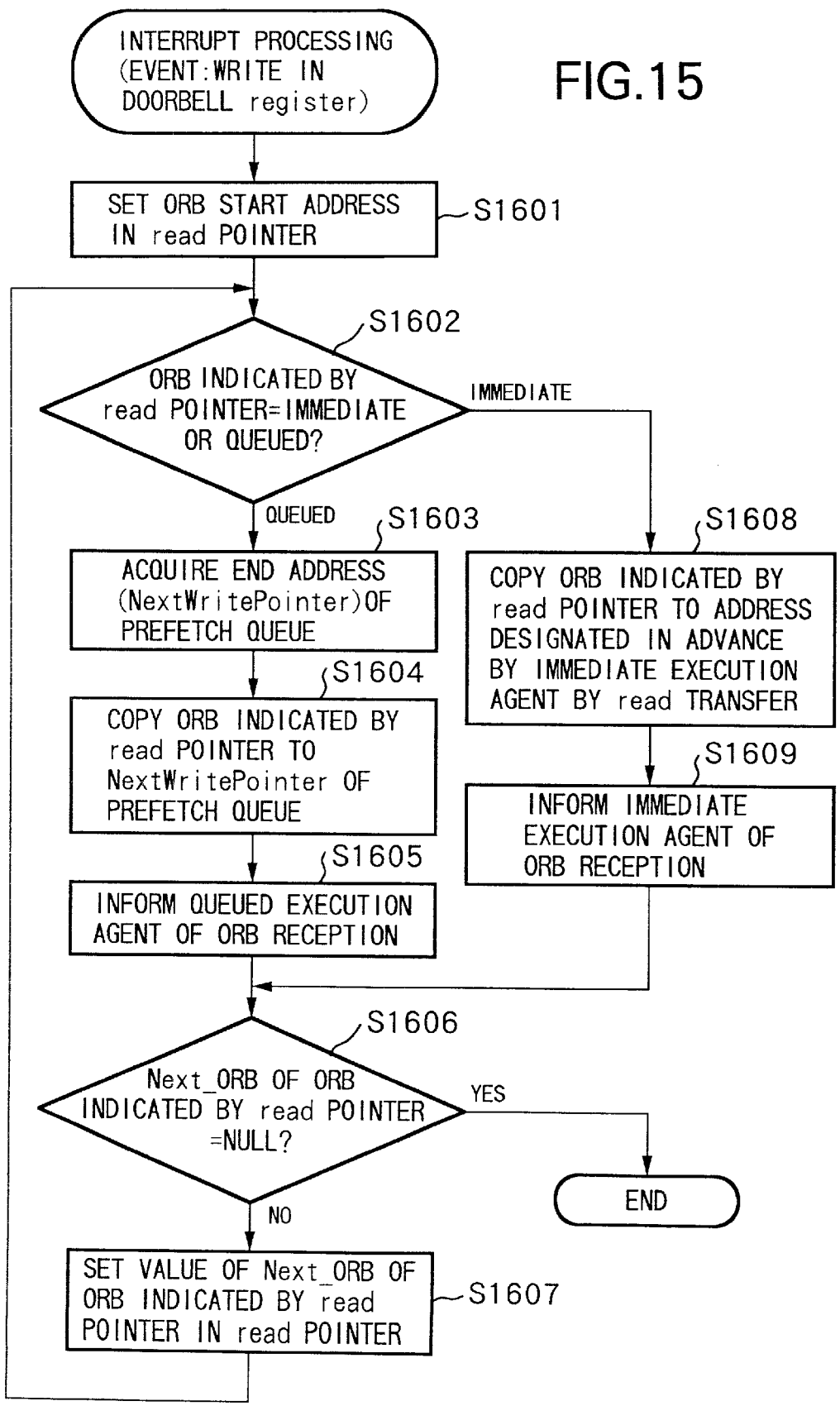
FIG. 15 is a flow chart showing the processing procedure executed by a fetch agent of the target upon write in a DOORBELL register.

Upon write in the DOORBELL register in this way, the fetch agent fetches an ORB into the target in the procedure shown in FIG. 15.

<Processing by Fetch Agent>

FIG. 15 shows the processing procedure executed by the fetch agent of the target upon write in the DOORBELL register 108.

Upon write in the DOORBELL register 108, the address of the first linked ORB in the system memory is set at a read pointer in step S1601.

In step S1602, the immediate bit of the ORB indicated by the read pointer is tested to check if it is an immediate or queued execution command. If the ORB of interest is a queued execution command, the end address (NextWritePointer) of the prefetch queue 104 is acquired in step S1603. Since the host computer writes a doorbell after having confirmed an empty position of the prefetch queue, the queue surely has an empty position.

The ORB indicated by the read pointer is copied to the end of the prefetch queue in step S1604, and the fetch agent informs the queued execution agent of ORB reception in step S1605. It is then checked in step S1606 if the "Next_ORB" field (link field to the next ORB) of the ORB indicated by the read pointer is NULL, i.e., if a linked ORB is present. If that field is NULL, the flow ends; otherwise, the address of that linked ORB is set at the read pointer to repeat the flow from step S1602.

On the other hand, if it is determined in step S1602 that the ORB is an immediate execution command, that ORB is copied to the address indicated by the immediate execution agent in advance in step S1608. After that, the fetch agent informs the immediate execution agent of ORB reception in step S1609, and the flow advances to step S1606.

Figure 16:
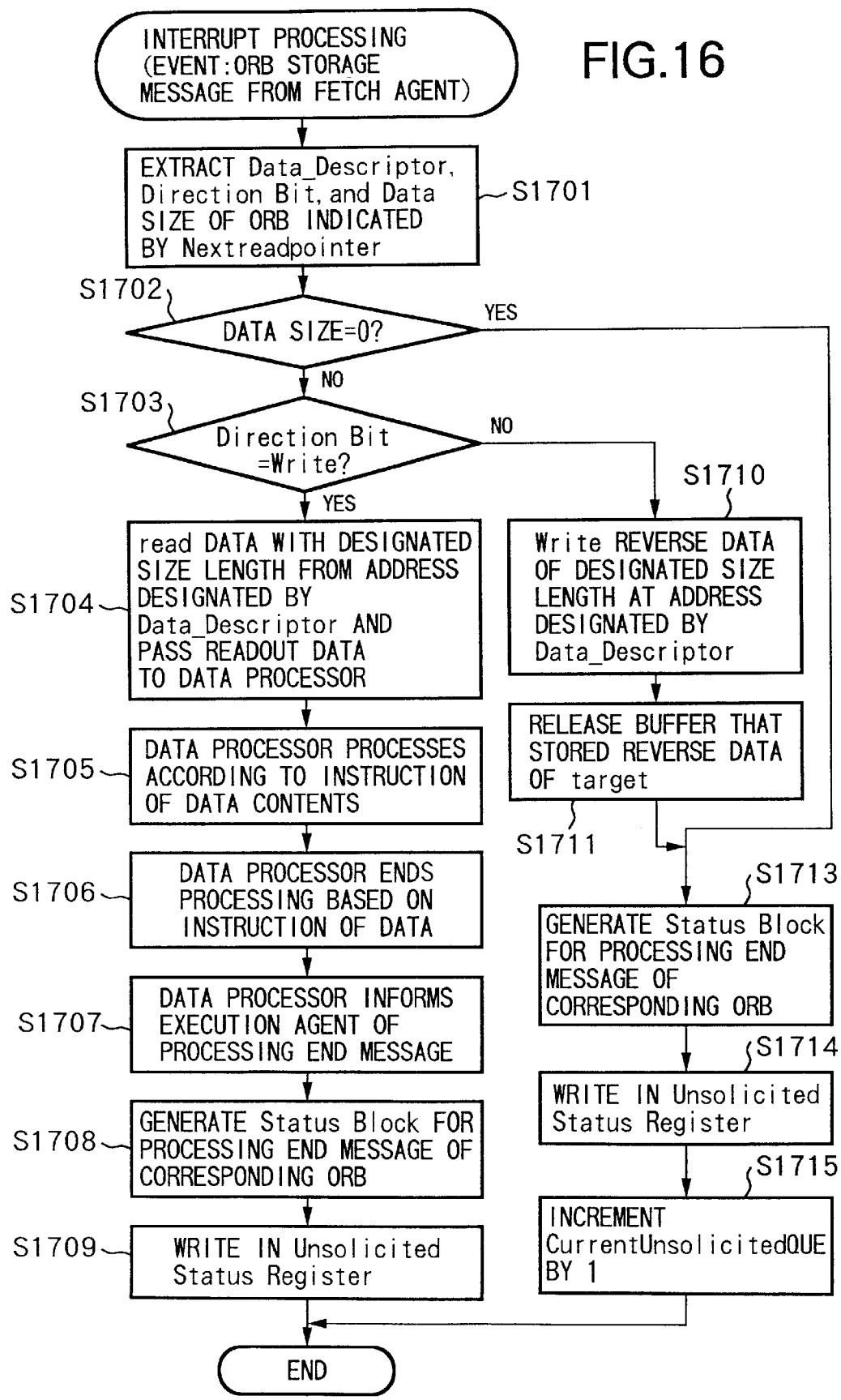
FIG. 16 is a flowchart showing the processing procedure executed by an execution agent upon reception of an ORB message from the fetch agent.

In this manner, the ORB is fetched into the target to inform each execution agent of ORB reception. Then, the ORB is processed by the procedure shown in FIG. 16.

<Processing by Execution Agent>

There are two types of execution agents, i.e., the immediate and queued execution agents, but they process ORBs by the same procedure. Hence, their processing will be described simultaneously using FIG. 16.

When the execution agent is informed of ORB reception from the fetch agent, it extracts the values of the data address field, direction bit, and data size field of the ORB indicated by Nextreadpointer in step S1701. Note that Nextreadpointer is a pointer which is stored in the queue and indicates the ORB that the execution agent is about to process. This pointer indicates the first ORB in the prefetch queue in case of the queued execution agent.

It is checked in step S1702 if the extracted data size is "0". If the size is not "0", it is checked in step S1703 if the direction bit (Direction bit) indicates a write or read. If the direction bit indicates a write, the execution agent reads out data designated by the data address and size from the system memory of the initiator and passes the readout data to the data processor 107 in step S1704.

The data processor processes the passed data in steps S1705 to S1707. For example, PDL data is interpreted and rasterized in case of the printer. In step S1707, the execution agent is informed of the end of processing.

Upon informing of the end of processing in the data processor, the execution agent generates a DATA TRANSFER status block (normal status) as a message indicating the end of processing of the ORB of interest in step S1708, and writes that message in the status register 210 to inform the initiator of the status in step S1709.

On the other hand, if it is determined in step S1703 that the direction bit of the ORB indicates a read, the execution agent writes data in a data buffer designated by the data address field and data size field of the ORB in step S1710. The data written by the target is called reverse data. The reverse data to be written has been generated by the data processor 107 or the like and stored in a buffer. For example, the reverse data is data of more than 24 bytes such as a built-in font list of the printer.

In step S1711, the buffer that stored the data which has been written is released.

Upon completion of processing, the execution agent generates a status block (normal status) of a processing completion message in step S1713, and writes a predetermined value in the status register to inform the host computer of the status block message in step S1714.

Lastly, in step S1715, the execution agent increments the value of the counter CurrentUnSolicitedQUE by 1. Upon reception of a QUEUE DEPTH command, the value stored in its "status_quedepth" field is set as the default value of the counter CurrentUnSolicitedQUE. The contents of this counter are incremented/decremented in correspondence with transmission of an Unsolicited status block and its processing completion message to indicate the number of empty positions of the status queue 204. The counter CurrentUnsolicitedQUE is counted under the following condition:

Count-down condition (1) Upon transmission of an Unsolicited status block, the counter is decremented by 1. In the initiator, unsolicited status alone is queued in the status queue 204.

Count-up condition (1) Upon transmission of a processing completion status block of a REQUESTED READ ORB, the counter is incremented by 1. Upon reception of this status, the initiator removes the processed status block from the status queue 204.

(2) Upon transmission of a processing completion status block for an ORB with the data size=0, the counter is incremented by 1. In other words, upon transmission of a status block for a DIRECT STATUS RESPONSE ORB, the counter is incremented by 1. Upon reception of this status, the initiator removes the processed status block (direct status) from the status queue 204.

If it is determined in step S1702 that the data size is "0", since there is no data to be processed, the execution agent returns a status block without any processing to send a processing completion message in step S1713.

Figure 17:
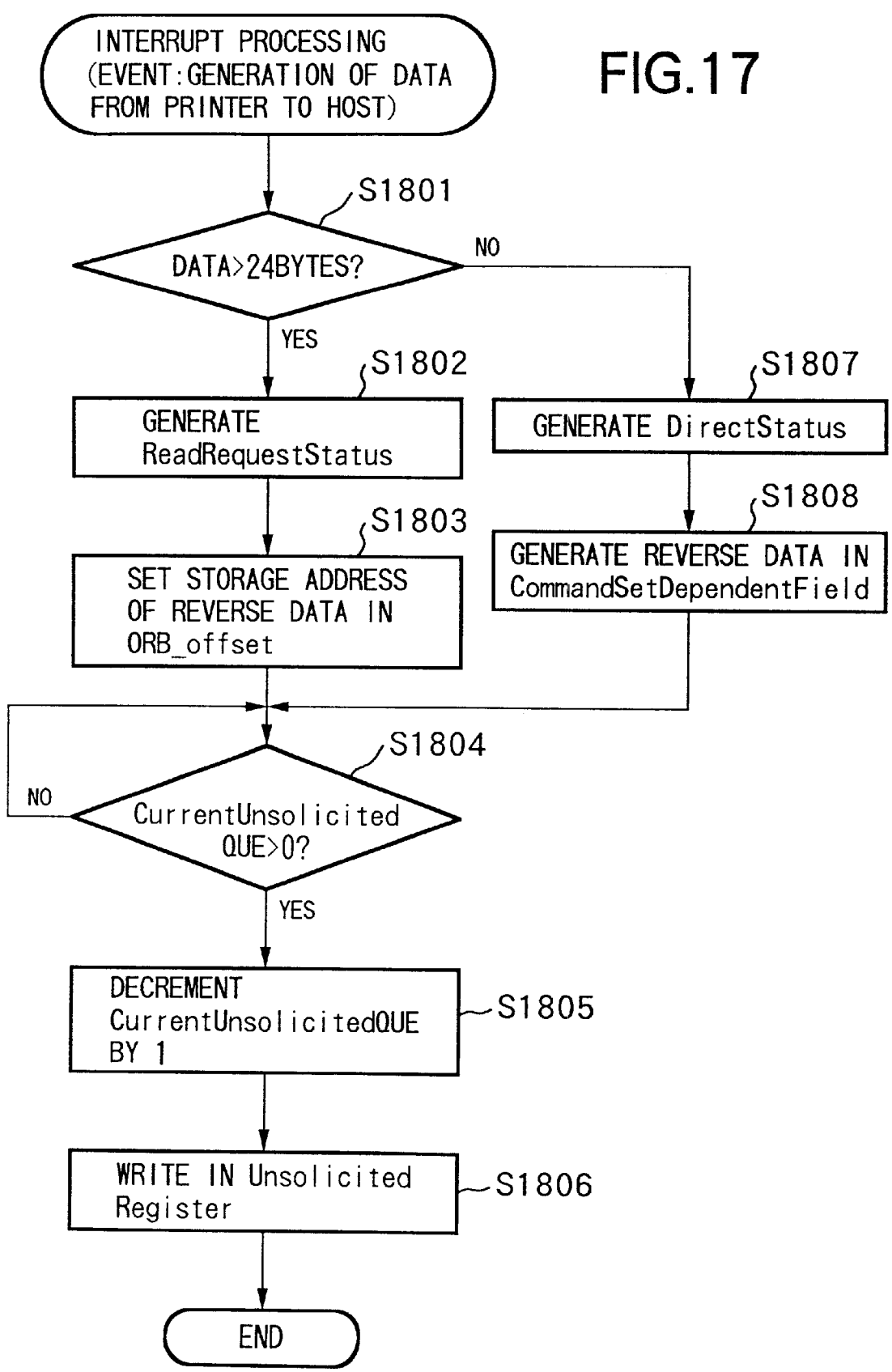
FIG. 17 is a flow chart showing the processing procedure executed by the target in response to a generated data transfer request.

With the aforementioned procedures, generation of an ORB by the initiator, and its processing and generation of a status block by the target are done. Data transfer in response to Unsolicited status transmitted from the printer to the host computer will be explained below with reference to FIGS. 17 and 18.

<Issuance of Unsolicited Status in Target>

Some kinds of information must be immediately informed from the printer to the host computer, for example, when errors such as out-of-paper, jam, and the like have occurred in the printer. In such case, the printer spontaneously transfers data to the host computer asynchronously with commands from the host computer. If data to be sent from the printer is generated, the data processor informs the immediate execution agent of the presence of such data, thus starting the processing in FIG. 17.

It is checked in step S1801 if the data to be transmitted to the host computer exceeds 24 bytes. Note that 24 bytes are the upper limit of the data volume that can be stored in the response block of the status block.

If the data exceeds the upper limit value, a READ REQUEST status block (Unsolicited status) is generated in step S1802, and the storage address of reverse data is set in the "ORB_offset" field of that status block in step S1803. At this time, the size of the reverse data is also written in the status block.

It is checked in step S1804 if the value of the counter CurrentUnsolicitedQUE is larger than "0", i.e., the status queue has an empty position. If NO in step S1804, after the control waits until the queue has an empty position, the value of the counter CurrentUnsolicitedQUE is decremented by 1 in step S1805, and an appropriate value is written in the status register in step S1806.

On the other hand, if the data is equal to or smaller than 24 bytes, since that data can be sent to the host computer while being encapsulated in the status block, DIRECT status (Unsolicited status) is generated, and reverse data is stored in its Command set dependent field. After that, the flow branches to step S1804.

In this fashion, the Unsolicited status is sent to the initiator.

Figure 18:
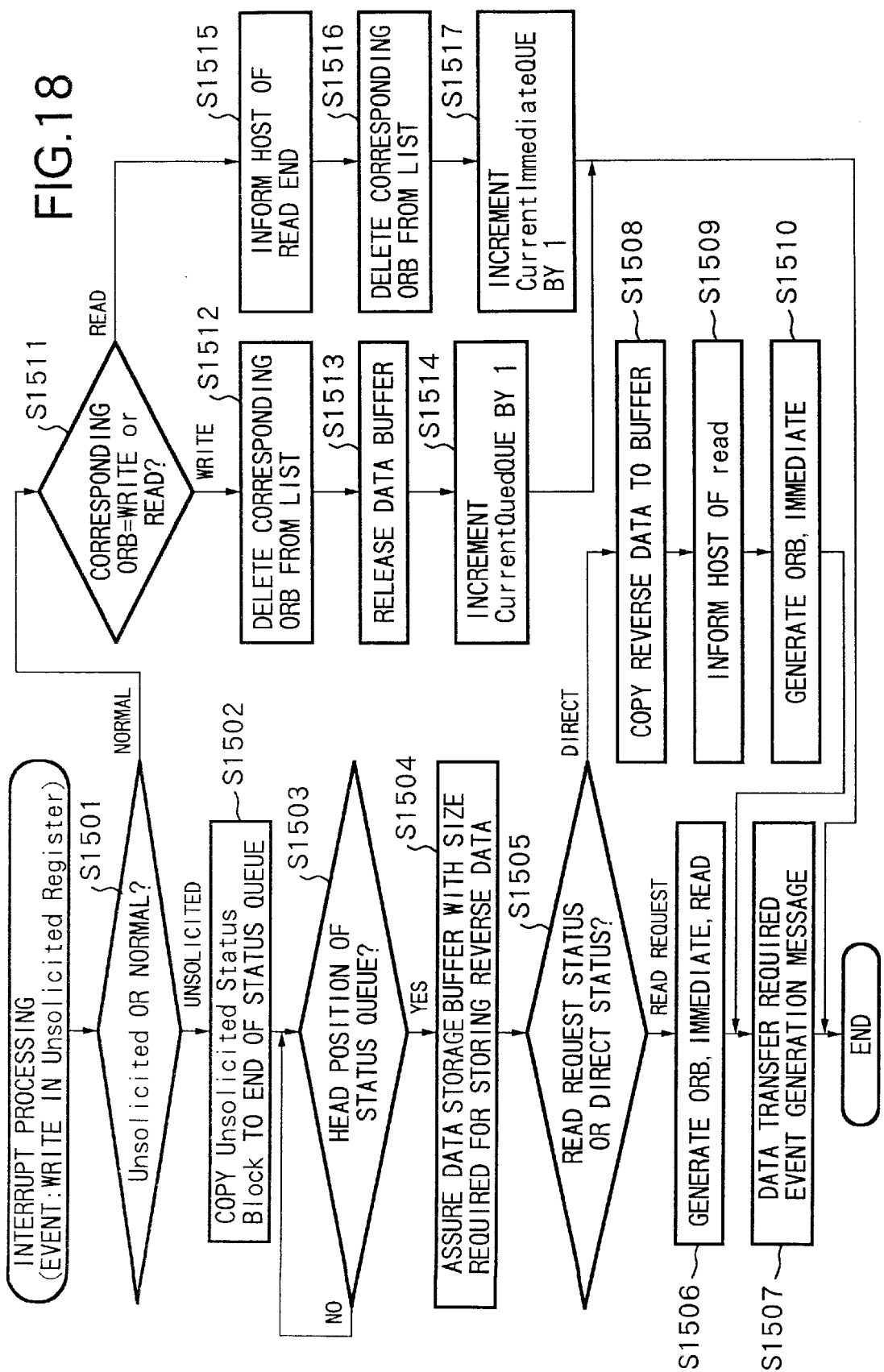
FIG. 18 is a flow chart showing the processing procedure executed by the initiator upon write in a status register.

Upon reception of the status, the initiator processes it by the procedure shown in FIG. 18.

<Status Processing by Initiator>

This processing is started by an interrupt that is produced upon setting a predetermined value in the status register. Multiple interrupts are permitted; an interrupt is generated every time the value is set in the status register.

In step S1501, it is checked if status is normal or Unsolicitedstatus. If the status is unsolicited status, the status block is read out from the target, and is copied to the end of the status queue in step S1502. It is checked in step S1503 if the block of interest has moved to the head position of the queue. If YES in step S1503, a buffer for storing reverse data is assured in step S1504, and it is checked in step S1505 if the status is READ REQUEST or DIRECT status.

If the status is READ REQUEST status, a REQUESTED READ command ORB is generated in step S1506. The generated ORB is set with the "immediate" flag, and its direction flag indicates a read. Also, the address of the buffer that stores data to be read out is written in the ORB. After that, the process shown in FIG. 14 is informed that an event which requires data transfer has taken place in step S1507. The process shown in FIG. 14 sends the ORB generated in step S1506 to the target, and the data from the target is written in the data buffer, thus attaining data transfer.

If it is determined in step S1505 that the status is DIRECT status, reverse data in that status is copied to the assured buffer in step S1508, and is passed to a host process such as an application or the like instep S1509. After that, a DIRECT STATUS RESPONSE ORB (immediate bit is set at "immediate") is generated in step S1510. At this time, the data size=0 is designated.

On the other hand, if it is determined in step S1501 that the status is normal status, it is checked in step S1511 if the direction bit of the ORB corresponding to that status indicates a read or write. If the direction bit indicates a write, i.e., data transfer from the initiator to the target, the corresponding ORB is deleted from the list (step S1512), the data buffer used by that ORB is released (step S1513), and the value of the counter CurrentQuedQUE indicating the empty size of the prefetch queue is incremented by 1 (S1514).

On the other hand, if the direction bit indicates a read, i.e., data transfer from the target to the initiator, since that status is a reply to the REQUESTED READ COMMAND ORB, a host process such as a printer driver or the like is informed of the end of read in step S1515. The corresponding ORB is deleted from the list in step S1516, and the value of the counter CurrentImmediateQUE is incremented by 1. That is, the immediate execution agent is ready to send the next ORB.

In this fashion, upon write in the status register, the initiator processes the status. That is, Unsolicited status is queued and is processed in turn, but normal status is processed immediately. The reason why the Unsolicited status is queued is that it generates an ORB. The number of ORBs generated and linked to the ORB list is limited below the total of the processing capacity of the execution agents of the target and the size of the prefetch queue. The number of ORBs is limited in such way to guarantee that the ORB to be immediately executed is processed immediately after an ORB generation message. The immediate execution command is immediately processed by the immediate execution agent as long as it is passed to the target. However, if ORBs are generated freely, the ORB list itself unwantedly becomes a queue of ORBs to be processed by the immediate execution agent, and the generated ORB is not passed to the target. As result, immediate execution is not guaranteed. Since the number of ORBs linked is limited to the total value of the number of ORBs placed in the prefetch queue of the target, and the number of ORBs which are being executed by the execution agents, an ORB generated by the initiator can be immediately passed to the target. For this reason, even upon reception of Unsolicited status, the initiator cannot often generate a new ORB due to the limitation on the number of ORBs. Hence, the Unsolicited status is temporarily placed in the status queue.

<Example of Message Sequence>

An example of the message sequence exchanged between the initiator and target in the above-mentioned procedures will be explained below with reference to FIGS. 19 to 21.

(Data Transfer Sequence to Target)

Figure 19:
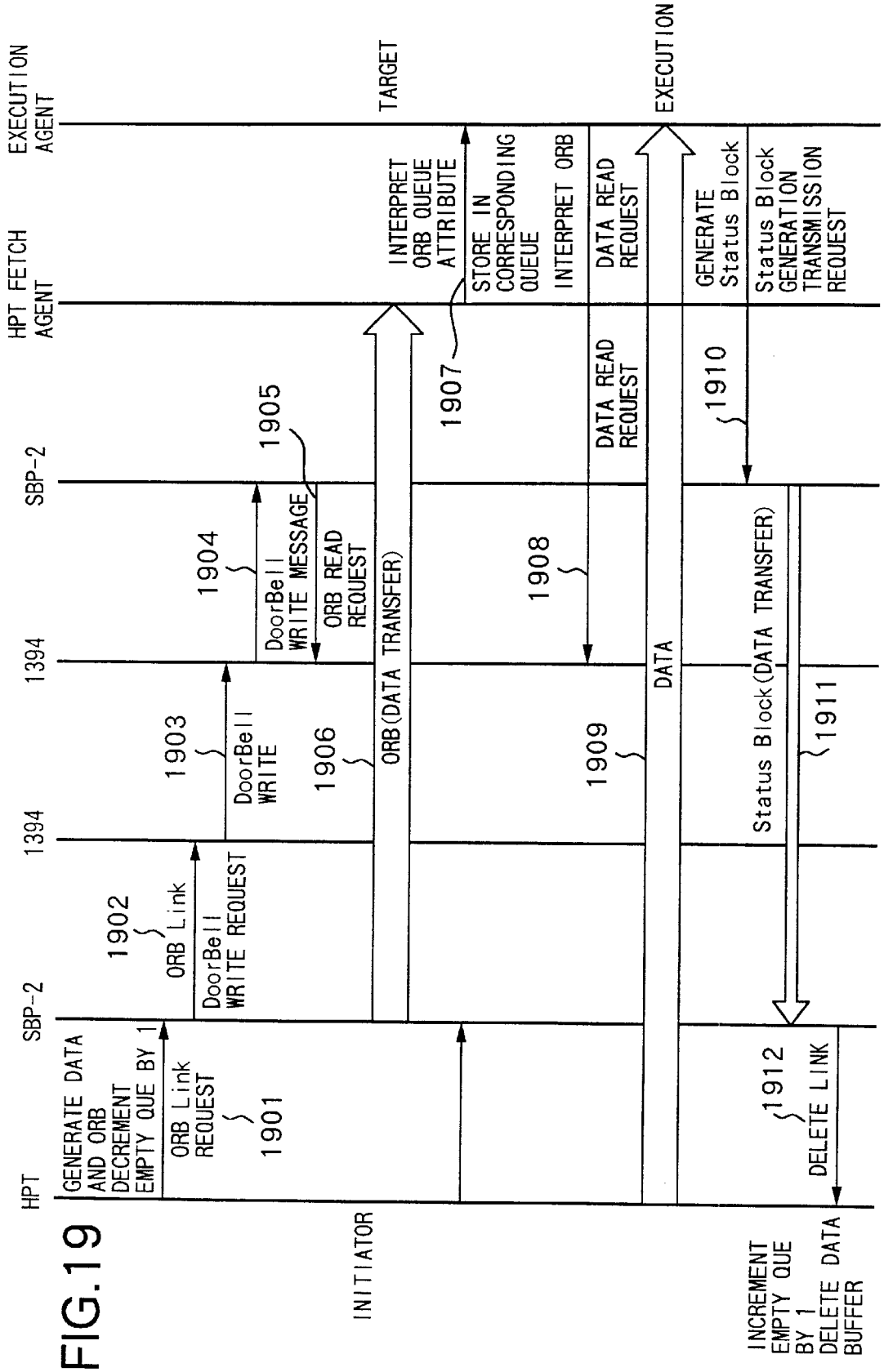
FIG. 19 shows the data transfer sequence from the initiator (host computer) to the target (printer)

FIG. 19 shows an example of the sequence upon data transfer from the initiator (host computer) to the target (printer).

Note that SBP-2 in FIG. 19 represents data specified by the SBP-2 standard, i.e., the processing layer that processes the fields specified in SBP-2 in the command shown in FIGS. 3A and 3B and status shown in FIGS. 11A and 11B. Also, HPT represents the processing layer that performs processing defined in units of functions, which are not specified in SBP-2. HPT executes the procedures of the above-mentioned flow charts. SBP-2 implements functions of linking ORBs, writing a doorbell, passing an ORB or status to HPT, and the like.

An application on the initiator generates data and its HPT generates an ORB (in this case, data transfer ORB), the value of the empty queue counter (CurrentQuedQUE) is decremented by 1, and an ORB link request is issued to SBP-2 (1901). SBP-2 links the generated ORB to the list, and issues a write request to the DOORBELL register (1902). The 1394 interface writes a doorbell in the DOORBELL register (1903), and SBP-2 of the target then receives that message (1904).

Upon reception of the message, SBP-2 issues an ORB read request to the 1394 interface (1905), and the ORB is read out from the system memory (1906). HPT stores the readout ORB in the corresponding queue in correspondence with its contents (1907). In this case, since the ORB is a data transfer command ORB, a data read request is issued to the 1394 interface (1908). In response to this request, data is read out from the designated address and is passed to an application (1909). The application in this case is, e.g., a rasterizer for mapping an image, and the mapped image is printed out by the printer engine.

After the data is read out, a status block transmission request is issued to SBP-2 of the target (1910), and a status block (data transfer status) is sent back to the initiator (1911). Upon reception of the status, HPT of the initiator deletes the corresponding ORB from the link, and increments the empty queue counter (CurrentQuedQUE) by 1 (1912).

With the above-mentioned sequence, data is transferred from the initiator to the target.

(Data Transfer Sequence to Initiator)

Figure 20:
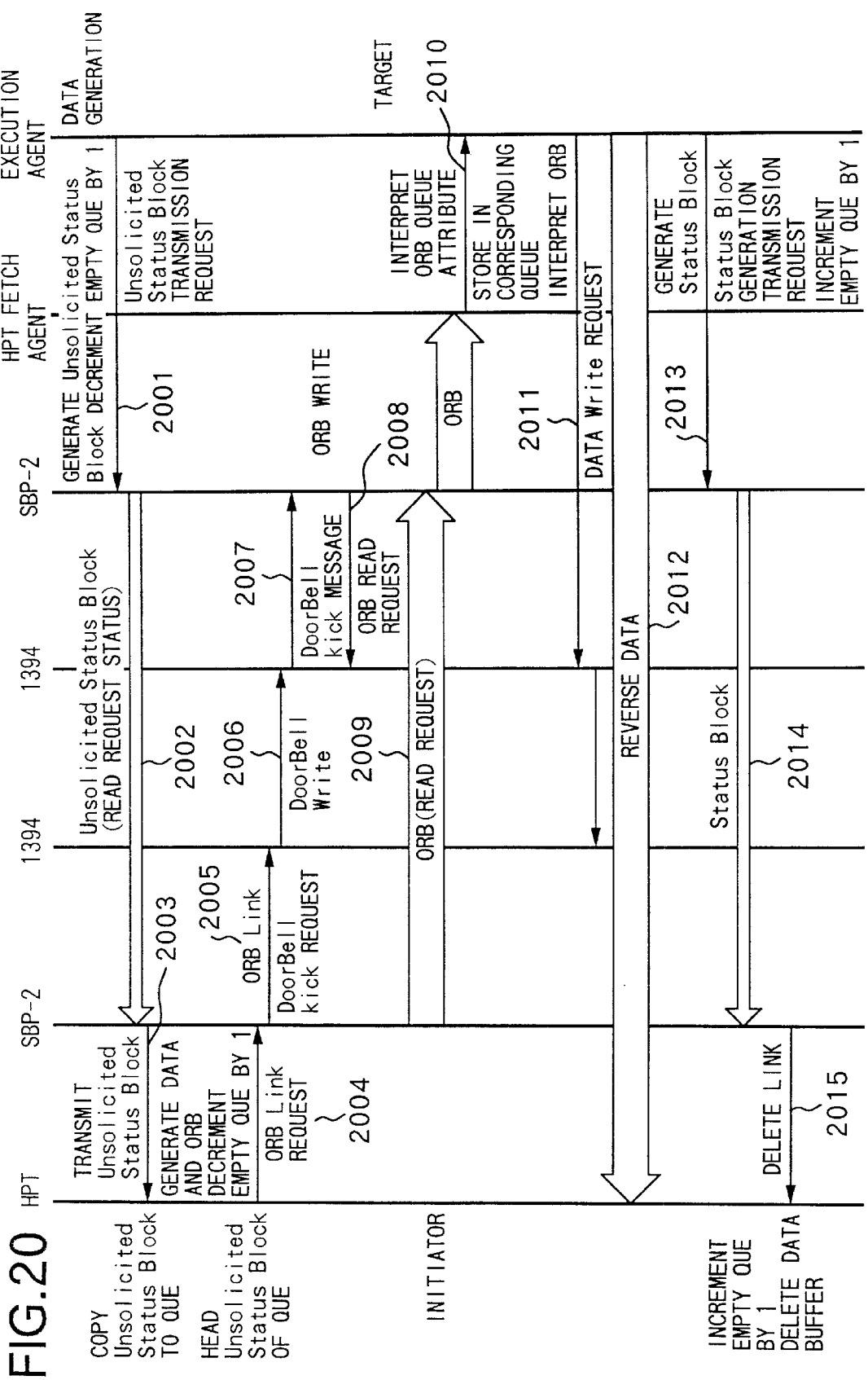
FIG. 20 shows the sequence upon data transfer from the target to the initiator using READ REQUEST status.

FIG. 20 shows the READ REQUEST status sequence.

When an application on the target generates data, Unsolicited status (READ REQUEST status) is generated, the status queue counter (CurrentUnsolicitedQUE) is decremented by 1, and an Unsolicited status transmission request is issued (2001). Upon reception of this request, SBP-2 transmits an Unsolicited status block to the initiator (2002). Upon reception of this status, the SBP-2 layer of the initiator transmits an Unsolicited status block to the HPT layer (2003). The HPT layer copies the Unsolicited status block to the status queue.

For the status at the head position of the status queue, the HPT layer prepares a data buffer and read request ORB and requests the SBP-2 layer to link the generated ORB (2004). The SBP-2 layer issues a write request to the DOORBELL register (2005), and the 1394 interface writes a doorbell (2006). A doorbell write message is sent from the 1394 interface to SBP-2 (2007), and issuance of a read request of the ORB (2008) and read of the ORB (2009) are immediately done. The readout ORB is passed to the HPT layer of the target, and the HPT layer stores that ORB in the designated queue (2010). After that, the HPT layer interprets the contents of the ORB to recognize a data read request, and issues the data write request to the 1394 interface (2011).

In response to this request, reverse data is written in the data buffer prepared by the initiator (2012).

Upon completion of this processing, the target issues a status block generation request, and increments the number of empty positions of the status queue by 1 (2013). In response to the request, a normal status block is sent back to the initiator (2014). When an ORB link deletion request is issued to HPT in response to that status, the corresponding ORB is deleted, and the number of empty positions (must be 0) of the queue of the immediate execution agent is incremented by 1, thus releasing the used data buffer (2015).

With this sequence, data is transferred from the target to the initiator.

(Data Transfer Sequence to Initiator)

Figure 21:
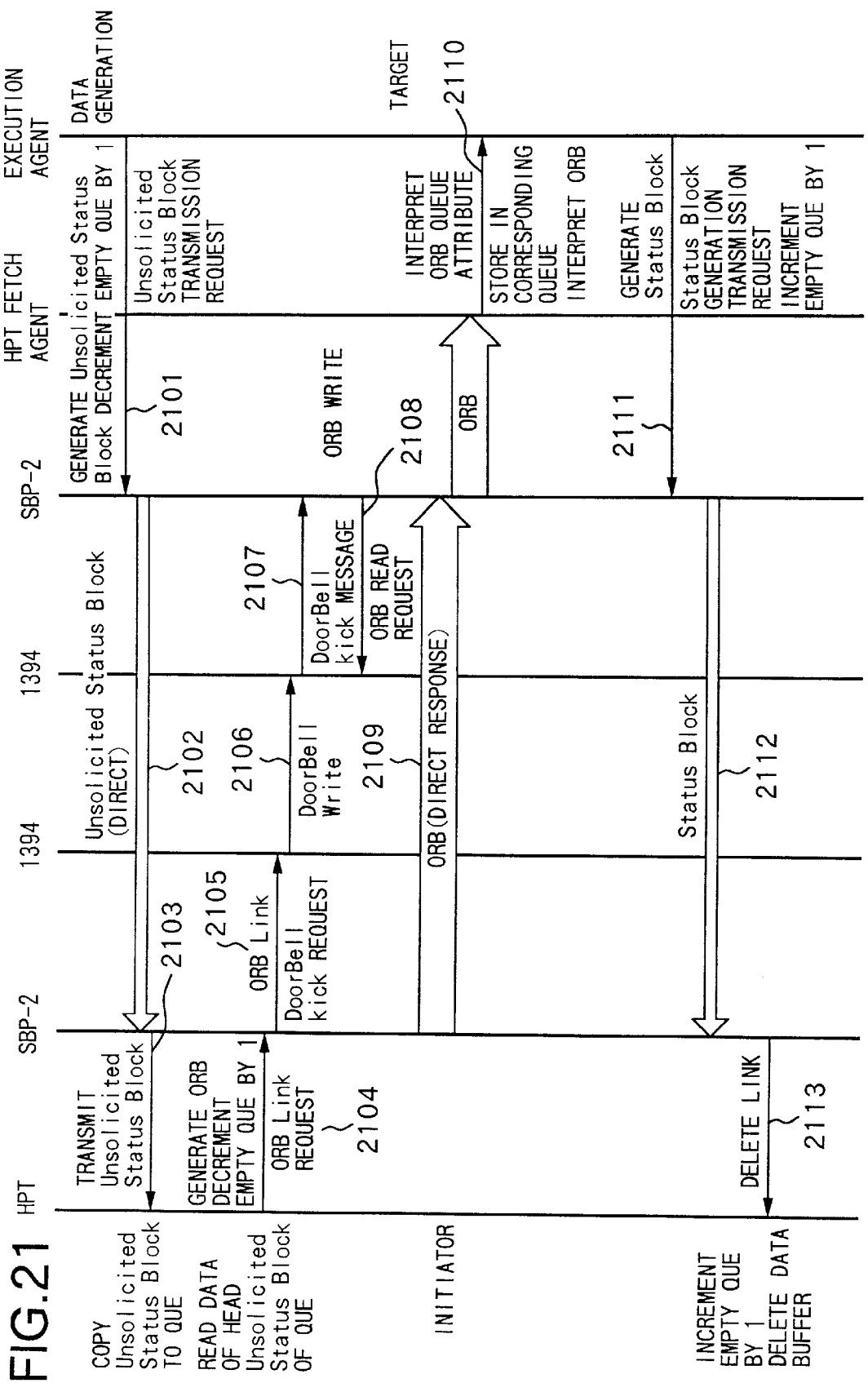
FIG. 21 shows the sequence upon data transfer from the target to the initiator using DIRECT status.

FIG. 21 shows the sequence upon data transfer from the target to the initiator. Unlike in the sequence of FIG. 20, since the data to be transferred is small, DIRECT status is used.

When an application on the target generates data, Unsolicited status (DIRECT status) is generated, the status queue counter (CurrentUnsolicitedQUE) is decremented by 1, and an Unsolicited status transmission request is issued (2101). Upon reception of this request, SBP-2 transmits an Unsolicited status block to the initiator (2102). Upon reception of this status, the SBP-2 layer of the initiator transmits an Unsolicited status block to the HPT layer (2103). The HPT layer copies the Unsolicited status block to the status queue.

For the status at the head position of the status queue, the HPT layer reads out data on the application level encapsulated in that status, prepares a data buffer and DIRECT STATUS RESPONSE ORB, and requests the SBP-2 layer to link the generated ORB (2104). The SBP-2 layer issues write request to the DOORBELL register (2105), and the 1394 interface writes a doorbell (2106). A doorbell write message is sent from the 1394 interface to SBP-2 (2107), and issuance of a read request of the ORB (2108) and read of the ORB (2109) are immediately done.

The readout ORB is passed to the HPT layer of the target, and the HPT layer stores it in the designated queue (2110). After that, the HPT layer interprets the contents of the ORB. If it is confirmed that the ORB is a DIRECT STATUS RESPONSE ORB, the target issues a corresponding status block generation request, and increments the number of empty positions of the status queue by 1 (2111). In response to this request, a normal status block is sent back to the initiator (2112). When an ORB link deletion request is issued to HPT in response to that status, the corresponding ORB is deleted, and the number of empty positions of the queue of the immediate execution agent is incremented by 1, thus releasing the used data buffer (2113)

With this sequence, data is transferred from the target to the initiator. In this sequence, two steps, i.e., a data write request (2011) and write of reverse data (2012), are omitted as compared to that shown in FIG. 20.

<Functions Unique to This System>

The arrangement and operation of this system are as has been described above. The functions, arrangement, merits, and the like unique to this system are summarized below:

(1) Two execution agents, i.e., queued and immediate execution agents are prepared in the target, and command queues are provided in correspondence with these execution agents. In this way, data transfer request ORBs from the initiator are queued and processed in turn (queued execution), but READ REQUEST status from the target is processed immediately after a corresponding (REQUESTED READ ORB) is issued (immediate execution). The immediate execution is guaranteed since the upper limit of the number of ORBs linked to the ORB list is limited to the size of the queued execution queue for write ORBs, and is limited to the size (1 in this case) of the immediate execution queue for read ORBs.

On the other hand, READ REQUEST status from the target is queued in the initiator. For this reason, a data transfer request from the initiator is appended to the prefetch queue, and a data transfer request (read request) from the target is added to the status queue. With this control, full-duplex communication channels can be provided between the applications on the initiator and target. That is, irrespective of the data transfer direction, requests appended to the queues are processed in the FIFO order, and data transfer in one direction does not influence that in the other direction, thus providing independent channels which do not interfere with each other. In other words, data generated in the initiator or target can be asynchronously transferred from the initiator to the target or vice versa.

(2) Since the initiator and target monitor the empty sizes of each others' queues, the transmitted ORB or status block is reliably received.

(3) Full-duplex communication channels are provided by a single login process. That is, since data can be exchanged using the computer with many resources as the initiator and the printer with poor resources as the target, the resources of the printer, especially, the required memory capacity, can be suppressed.

(4) Since the IEEE1394 interface is used, data transfer to the target can be done when the target reads out data as its resources become available, and the initiator can be prevented from being occupied by data transfer on the convenience of the target. If the printer serves as the target, it can read out data passed from the computer as its resources become available. For this reason, the host computer need not execute processing for monitoring the printer and starting data transfer after it confirms that the printer is ready to receive data. That is, the host computer can send data to the printer irrespective of the printer state, and need not transfer data after the printer becomes available.

(5) Since SBP-2 is used, an ORB alone is queued in the target, and data to be transferred itself is stored in the initiator in the processing wait time. For this reason, the memory resources of the target can be minimized.

(6) Using DIRECT status, data of the application layer can be encapsulated in status of the HPT layer, and can be transmitted from the target to the initiator. For this reason, the data transfer sequence can be shortened.

Note that the system of this embodiment is not limited to the host computer and printer, but may be applied to various other apparatuses. The above-mentioned features are effective not only for the relationship between a host computer and printer, but also for connections between a host computer and a peripheral apparatus with small resources, and between peripheral apparatuses.

Second Embodiment

A system that simultaneously provides a plurality of logical channels will be explained as the second embodiment of the present invention. In this case, on the target side, a digital multi-functional machine that combines a printer, facsimile, and image scanner can be used in place of the printer alone.

<System Arrangement>

Figure 23:
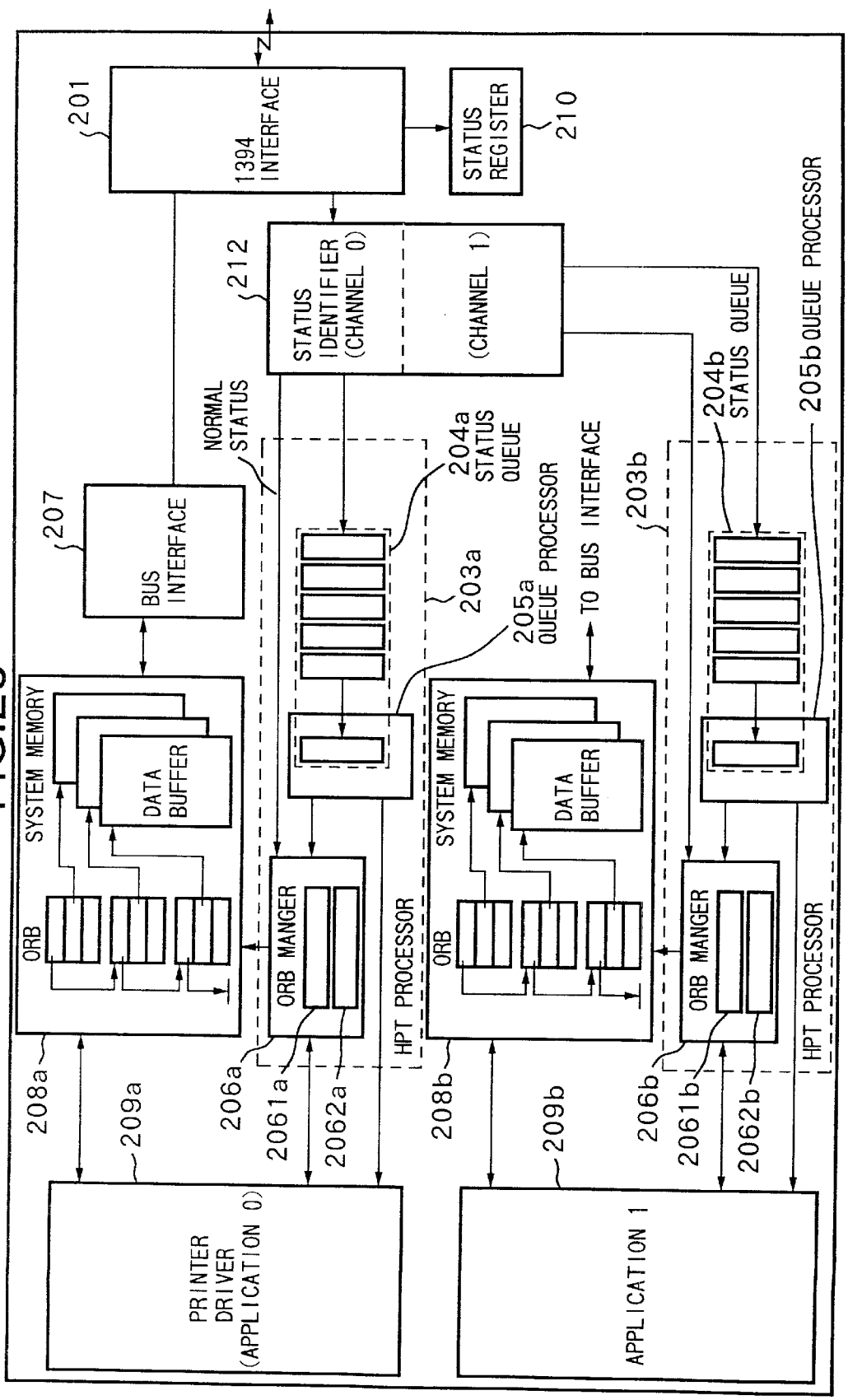
FIG. 23 is a block diagram of an initiator that provides multi-channels.

FIG. 23 is a block diagram of an initiator of this embodiment. In FIG. 23, only the differences from FIG. 2 will be explained, and a description of the common components will be omitted. The characteristic features of FIG. 23 are that a status identifier 212 identifies not only the type of status but also logical channels and distributes status blocks in units of channels, and has an arrangement with a system memory and HPT processor per channel for a plurality of (2 in FIG. 23) channels.

Note that the status identifier 212 identifies a channel in accordance with the channel ID included in a status block. This will be described later. For example, when a digital multi-functional machine is used, different applications may be assigned in units of channels, i.e., one channel is used by a printer driver and the other channel by an image scanner driver, or a single application may use a plurality of channels.

Figure 22:
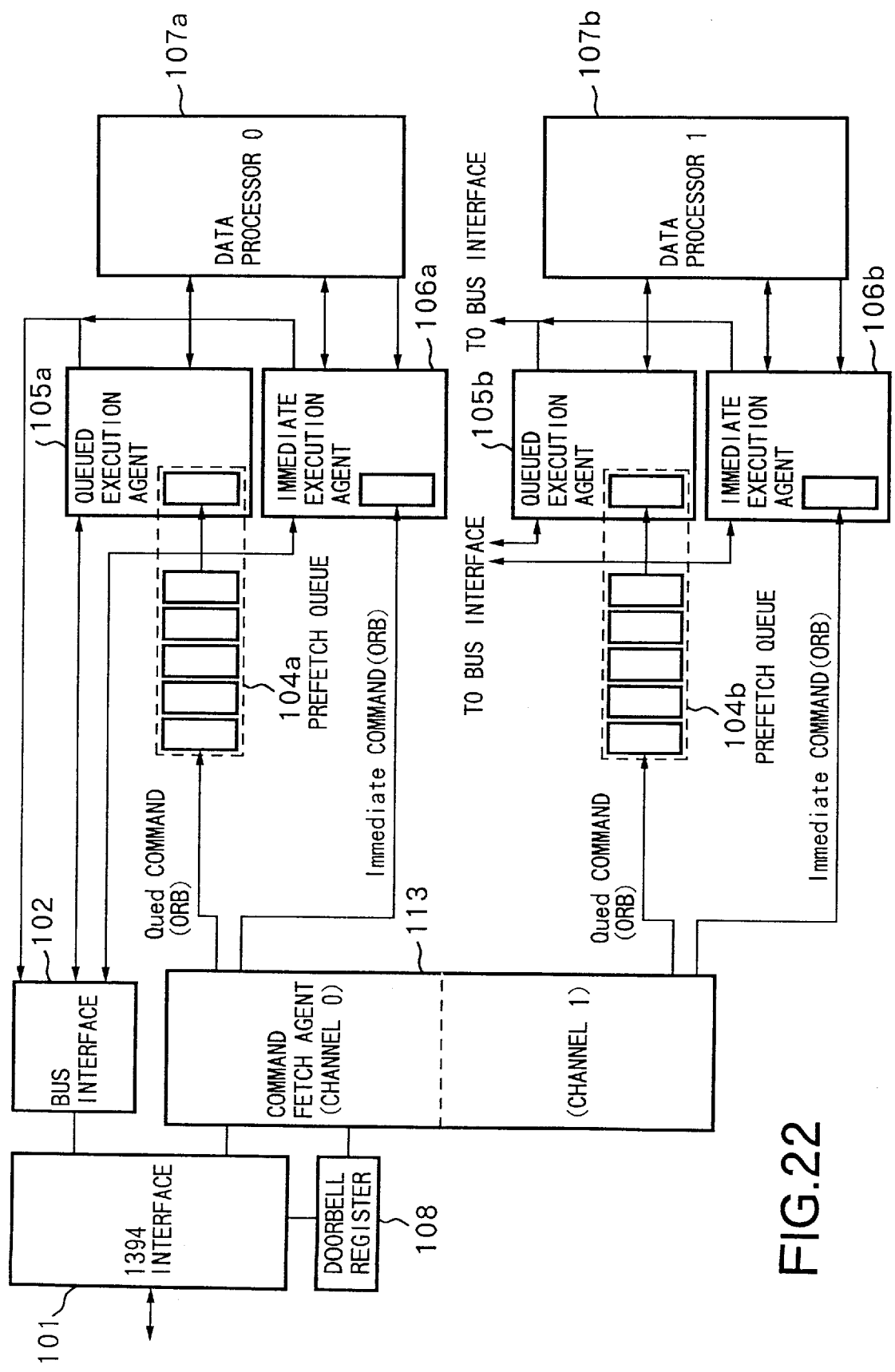
FIG. 22 is a block diagram of a target that provides multi-channels.

FIG. 22 is a block diagram of a target. The difference from FIG. 1 lies in that a command fetch agent 113 distributes command ORBs in units of channels. Each channel has the same arrangement as that in FIG. 1, and has a prefetch queue and two execution agents (queued and immediate execution agents).

Note that an ORB indicates a logical channel, and the command fetch agent identifies a channel with reference to it.

<Format of Command ORB>

Figure 24:
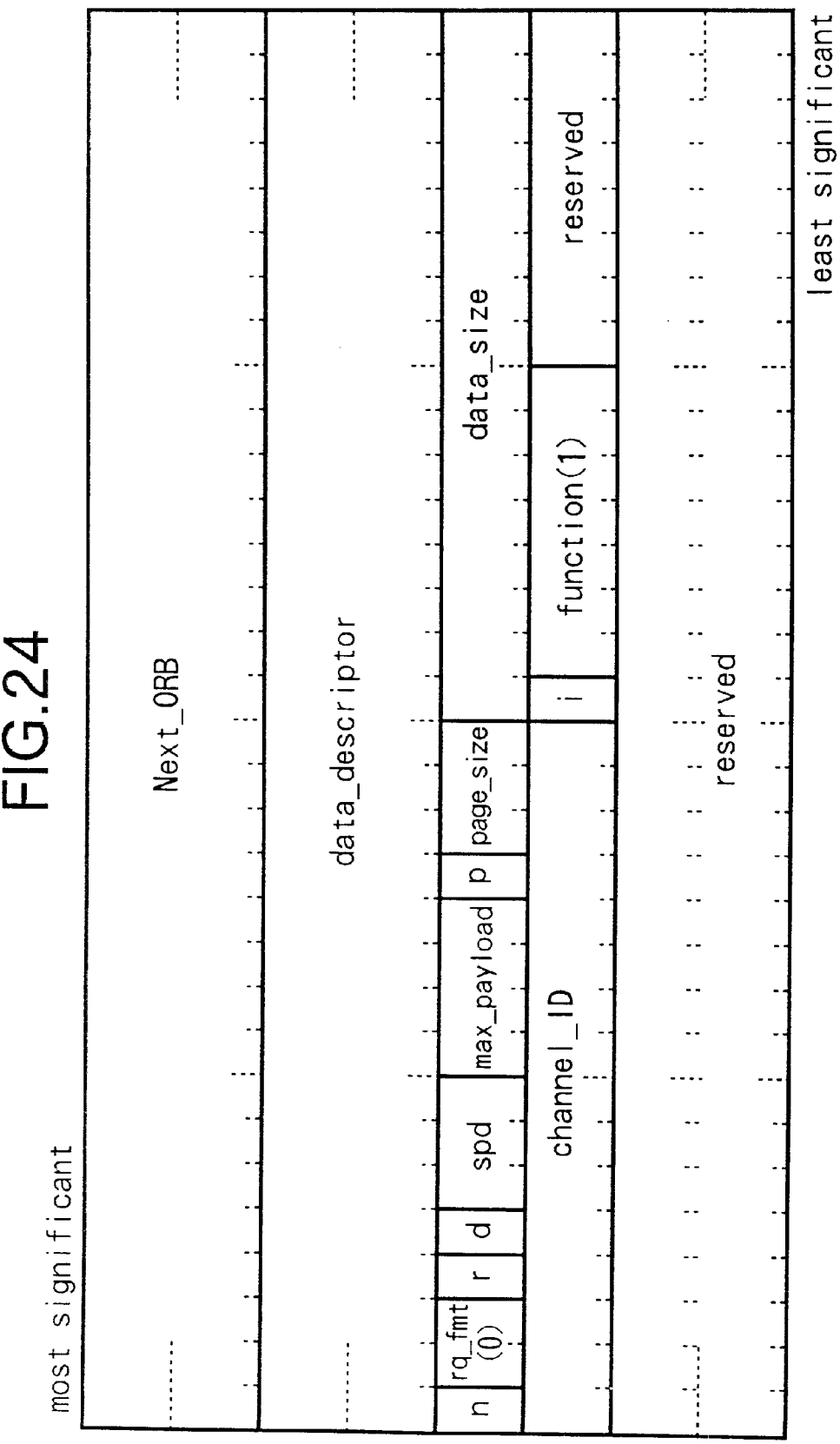
FIG. 24 shows the format of a multi-channeled DATA TRANSFER command ORB.
Figure 25:
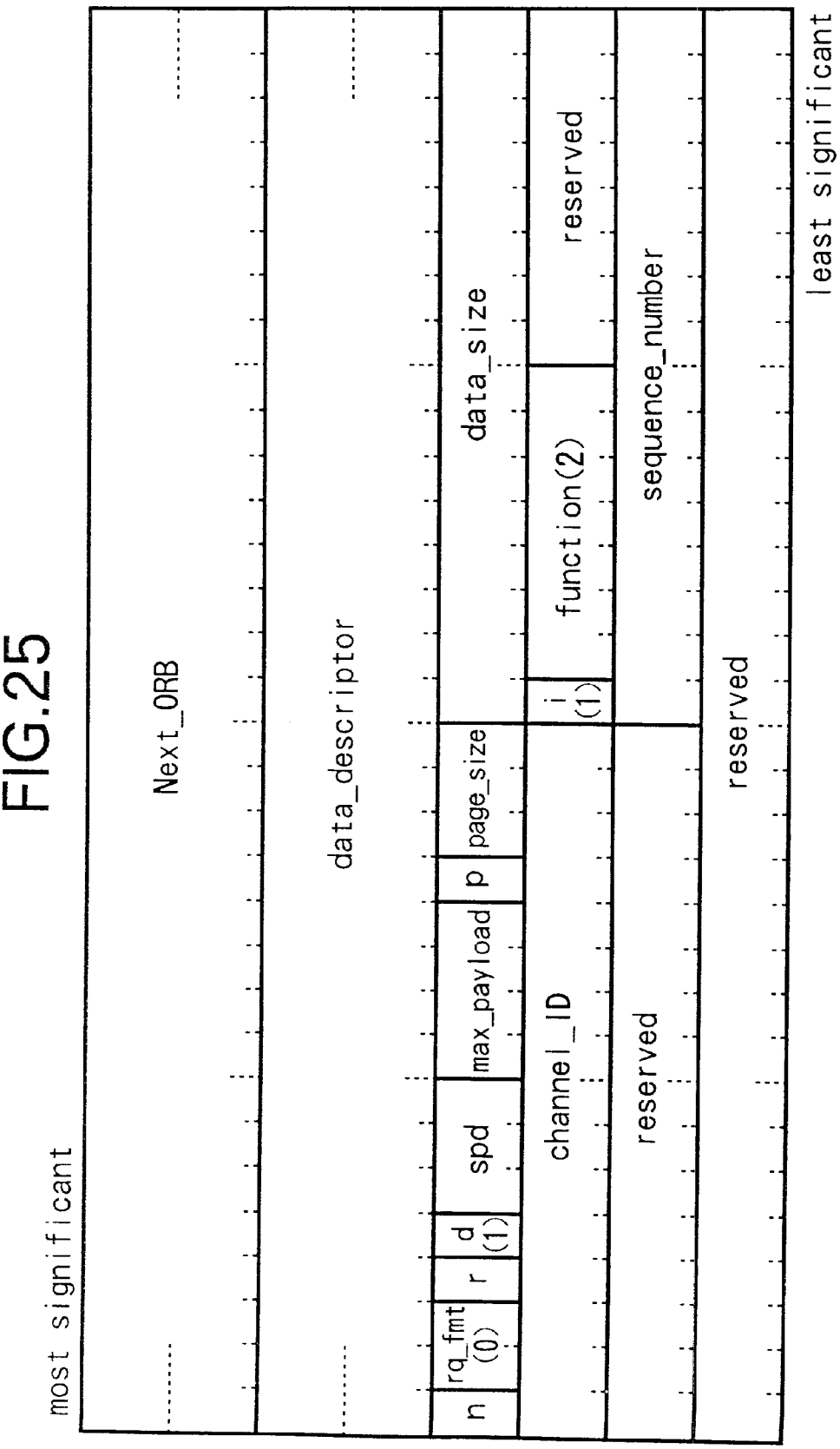
FIG. 25 shows the format of a multi-channeled REQUESTED READ command ORB.
Figure 26:
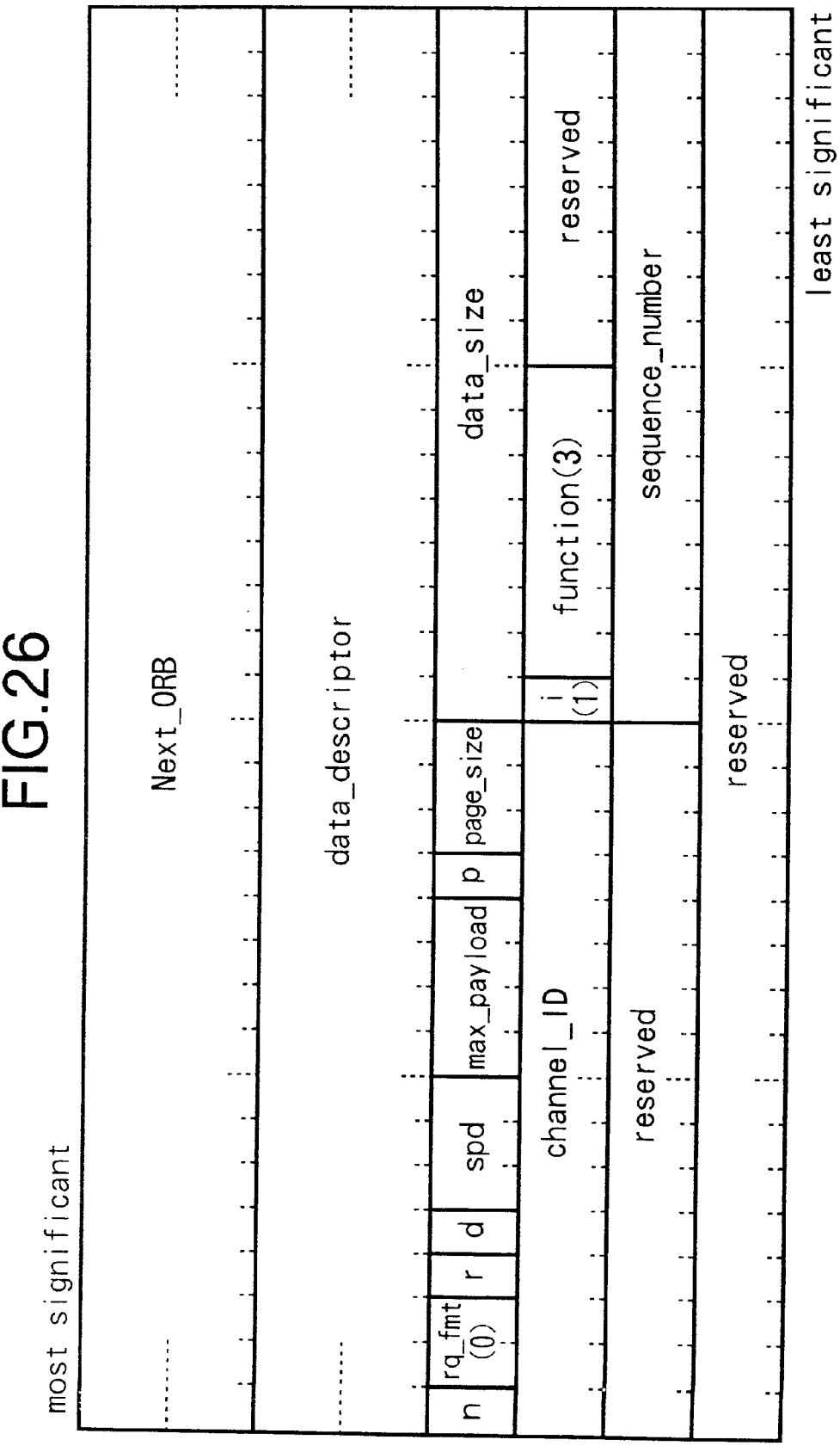
FIG. 26 shows the format of a multi-channeled DIRECT STATUS RESPONSE command ORB.
Figures 27A, 27B:
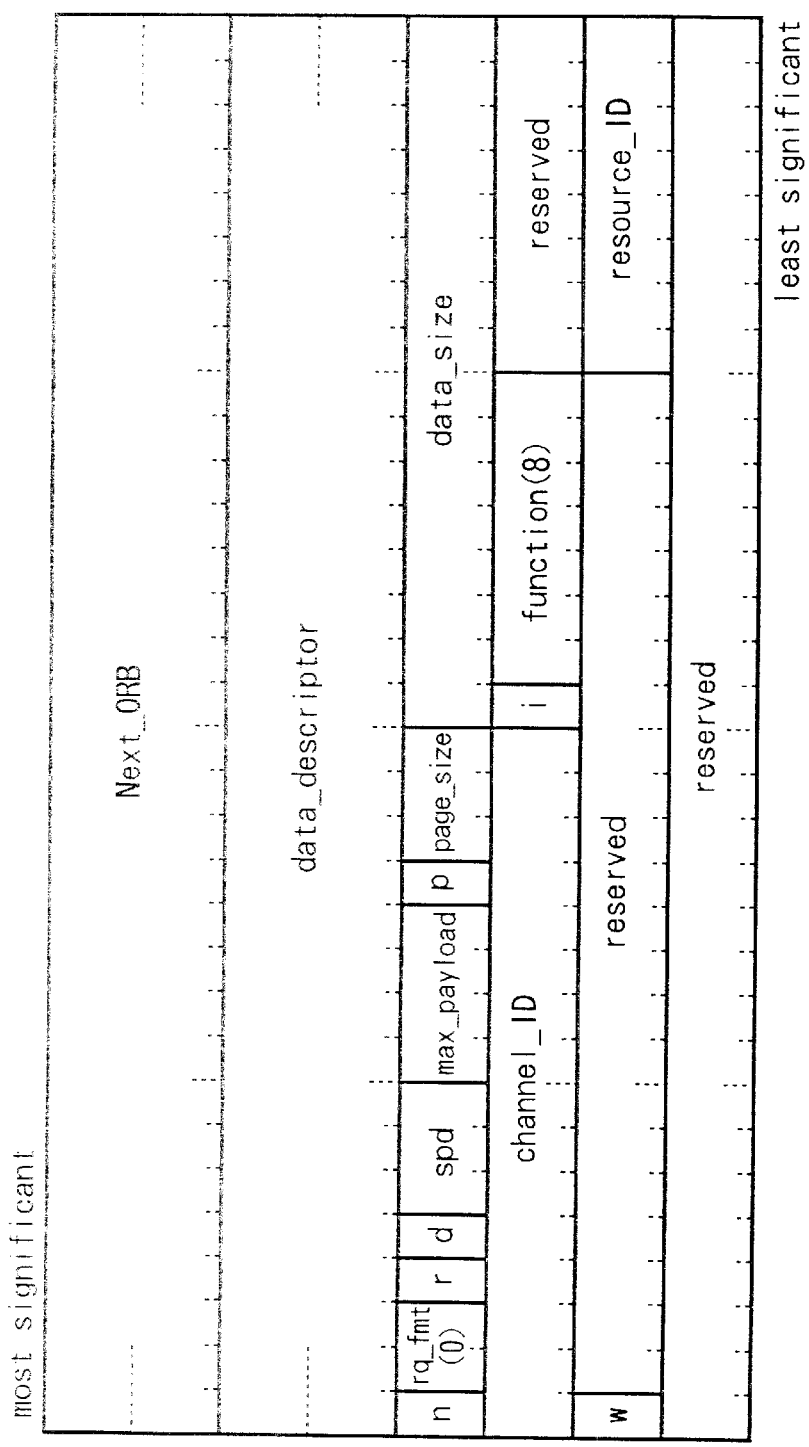
FIGS. 27A and 27B show the format of a multi-channeled ACQUIRE DEVICE RESOURCE command ORB.
Figure 28:
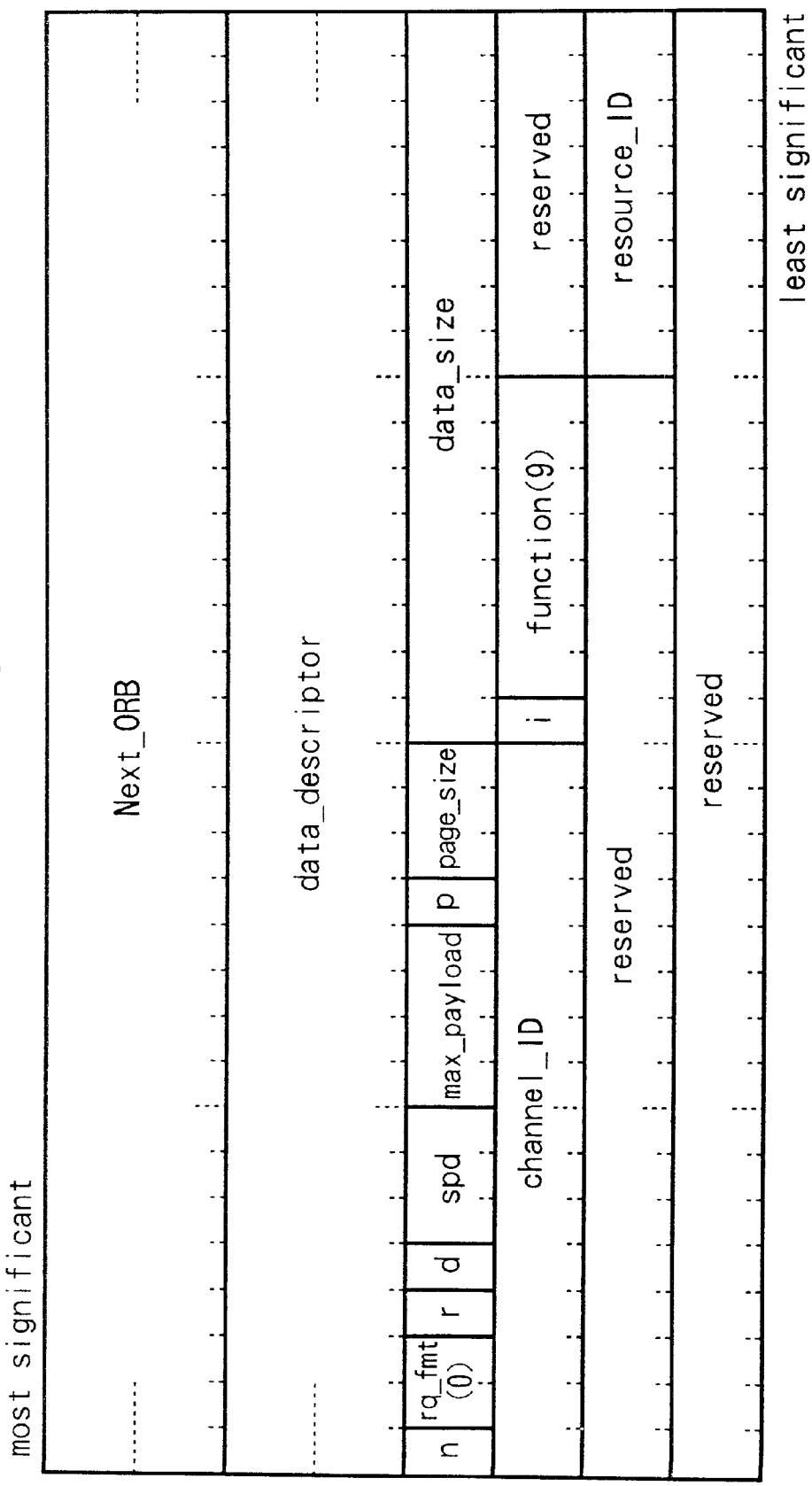
FIG. 28 shows the format of a multi-channeled RELEASE DEVICE RESOURCE command ORB.

FIGS. 24 to 32B show examples of the formats of command ORBs. FIG. 24 shows a data transfer command ORB, FIG. 25 shows a REQUESTED READ command ORB, FIG. 26 shows a DIRECT STATUS RESPONSE command ORB, FIGS. 27A and 27B show an ACQUIRE DEVICE RESOURCE command ORB, FIG. 28 shows a RELEASE DEVICE RESOURCE command ORB, and FIG. 30 shows a BASIC DEVICE STATUS command ORB. These command ORBs are substantially the same as those in the first embodiment, except that they have channel ID fields.

Figure 29:
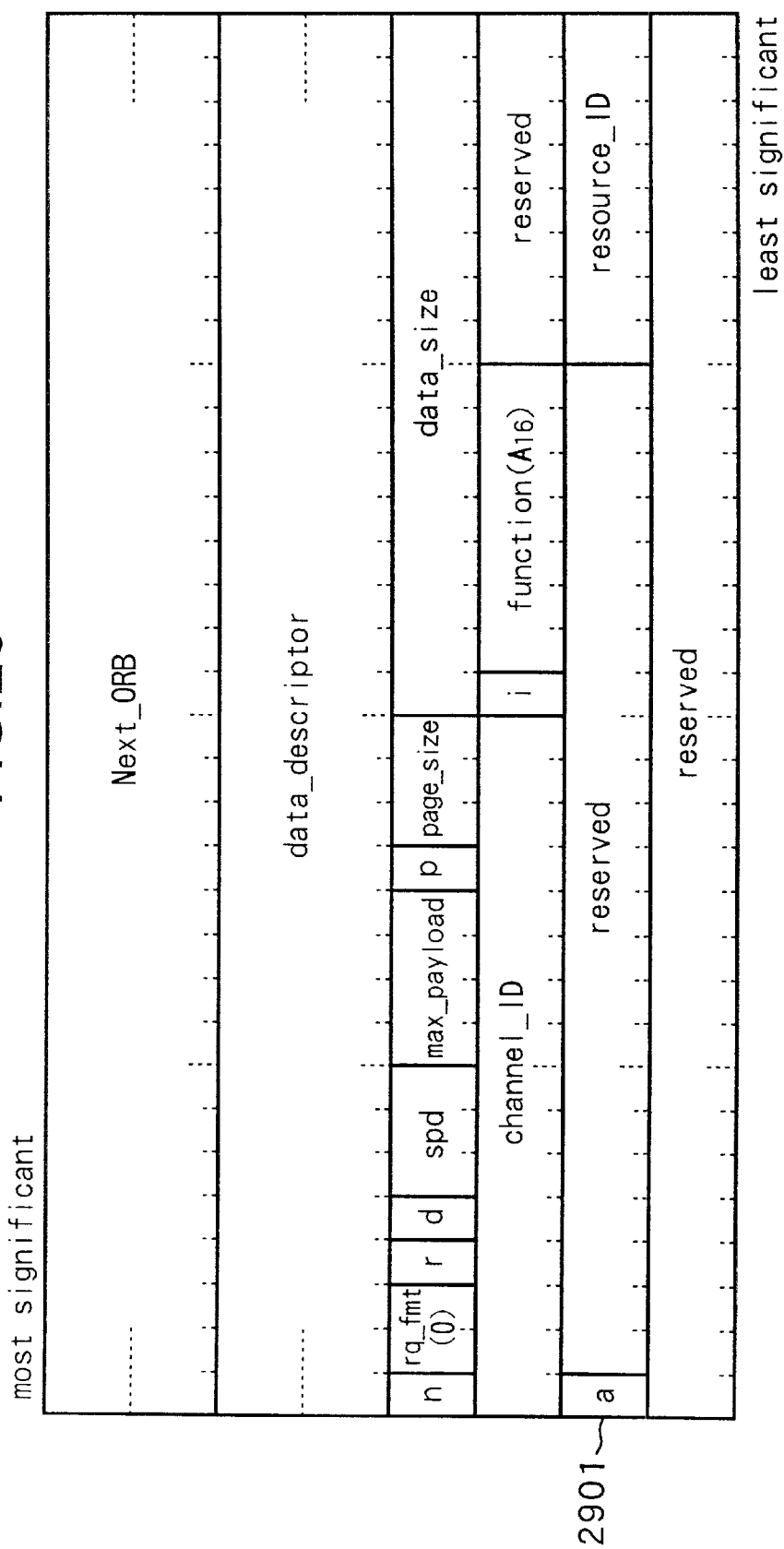
FIG. 29 shows the format of a multi-channeled ABDICATE DEVICE RESOURCE RESPONSE command ORB.

FIG. 29 shows an ABDICATE DEVICE RESOURCE RESPONSE command ORB, which is a response to an ABDICATE DEVICE RESOURCE request from the target. Since the target has poor resources, the resources of processes may become short when a plurality of channels are used and when a plurality of application processes are running. In such case, the target issues the ABDICATE DEVICE RESOURCE request.

Figure 31A:
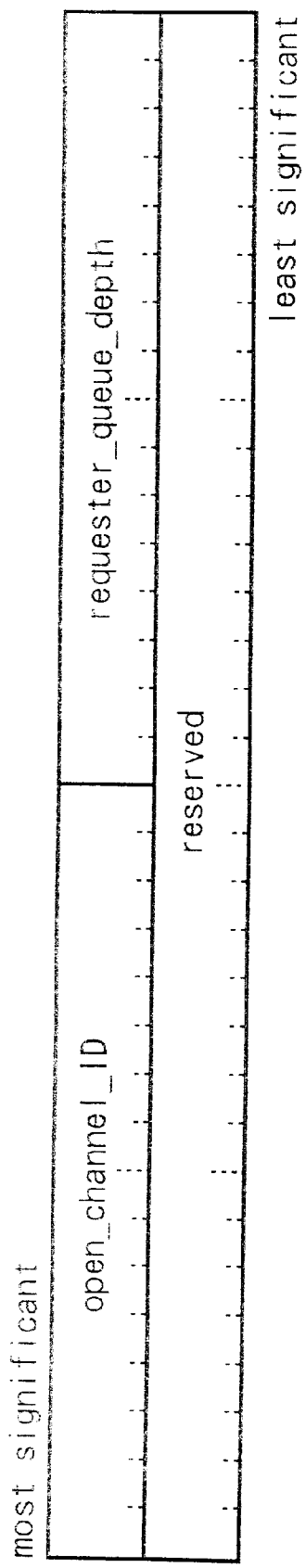
FIGS. 31A and 31B show the format of an OPEN CHANNEL REQUEST response.
Figure 31B:
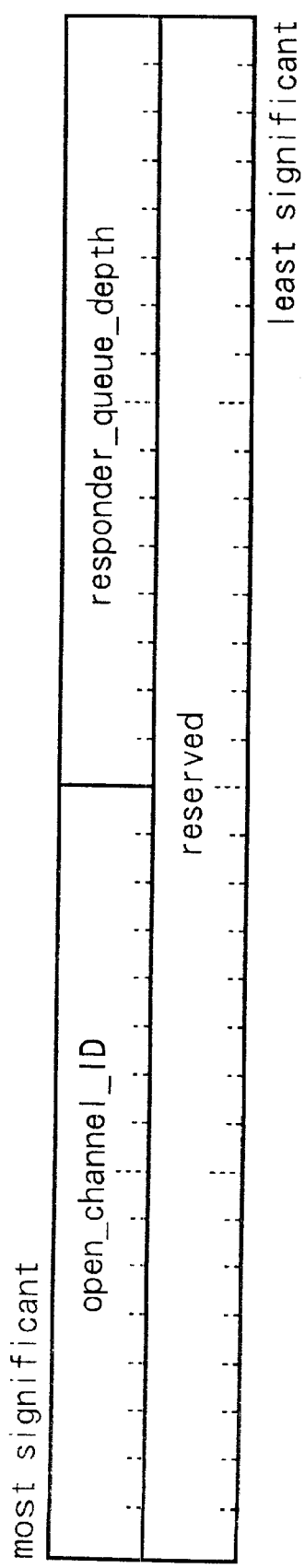

FIG. 31A shows an OPEN CHANNEL REQUEST command used for issuing a channel open request, and FIG. 31B shows OPEN CHANNEL REQUEST status corresponding to that command. With these command and status, a desired logical channel is opened.

Figure 32A:
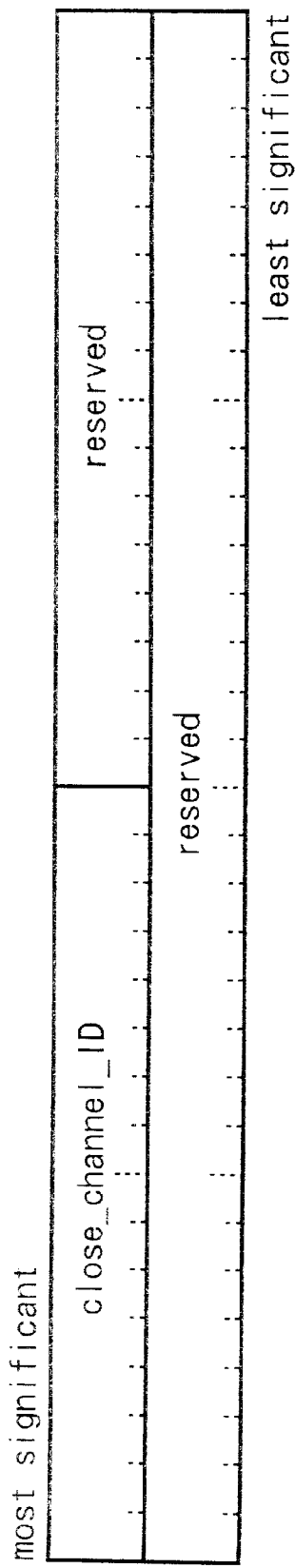
FIGS. 32A and 32B show the format of a CLOSE CHANNEL REQUEST response.
Figure 32B:
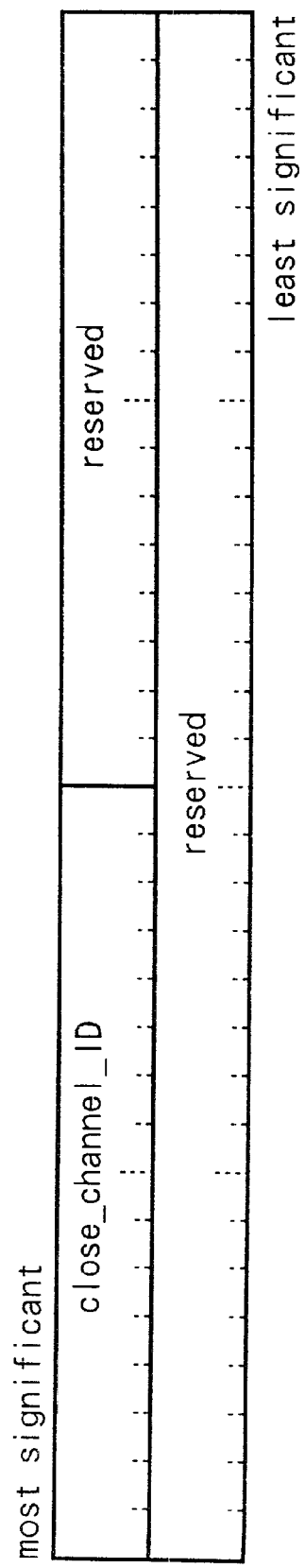

FIG. 32A shows a CLOSE CHANNEL REQUEST command used for issuing a channel close request, and FIG. 32B shows CLOSE CHANNEL REQUEST status corresponding to that command. With these command and status, a desired logical channel is closed.

<Format of Status Block>

Figure 36:
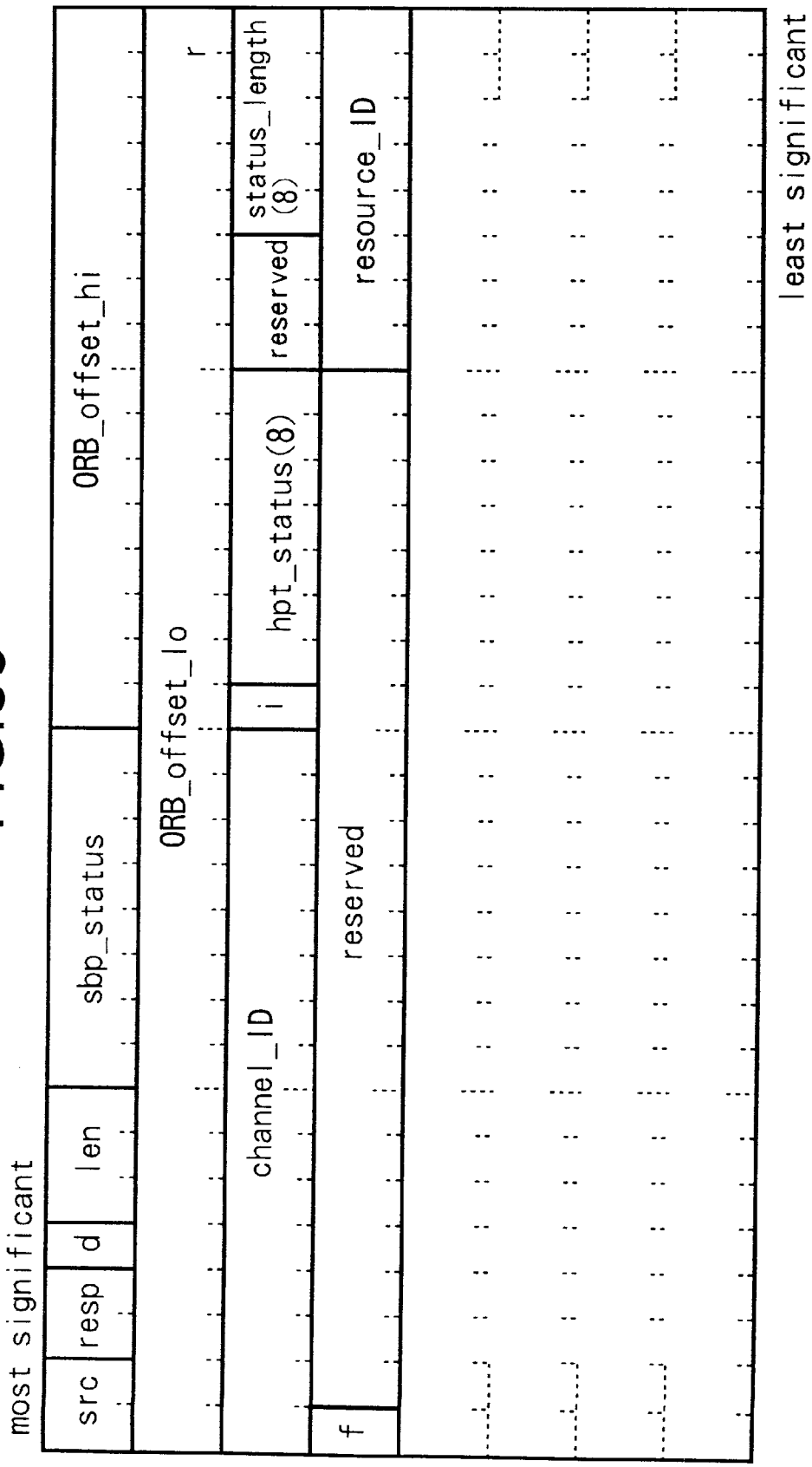
FIG. 36 shows the format of a multi-channeled DEVICE RESOURCE ACQUIRE status block.
Figure 37:
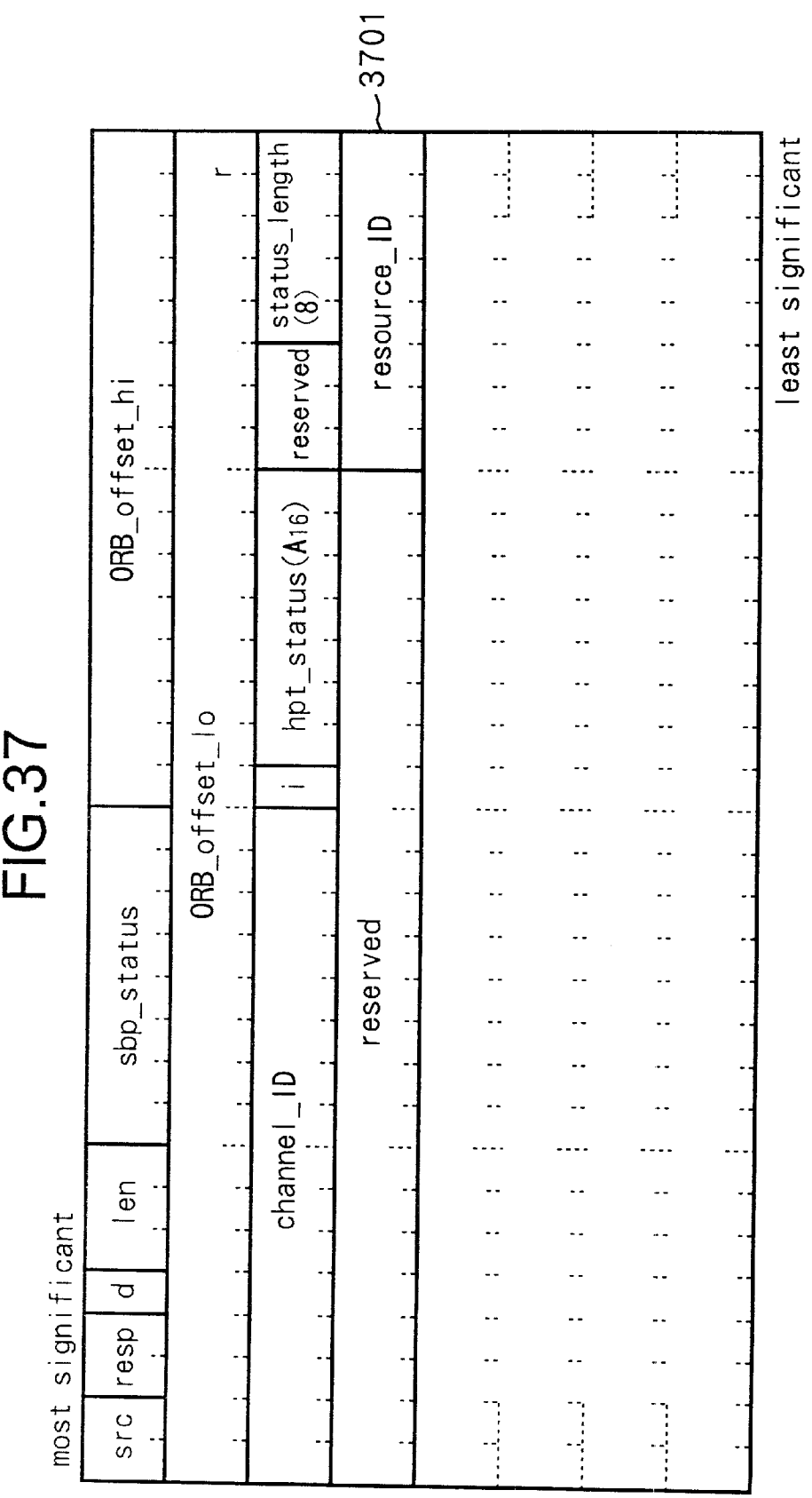
FIG. 37 shows the format of a multi-channeled ABDICATE DEVICE RESOURCE status block.
Figure 38:
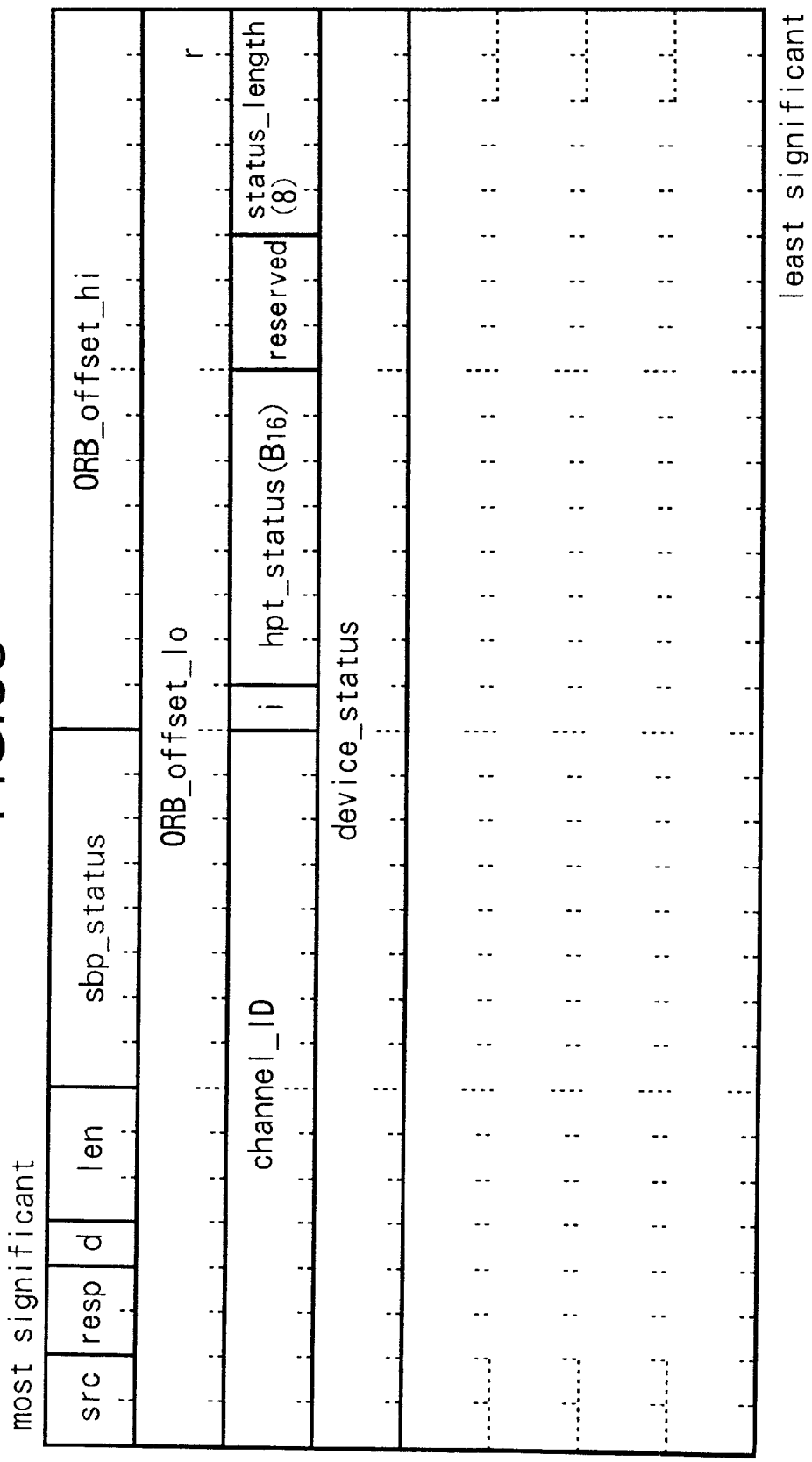
FIG. 38 shows the format of a multi-channeled BASIC DEVICE status block.

FIGS. 33A to 38 show the formats of status blocks. FIGS. 33A to 33C show the general format of status, FIG. 34 shows READ REQUEST status, FIG. 35 shows DIRECT status, FIG. 36 shows ACQUIRE DEVICE RESOURCE status, and FIG. 38 shows BASIC DEVICE status. The formats of these status blocks are substantially the same as those of the first embodiment, except that they include channel IDs.

FIG. 37 shows an ABDICATE DEVICE RESOURCE status block, which stores a resource ID, which is used for requesting the initiator to abdicate, in a resource ID field 3701. Since this status is a request issued by the target, it is transmitted as Unsolicited status to the initiator.

<Command/status Processing Procedure in Initiator and Target>

Figure 39A:
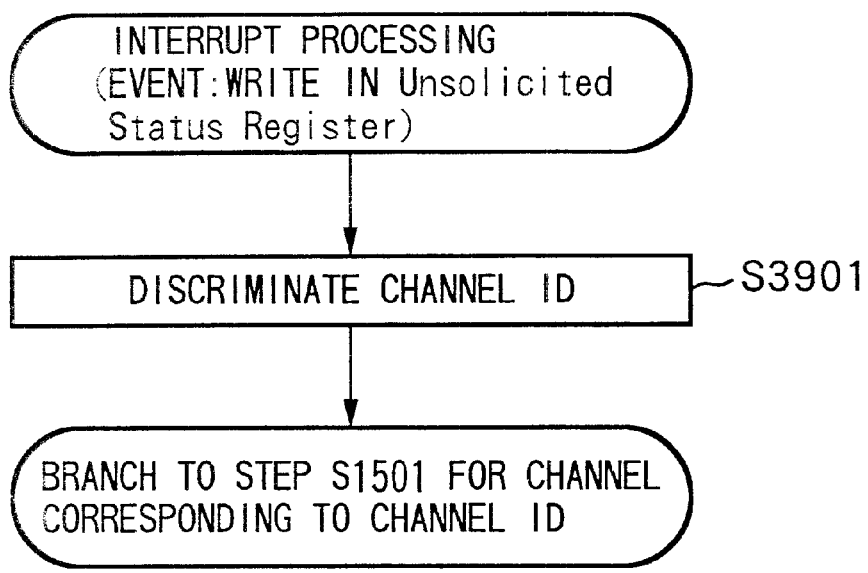
FIG. 39A is a flow chart showing the processing procedure executed by the multi-channeled initiator upon write in a status register.
Figure 39B:
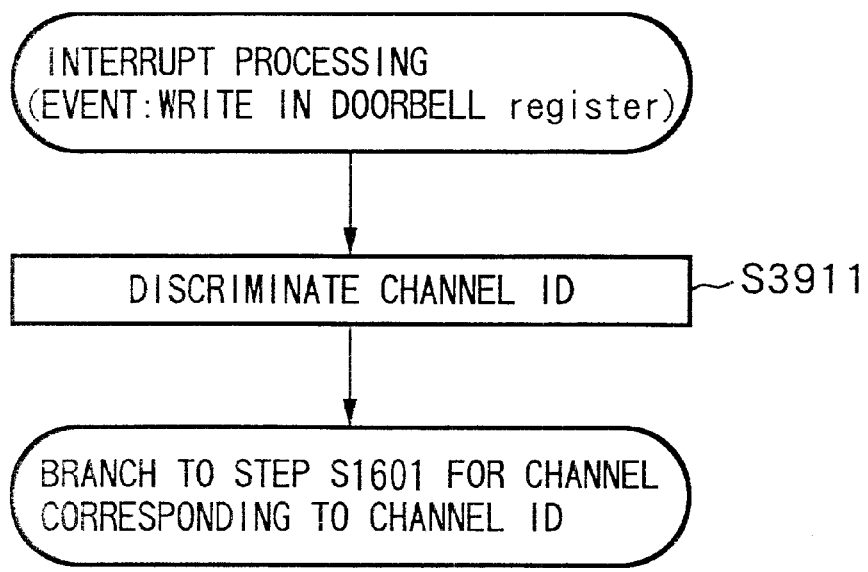
FIG. 39B is a flow chart showing the processing procedure executed by the multi-channeled target upon write in a DOORBELL register.

FIGS. 39A and 39B show the processing procedures in the initiator and target of this embodiment. FIG. 39A shows the processing procedure started upon write in a status register in the initiator, and corresponds to FIG. 18 of the first embodiment. When the processing is started, the channel ID is discriminated in step S3901. After that, the same processing as that in step S1501 and subsequent steps in FIG. 18 is executed for the discriminated channel.

FIG. 39B shows the processing procedure started upon write in a DOORBELL register in the target, and corresponds to FIG. 15 in the first embodiment. When the processing is started, the channel ID is discriminated in step S3911. After that, the same processing as that in step S1601 and subsequent steps in FIG. 15 is executed for the discriminated channel.

In addition, the processing that starts in response to a data transfer request (FIG. 14), the processing by the target agent (FIG. 16), and the processing upon generation of data to be transferred from the printer to the host computer (FIG. 17) are the same as those in the first embodiment. However, before such processing, a channel must be opened.

Also, an ABDICATE RESOURCE request from the target is issued in the same sequence as that of data transfer using DIRECT status from the target.

In this embodiment, data transfer is done by the above-mentioned procedures. The system of this embodiment is substantially the same as that in the first embodiment, except that a plurality of logical channels can be used.

This system can provide full-duplex communications for each of a plurality of logical channels. For this reason, two-way communications can be provided even for equipment having a plurality of devices such as a digital multi-functional machine. Hence, the functions (1) to (6) described in the first embodiment can be provided for a plurality of channels.

Other Embodiments

Note that the present invention may be applied to either a system constituted by a plurality of equipments (e.g., a host computer, interface device, reader, printer, and the like), or an apparatus consisting of a single equipment (e.g., a copying machine, facsimile apparatus, or the like).

The objects of the present invention are also achieved by supplying a storage medium, which records a program code (i.e., programs of the procedures shown in FIGS. 14 to 18 and FIGS. 39A and 39B) of a software program that can realize the functions of the above-mentioned embodiments to the system or apparatus, and reading out and executing the program code stored in the storage medium by a computer (or a CPU, MPU, or the like) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

To restate, according to the present invention, full-duplex communications that allow asynchronous, two-way communications can be realized by a single login process, and resources such as processes, memories, and the like required for data exchange can be efficiently used.

Since the initiator and target monitor the empty sizes of each others' queues, an ORB or status block transmitted can be reliably received.

Since the IEEE1394 interface is used, data transfer to the target can be done when the target reads out data as its resources become available, and the initiator can be prevented from being occupied by data transfer on the convenience of the target.

Since SBP-2 is used, an ORB alone is queued in the target, and data to be transferred itself is stored in the initiator in the processing wait time. For this reason, the memory resources of the target can be minimized.

Using DIRECT status, data of the application layer can be encapsulated in status of the HPT layer, and can be transmitted from the target to the initiator. For this reason, the data transfer sequence can be shortened.

Also, multi-channels can be realized.

As many apparently widely different embodiments of the present invention can be made without departing from the spirit and scope thereof, it is to be understood that the invention is not limited to the specific embodiments thereof except as defined in the appended claims.

What is claimed is:

1. A communication control method of exchanging data between an initiator and a target, said method comprising the steps of:

performing, in the target, a read operation and write operation asynchronously, wherein, in the read operation, data is read from a designated location in a storage area of the initiator in response to a first command taken from a first queue and, in the write operation, data is written to a designated location in the storage area of the initiator in response to a second command taken from a second queue;

transferring, in the target, the first command and the second command to the first queue or the second queue according to a designation, included in the commands, whether the commands should be queued to the first queue or the second queue;

generating, in the initiator, the first command and the second command including designation whether the commands should be queued to the first queue or the second queue; and determining whether the first and the second queue have a free area respectively and managing transmission of the first command and the second command to the target so that the first and the second commands are transmitted respectively when the respective queues have a free area.

2. The method according to claim 1, wherein said target holds the second command in the second queue having capacity of holding one command and process the command in the queue.

3. The method according to claim 1, wherein upon reception of a data write request in said storage area from said target, said initiator holds the request in a status queue, and issues a second command to said target.

4. The method according to claim 3, wherein said target issues write requests to said initiator so as not to exceed the number of requests that can be held by said status queue.

5. The method according to claim 1, wherein said initiator issues a write command in said storage area in response to a request from said target.

6. The method according to claim 5, wherein when data to be transferred to said initiator is smaller than a predetermined size, said target does not request said initiator to write in said storage area, and directly writes the data in a predetermined area of said storage area in said initiator.

7. The method according to claim 1, wherein said target and initiator assign channel identifiers to the second and the first commands, and independently process the commands in units of channel identifiers.

8. A printing system using a communication control method of claim 1, wherein a host apparatus serving as an initiator is connected to a printer apparatus serving as a target, said printer apparatus receives print data from said host apparatus and prints out based on the received print data, and said host apparatus receives status information of said printer apparatus.

9. A communication control method of exchanging data upon accessing a storage area of an initiator from a target, wherein said target checks if a size of data to be transmitted exceeds a predetermined size, requests said initiator to issue a write command in said storage area when the size of the data to be transmitted exceeds the predetermined size, and sends the data to said initiator when the size of the data to be transmitted does not exceed the predetermined size, and said initiator issues a write command upon receiving a write command issuance request from said target.

10. A communication control system for exchanging data with a target which performs a read operation and a write operation asynchronously, wherein, in the read operation, the target reads data from a designated location in a storage area of the initiator in response to a first command taken from a first queue and, in the write operation, the target writes to a designated location in the storage area of the initiator in response to a second command taken from a second queue, said system comprising:

means for generating the first command and the second command including a designation of whether the commands should be queued to the first queue or the second queue; and means for determining whether the first and the second queue have a free area respectively and managing transmission of the first command and the second command to the target so that the first and the second commands are transmitted respectively when the respective queues have a free area.

11. The system according to claim 10, wherein said target holds the second command in the second queue having capacity of holding one command and processes the command in the queue.

12. The system according to claim 10, wherein upon reception of a data write request in said storage area from said target, said initiator holds the request in a status queue, and issues the second command to said target.

13. The system according to claim 12, wherein said target issues write requests to said initiator so as not to exceed the number of requests that can be held by said status queue.

14. The system according to claim 10, wherein said initiator issues the second command in said storage area in response to a request from said target.

15. The system according to claim 14, wherein when data to be transferred to said initiator is smaller than a predetermined size, said target does not request said initiator to write in said storage area, and directly writes the data in a predetermined area of said storage area in said initiator.

16. The system according to claim 10, wherein said target and initiator assign channel identifiers to the write and read commands, and independently process the commands in units of channel identifiers.

17. A communication system for exchanging data upon accessing a storage area of an initiator from a target, wherein said target checks if a size of data to be transmitted exceeds a predetermined size, requests said initiator to issue a write command in said storage area when the size of the data to be transmitted exceeds the predetermined size, and sends the data to said initiator when the size of the data to be transmitted does not exceed the predetermined size, and said initiator issues a write command upon receiving a write command issuance request from said target.

18. A method for making a computer operate as an apparatus for use as an initiator, the initiator transmitting a command to a target which performs a read operation and a write operation asynchronously, wherein, in the read operation, the target reads data from a designated location in a storage area of the initiator in response to a first command taken from a first queue and, in the write operation, the target writes to a designated location in the storage area of the initiator in response to a second command taken from a second queue, said method comprising the steps of:

a generation processing step, of generating the first command and the second command including designation whether the commands should be queued to the first queue or the second queue; and a transmission control processing step, of determining whether the first and the second queue have a free area respectively and managing transmission of the first command and the second command to the target so that the first and the second commands are transmitted respectively when the respective queues have a free area.

19. A printing control apparatus for transmitting print data to a target, and receiving status information from said target, in a communication control method of claim 18.

20. A communication control method of exchanging data with an initiator upon accessing a storage area of said initiator connected via a communication, comprising:

a queuing step of queuing a read command received from said initiator in a queue having a predetermined size;

a queued execution step of picking up and executing a read command from said queue;

an immediate execution step of executing a write command received from said initiator immediately after reception; and a transfer request step of issuing a data transfer request to said initiator.

21. The method according to claim 20, further comprising a channel discrimination step of discriminating a channel corresponding to the request from said target using a channel identifier, and wherein the generation processing step includes a step of assigning a channel identifier corresponding to the discriminated channel or a channel corresponding to an application to the command.

22. The method according to claim 21, further comprising a channel discrimination step of discriminating a channel corresponding to the command from said initiator using a channel identifier, and the response step of sending back a response assigned with a channel identifier corresponding to the discriminated channel to said initiator, and wherein the transfer request step includes a step of assigning a channel identifier corresponding to the discriminated channel or a channel corresponding to an application to the request.

23. The method according to claim 22, wherein the transfer request step includes a step of requesting said initiator to issue a data write command in said storage area when a size of data for said initiator is larger than a predetermined size, and directly writing the data in a predetermined area of said storage area when the size of the data is smaller than the predetermined size.

24. A printing apparatus for receiving print data from an initiator, and transmitting status information to said initiator, by a communication control method of claim 20.

25. An apparatus for use as an initiator, the initiator transmitting a command to a target which performs a read operation and a write operation asynchronously, wherein, in the read operation, the target reads data from a designated location in a storage area of the initiator in response to a first command taken from a first queue and, in the write operation, the target writes to a designated location in the storage area of the initiator in response to a second command taken from a second queue, said initiator comprising:

generation means for generating the first command and the second command including designation whether the commands should be queued to the first queue or the second queue; and transmission control means for determining whether the first and the second queue have a free area respectively and managing transmission of the first command and the second command to the target so that the first and the second commands are transmitted respectively when the respective queues have a free area.

26. The apparatus according to claim 25, further comprising channel discrimination means for discriminating a channel corresponding to the request from said target using a channel identifier, and wherein said means assigns a channel identifier corresponding to the discriminated channel or a channel corresponding to an application to the command.

27. A communication control apparatus for exchanging data with an initiator by accessing a storage area of said initiator, comprising:

means for communicating with said initiator;

a queue which holds a read command received from said initiator and has a predetermined size;

queued execution means for picking up and executing the read command from said queue;

immediate execution means for executing a write command received from said initiator immediately after reception; and transfer request means for issuing a data transfer request to said initiator.

28. The apparatus according to claim 27, further comprising channel discrimination means for discriminating a channel corresponding to the command from said initiator using a channel identifier, and response means for sending back a response assigned with a channel identifier corresponding to the discriminated channel to said initiator, and wherein said transfer request means assigns a channel identifier corresponding to the discriminated channel or a channel corresponding to an application to the request.

29. The apparatus according to claim 28, wherein said transfer request means requests said initiator to issue a data write command in said storage area when a size of data for said initiator is larger than a predetermined size, and directly writes the data in a predetermined area of said storage area when the size of the data is smaller than the predetermined size.

30. A computer readable storage medium, which stores a communication control program for making a computer operate as an apparatus for use as an initiator, the initiator transmitting a command to a target which performs a read operation and a write operation asynchronously, wherein, in the read operation, the target reads data from a designated location in a storage area of the initiator in response to a first command taken from a first queue and, in the write operation, the target writes to a designated location in the storage area of the initiator in response to a second command taken from a second queue, said program comprising:

a generation processing step for generating the first command and the second command including designation whether the commands should be queued to the first queue or the second queue; and a transmission control processing step for determining whether the first and the second queue have a free area respectively and managing transmission of the first command and the second command to the target so that the first and the second commands are transmitted respectively when the respective queues have a free area.

31. The medium according to claim 30, wherein said program further comprises a channel discrimination processing step for discriminating a channel corresponding to the request from said target using a channel identifier, and said generation processing step assigns a channel identifier corresponding to the discriminated channel or a channel corresponding to an application to the command.

32. A computer readable storage medium, which stores a communication control program for exchanging data by accessing a storage area of an initiator connected via a communication, said program comprising:

a queue management processing step for queuing a read command received from said initiator in a queue having a predetermined capacity;

a queued execution processing step for picking up and executing the read command from said queue;

an immediate execution processing step for executing a write command received from said initiator immediately after reception; and a transfer request processing step for issuing a data transfer request to said initiator.

33. The medium according to claim 32, wherein said program further comprises a channel discrimination processing step for discriminating a channel corresponding to the command from said initiator using a channel identifier, and a response processing step for sending back a response assigned with a channel identifier corresponding to the discriminated channel to said initiator, and said transfer request means assigns a channel identifier corresponding to the discriminated channel or a channel corresponding to an application to the request.

34. The medium according to claim 33, wherein said transfer request processing step requests said initiator to issue a data write command in said storage area when a size of data for said initiator is larger than a predetermined size, and directly writes the data in a predetermined area of said storage area when the size of the data is smaller than the predetermined size.

35. An apparatus comprising a target, comprising:
a first queue and a second queue queuing commands received from an initiator;
process means for performing a read operation and a write operation asynchronously, wherein, in the read operation, said process means reads data from a designated location in a storage area of the initiator in response to a first command taken from the first queue and, in the write operation, said process means writes data to a designated location in the storage area of the initiator in response to a second command taken from the second queue; and
transfer means for transferring the first command and the second command to the first queue or the second queue according to a designation, included in the commands, whether the commands should be queued to the first queue or the second queue,
wherein the initiator manages respective remaining capacities of the first queue and the second queue and controls, based on the remaining capacities, transmission of the first command and the second command to the target so that respective numbers of commands queued in the first queue and the second queue do not exceed capacities of the first queue and the second queues.

36. The apparatus according to claim 35, further comprising channel discrimination means for discriminating a channel corresponding to the command from said initiator using a channel identifier, and response means for sending back a response assigned with a channel identifier corresponding to the discriminated channel to said initiator, and transfer request means issues a data transfer request to said initiator after assigning a channel identifier corresponding to the discriminated channel or a channel corresponding to an application to the request.

37. The apparatus according to claim 36, wherein said transfer request means requests said initiator to issue a data write command to said storage area when a size of data for said initiator is larger than a predetermined size, and directly writes the data in, a predetermined area of said storage area when the size of the data is smaller than the predetermined size.

38. The apparatus according to claim 35, wherein said first command is an immediate execution command and said second command is a queued execution command.

39. A method of operating an initiator in a communication control method for exchanging data with a target, said method comprising the steps of:
queuing commands received from an initiator to a first queue and a second queue;
performing a read operation and a write operation asynchronously, wherein, in the read operation, said process means reads data from a designated location in a storage area of the initiator in response to a first command taken from the first queue and, in the write operation, said process means writes data to a designated location in the storage area of the initiator in response to a second command taken from the second queue; and
transferring the first command and the second command to the first queue or the second queue according to a designation, included in the commands, whether the commands should be queued to the first queue or the second queue,
wherein transmission of the first command and the second command to the target is controlled based on respective remaining capacities of the first queue and the second queue so that respective numbers of commands queued in the first queue and the second queue do not exceed capacities of the first queue and the second queues.

40. The method according to claim 39, further comprising a channel discrimination step of discriminating a channel corresponding to the command from said initiator using a channel identifier, and a response step of sending back a response assigned with a channel identifier corresponding to the discriminated channel to said initiator, and a transfer request step of issuing a data transfer request to said initiator after assigning a channel identifier corresponding to the discriminated channel or a channel corresponding to an application to the request.

41. The method according to claim 40, wherein said transfer request step requests said initiator to issue a data write command to said storage area when a size of data for said initiator is larger than a predetermined size, and directly writes the data in a predetermined area of said storage area when the size of the data is smaller than the predetermined size.

42. The method according to claim 39, wherein said first command is an immediate execution command and said second command is a queued execution command.

43. A computer program for exchanging data with a target, said program comprising the processing steps of:
queuing commands received from an initiator to a first queue and a second queue;
performing a read operation and a write operation asynchronously, wherein, in the read operation, said process means reads data from a designated location in a storage area of the initiator in response to a first command taken from the first queue and, in the write operation, said process means writes data to a designated location in the storage area of the initiator in response to a second command taken from the second queue; and
transferring the first command and the second command to the first queue or the second queue according to a designation, included in the commands, whether the commands should be queued to the first queue or the second queue,
wherein transmission of the first command and the second command to the target is controlled based on respective remaining capacities of the first queue and the second queue so that respective numbers of commands queued in the first queue and the second queue do not exceed capacities of the first queue and the second queues.

44. The program according to claim 43, further comprising a channel discrimination step of discriminating a channel corresponding to the command from said initiator using a channel identifier, and a response step of sending back a response assigned with a channel identifier corresponding to the discriminated channel to said initiator, and a transfer request step of issuing a data transfer request to said initiator after assigning a channel identifier corresponding to the discriminated channel or a channel corresponding to an application to the request.

45. The program according to claim 44, wherein said transfer request step requests said initiator to issue a data write command to said storage area when a size of data for said initiator is larger than a predetermined size, and directly writes the data in a predetermined area of said storage area when the size of the data is smaller than the predetermined size.

46. The program according to claim 43, wherein said first command is an immediate execution command and said second command is a queued execution command.

* * * * *

UNITED STATES PATENT AND TRADEMARK OFFICE
CERTIFICATE OF CORRECTION

PATENT NO. : 6,452,693 B1
DATED : September 17, 2002
INVENTOR(S) : Takashi Isoda et al.

It is certified that error appears in the above-identified patent and that said Letters Patent is hereby corrected as shown below:

Title page,
Item [56], References Cited, FOREIGN PATENT DOCUMENTS,
"0 811 992 A" should read -- 0 811 922 A --.

Column 8,
Line 11, "memories", should read -- memory --.

Column 15,
Line 2, "status_quedepth" should read -- status_que_depth --.

Column 20,
Line 63, "these" should read -- this --.

Column 21,
Line 1, "these" should read -- this --.

Signed and Sealed this

Eighteenth Day of February, 2003

JAMES E. ROGAN
*Director of the United States Patent and Trademark Office*